(12) United States Patent
Krzyzanowski et al.

(10) Patent No.: US 8,116,889 B2
(45) Date of Patent: *Feb. 14, 2012

(54) METHOD, SYSTEM, AND COMPUTER PROGRAM PRODUCT FOR MANAGING CONTROLLED RESIDENTIAL OR NON-RESIDENTIAL ENVIRONMENTS

(75) Inventors: Paul Krzyzanowski, Flemington, NJ (US); Wayzen Lin, White Plains, NY (US); Michael Pitts, Lake Worth, FL (US); Justin Flores, Boca Raton, FL (US)

(73) Assignee: OpenPeak Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/238,160

(22) Filed: Sep. 29, 2005

(65) Prior Publication Data

US 2006/0053447 A1  Mar. 9, 2006

Related U.S. Application Data

(63) Continuation-in-part of application No. 10/897,410, filed on Jul. 23, 2004, now Pat. No. 7,184,848, which is a continuation of application No. 10/382,897, filed on Mar. 7, 2003, now Pat. No. 6,792,323, which is a continuation-in-part of application No. 10/180,500, filed on Jun. 27, 2002, now Pat. No. 7,933,945.

(51) Int. Cl.
*G06F 17/00* (2006.01)

(52) U.S. Cl. .......................................... 700/90; 700/83

(58) Field of Classification Search .................. 370/359; 725/37; 709/250; 455/3.01, 418, 270, 573, 455/572, 3.06, 13.1, 41.2, 41.3, 66.1, 74, 455/74.1, 517, 556.1, 557; 700/83, 90, 19, 700/65, 66; 710/303, 304; 62/127; 340/5.73, 340/539.11, 825.49, 825.57; 341/176; 361/686; 701/213; 702/188; 705/14; 715/716, 846
See application file for complete search history.

(56) References Cited

U.S. PATENT DOCUMENTS 5,414,426 A  5/1995  O'Donnell et al.
(Continued)

FOREIGN PATENT DOCUMENTS

CN  1288540 A  3/2001
(Continued)

OTHER PUBLICATIONS

UK Patent Application GB 2350749A to McAndrew et al.*
(Continued)

*Primary Examiner* — Kakali Chaki
*Assistant Examiner* — Carlos Ortiz Rodriguez
(74) *Attorney, Agent, or Firm* — Sterne Kessler Goldstein & Fox PLLC

(57) ABSTRACT

A control server, or similar central processor, manages the distribution of data (including audio and video), voice, and control signals among a plurality of devices connected via a wired and/or wireless communications network. The devices include audio/visual devices (such as, televisions, monitors, PDAs, notepads, notebooks, MP3, portable stereo, etc.) as well as household appliances (such as, lighting, ovens, alarm clocks, etc.). The control server supports video/audio serving, telephony, messaging, file sharing, internetworking, and security. A portable controller allows a user to access and control the network devices from any location within a controlled residential and/or non-residential environment, including its surrounding areas. The controllers are enhanced to support location-awareness and user-awareness functionality.

40 Claims, 27 Drawing Sheets

U.S. PATENT DOCUMENTS

Figure 1:
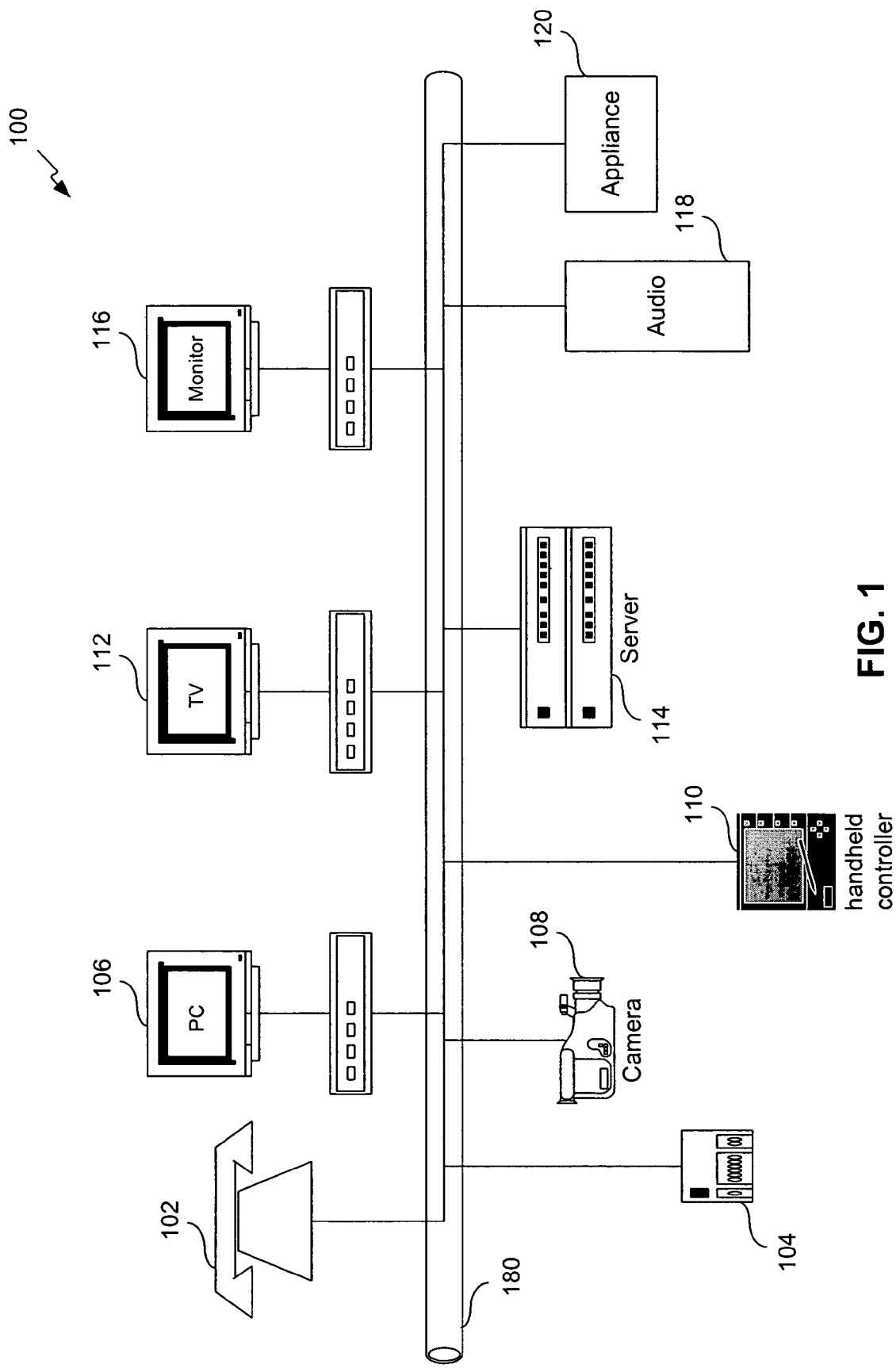

| | | | |
|---|---|---|---|
| 5,519,878 | A | 5/1996 | Dolin, Jr. |
| 5,537,463 | A | 7/1996 | Escobosa et al. |
| 5,544,321 | A | 8/1996 | Theimer et al. |
| 5,552,917 | A | 9/1996 | Darbee et al. |
| 5,570,085 | A | 10/1996 | Bertsch |
| 5,644,354 | A | 7/1997 | Thompson et al. |
| 5,689,353 | A | 11/1997 | Darbee et al. |
| 5,721,583 | A * | 2/1998 | Harada et al. ............ 725/24 |
| 5,771,388 | A | 6/1998 | Mondrik et al. |
| 5,802,467 | A | 9/1998 | Salazar et al. |
| 5,805,812 | A | 9/1998 | Fish et al. |
| 5,875,108 | A | 2/1999 | Hoffberg et al. |
| 5,898,386 | A | 4/1999 | Kaihatsu |
| 5,926,108 | A | 7/1999 | Wicks et al. |
| 5,930,699 | A | 7/1999 | Bhatia |
| 5,953,144 | A | 9/1999 | Darbee et al. |
| 5,956,025 | A * | 9/1999 | Goulden et al. ............ 715/716 |
| 5,956,487 | A | 9/1999 | Venkatraman et al. |
| 5,959,751 | A | 9/1999 | Darbee et al. |
| 5,963,624 | A | 10/1999 | Pope |
| 6,005,861 | A | 12/1999 | Humpleman |
| 6,026,150 | A | 2/2000 | Frank et al. |
| 6,032,202 | A | 2/2000 | Lea et al. |
| 6,049,711 | A | 4/2000 | Ben Yehezkel et al. |
| 6,052,750 | A | 4/2000 | Lea |
| 6,085,236 | A | 7/2000 | Lea |
| 6,111,569 | A | 8/2000 | Brusky et al. |
| 6,131,028 | A | 10/2000 | Whitington |
| 6,148,205 | A | 11/2000 | Cotton |
| 6,154,745 | A | 11/2000 | Kari et al. |
| 6,167,046 | A | 12/2000 | Terada et al. |
| 6,170,007 | B1 | 1/2001 | Venkatraman et al. |
| 6,198,479 | B1 | 3/2001 | Humpleman et al. |
| 6,199,066 | B1 | 3/2001 | Glitho et al. |
| 6,199,136 | B1 | 3/2001 | Shteyn |
| 6,208,341 | B1 | 3/2001 | Van Ee et al. |
| 6,208,855 | B1 | 3/2001 | Tanaka |
| 6,208,866 | B1 | 3/2001 | Rouhollahzadeh et al. |
| 6,218,931 | B1 | 4/2001 | Asghar et al. |
| 6,222,530 | B1 | 4/2001 | Sequeira |
| 6,223,348 | B1 | 4/2001 | Hayes et al. |
| 6,236,335 | B1 | 5/2001 | Goodwin, III |
| 6,243,707 | B1 | 6/2001 | Humpleman et al. |
| 6,243,772 | B1 | 6/2001 | Ghori et al. |
| 6,259,707 | B1 | 7/2001 | Dara-Abrams et al. |
| 6,266,612 | B1 | 7/2001 | Dussell et al. |
| 6,275,865 | B1 | 8/2001 | Zou |
| 6,282,714 | B1 | 8/2001 | Ghori et al. |
| 6,288,716 | B1 | 9/2001 | Humpleman et al. |
| 6,292,554 | B1 | 9/2001 | Oden et al. |
| 6,317,028 | B1 | 11/2001 | Valiulis |
| 6,317,718 | B1 | 11/2001 | Fano |
| 6,321,092 | B1 | 11/2001 | Fitch et al. |
| 6,349,352 | B1 | 2/2002 | Lea |
| 6,359,270 | B1 | 3/2002 | Bridson |
| 6,359,636 | B1 * | 3/2002 | Schindler et al. ............ 715/846 |
| 6,363,434 | B1 | 3/2002 | Eytchison |
| 6,388,399 | B1 * | 5/2002 | Eckel et al. ............ 315/312 |
| 6,405,261 | B1 | 6/2002 | Gaucher ............ 709/250 |
| 6,434,644 | B1 * | 8/2002 | Young et al. ............ 710/63 |
| 6,437,836 | B1 | 8/2002 | Huang et al. |
| 6,446,113 | B1 | 9/2002 | Ozzie et al. |
| 6,459,217 | B1 | 10/2002 | Belliveau |
| 6,463,343 | B1 * | 10/2002 | Emens et al. ............ 700/83 |
| 6,496,135 | B1 | 12/2002 | Darbee |
| 6,499,062 | B1 | 12/2002 | Shteyn |
| 6,505,121 | B1 * | 1/2003 | Russell ............ 701/213 |
| 6,563,430 | B1 * | 5/2003 | Kemink et al. ............ 340/825.49 |
| 6,587,067 | B2 | 7/2003 | Darbee et al. |
| 6,600,421 | B2 | 7/2003 | Freeman |
| 6,618,764 | B1 | 9/2003 | Shteyn |
| 6,642,852 | B2 | 11/2003 | Dresti et al. |
| 6,711,379 | B1 | 3/2004 | Owa et al. |
| 6,744,869 | B2 | 6/2004 | Brockenbrough et al. |
| 6,748,343 | B2 * | 6/2004 | Alexander et al. ............ 702/188 |
| 6,792,323 | B2 | 9/2004 | Kryzanowski et al. |
| 6,792,469 | B1 | 9/2004 | Callahan et al. |
| 6,870,463 | B2 | 3/2005 | Dresti et al. |
| 6,874,130 | B1 | 3/2005 | Baweja et al. |
| 6,882,299 | B1 | 4/2005 | Allport |
| 6,912,429 | B1 | 6/2005 | Bilger |
| 6,914,551 | B2 | 7/2005 | Vidal |
| 6,937,140 | B1 * | 8/2005 | Outslay et al. ............ 340/5.73 |
| 6,943,778 | B1 | 9/2005 | Astala et al. |
| 6,959,172 | B2 * | 10/2005 | Becker et al. ............ 455/74 |
| 6,970,127 | B2 | 11/2005 | Rakib |
| 7,024,266 | B2 | 4/2006 | Krzyzanowski et al. |
| 7,062,221 | B1 * | 6/2006 | Christensen ............ 455/3.01 |
| 7,088,952 | B1 | 8/2006 | Saito et al. |
| 7,111,320 | B1 | 9/2006 | Novak |
| 7,162,228 | B2 * | 1/2007 | Bleile et al. ............ 455/418 |
| 7,184,848 | B2 | 2/2007 | Krzyzanowski et al. |
| 7,194,755 | B1 | 3/2007 | Nakata et al. |
| 7,230,563 | B2 * | 6/2007 | Vidal ............ 341/176 |
| 7,256,773 | B2 | 8/2007 | Kolmykov-Zotov et al. |
| 7,315,886 | B1 * | 1/2008 | Meenan et al. ............ 709/219 |
| 7,526,593 | B2 | 4/2009 | Mandal et al. |
| 7,526,953 | B2 | 5/2009 | Goodwin et al. |
| 7,577,973 | B1 | 8/2009 | Kapner, III et al. |
| 7,627,343 | B2 | 12/2009 | Fadell et al. |
| 7,933,945 | B2 | 4/2011 | Krzyzanowski et al. |
| 2001/0000194 | A1 | 4/2001 | Sequeira |
| 2001/0018663 | A1 | 8/2001 | Dussell et al. |
| 2001/0030597 | A1 | 10/2001 | Inoue et al. |
| 2001/0036192 | A1 | 11/2001 | Chiles et al. |
| 2001/0041561 | A1 | 11/2001 | Ventulett et al. |
| 2001/0049275 | A1 | 12/2001 | Pierry et al. |
| 2001/0049846 | A1 | 12/2001 | Guzzi et al. |
| 2001/0053274 | A1 | 12/2001 | Roelofs et al. |
| 2001/0054060 | A1 | 12/2001 | Fillebrown et al. |
| 2001/0055954 | A1 | 12/2001 | Cheng |
| 2001/0055978 | A1 * | 12/2001 | Herrod et al. ............ 455/517 |
| 2002/0000092 | A1 * | 1/2002 | Sharood et al. ............ 62/127 |
| 2002/0005430 | A1 | 1/2002 | Pentel |
| 2002/0006788 | A1 | 1/2002 | Knutsson et al. |
| 2002/0019980 | A1 | 2/2002 | Kikinis |
| 2002/0019984 | A1 | 2/2002 | Rakib |
| 2002/0022991 | A1 * | 2/2002 | Sharood et al. ............ 705/14 |
| 2002/0031120 | A1 | 3/2002 | Rakib |
| 2002/0033760 | A1 | 3/2002 | Kobayashi |
| 2002/0034292 | A1 | 3/2002 | Tuoriniemi et al. |
| 2002/0035403 | A1 | 3/2002 | Clark et al. |
| 2002/0035404 | A1 | 3/2002 | Ficco et al. |
| 2002/0035605 | A1 | 3/2002 | McDowell et al. |
| 2002/0035621 | A1 | 3/2002 | Zintel et al. |
| 2002/0036795 | A1 | 3/2002 | Fujitani |
| 2002/0052138 | A1 | 5/2002 | Janik |
| 2002/0068984 | A1 | 6/2002 | Alexander et al. |
| 2002/0072356 | A1 | 6/2002 | Yamashita et al. |
| 2002/0078161 | A1 | 6/2002 | Cheng |
| 2002/0087746 | A1 | 7/2002 | Ludtke et al. |
| 2002/0180581 | A1 | 12/2002 | Kamiwada et al. |
| 2003/0005430 | A1 | 1/2003 | Kolessar |
| 2003/0040813 | A1 | 2/2003 | Gonzales et al. |
| 2003/0071117 | A1 | 4/2003 | Meade, II |
| 2003/0073411 | A1 | 4/2003 | Meade, II |
| 2003/0095791 | A1 | 5/2003 | Barton et al. |
| 2003/0101294 | A1 | 5/2003 | Saint-Hilaire et al. |
| 2003/0103088 | A1 | 6/2003 | Dresti et al. |
| 2003/0105854 | A1 | 6/2003 | Thorsteinsson et al. |
| 2003/0136827 | A1 | 7/2003 | Kaneko et al. |
| 2003/0141987 | A1 | 7/2003 | Hayes |
| 2003/0147624 | A1 | 8/2003 | Trajkovic et al. |
| 2003/0181168 | A1 * | 9/2003 | Herrod et al. ............ 455/90.3 |
| 2003/0191826 | A1 | 10/2003 | Bellinger et al. |
| 2003/0193519 | A1 | 10/2003 | Hayes et al. |
| 2003/0198216 | A1 | 10/2003 | Lewis |
| 2003/0210340 | A1 | 11/2003 | Frederick Romanowich |
| 2004/0003051 | A1 | 1/2004 | Krzyzanowski et al. |
| 2004/0003073 | A1 | 1/2004 | Krzyzanowski et al. |
| 2004/0014494 | A1 | 1/2004 | Hellhake et al. |
| 2004/0023635 | A1 | 2/2004 | Impson et al. |
| 2004/0046677 | A1 * | 3/2004 | Dresti et al. ............ 340/825.57 |
| 2004/0047347 | A1 | 3/2004 | Worry et al. |
| 2004/0054789 | A1 | 3/2004 | Breh et al. |
| 2004/0066308 | A1 * | 4/2004 | Sampsell ............ 340/825.69 |
| 2004/0133704 | A1 | 7/2004 | Krzyzanowski et al. |

| | | | |
|---|---|---|---|
| 2004/0163073 | A1 | 8/2004 | Krzyzanowski et al. |
| 2004/0193449 | A1 | 9/2004 | Wildman et al. |
| 2004/0224638 | A1* | 11/2004 | Fadell et al. ............... 455/66.1 |
| 2004/0246240 | A1 | 12/2004 | Kolmykov-Zotov et al. |
| 2004/0260407 | A1* | 12/2004 | Wimsatt ........................ 700/19 |
| 2004/0267382 | A1 | 12/2004 | Cunningham et al. |
| 2005/0015764 | A1 | 1/2005 | Gaur |
| 2005/0055472 | A1 | 3/2005 | Krzyzanowski et al. |
| 2005/0076360 | A1 | 4/2005 | Jerding et al. |
| 2005/0108091 | A1* | 5/2005 | Sotak et al. ..................... 705/14 |
| 2005/0108369 | A1 | 5/2005 | Sather et al. |
| 2005/0143017 | A1* | 6/2005 | Lopp et al. ................... 455/74.1 |
| 2005/0151640 | A1* | 7/2005 | Hastings ................. 340/539.11 |
| 2005/0179531 | A1 | 8/2005 | Tabe |
| 2005/0253807 | A1 | 11/2005 | Hohmann et al. |
| 2005/0266878 | A1* | 12/2005 | Lee et al. ................... 455/556.1 |
| 2005/0267935 | A1 | 12/2005 | Gandhi et al. |
| 2006/0009208 | A1 | 1/2006 | Jang et al. |
| 2006/0012488 | A1* | 1/2006 | Hilbrink et al. .......... 340/825.69 |
| 2006/0046653 | A1* | 3/2006 | Kirbas ........................ 455/41.2 |
| 2006/0061958 | A1* | 3/2006 | Solomon et al. .............. 361/686 |
| 2006/0142880 | A1* | 6/2006 | Deen et al. ....................... 700/19 |
| 2006/0218244 | A1* | 9/2006 | Rasmussen et al. .......... 709/218 |
| 2007/0042806 | A1* | 2/2007 | Stepanian ..................... 455/557 |
| 2007/0123207 | A1* | 5/2007 | Terlizzi ......................... 455/403 |
| 2007/0171091 | A1* | 7/2007 | Nisenboim et al. ...... 340/825.69 |
| 2008/0221715 | A1 | 9/2008 | Krzyzanowski et al. |
| 2009/0077589 | A1 | 3/2009 | Boyer et al. |
| 2010/0031295 | A1 | 2/2010 | Krzyzanowski et al. |

FOREIGN PATENT DOCUMENTS

| | | |
|---|---|---|
| CN | 1327654 A | 12/2001 |
| EP | 0 813 138 A1 | 12/1997 |
| EP | 1 085 403 A2 | 3/2001 |
| EP | 1 096 453 A2 | 5/2001 |
| EP | 1 263 167 A1 | 12/2002 |
| EP | 1 359 524 A1 | 11/2003 |
| EP | 1 657 628 A2 | 5/2006 |
| JP | 06-225360 | 8/1994 |
| JP | 08-044086 A | 2/1996 |
| JP | 08-000751 A | 3/1996 |
| JP | 10-164449 A | 6/1998 |
| JP | 11-122678 A | 4/1999 |
| JP | 2001-084103 A | 3/2001 |
| JP | 2001-092762 | 4/2001 |
| JP | 2001-128025 A | 5/2001 |
| JP | 2002-044763 | 2/2002 |
| JP | 2002-176610 A | 6/2002 |
| JP | 2002-199625 A | 7/2002 |
| JP | 2002-237764 A | 8/2002 |
| JP | 2002-532803 A | 10/2002 |
| JP | 2005-004732 A | 1/2005 |
| JP | 2006-524877 A | 11/2006 |
| WO | WO 99/56261 | 11/1999 |
| WO | WO 00/17737 | 3/2000 |
| WO | WO 00/39964 | 7/2000 |
| WO | WO 00/56016 | 9/2000 |
| WO | WO 01/78425 A1 | 10/2001 |
| WO | WO 02/07122 A2 | 1/2002 |
| WO | WO 02/063523 | 8/2002 |
| WO | WO 03/045015 A2 | 5/2003 |

OTHER PUBLICATIONS

JP 2002-176610 A, Jun. 21, 2002, Brother Ind Ltd.*
JP 2002-199625 A, Jul. 12, 2002, Mitsubishi Electric Corp.*
JP 2002-237764 A, Aug. 23, 2002, Kenwood Corp.*
JP 08-000751 A, Jan. 9, 1996, Nohmi Bosai Ltd.*
JP 08-044986, Feb. 16, 1996, Otax Co Ltd.*
Notice of Reasons for Rejection for Japanese Patent Application No. 2006-508998, mailed Jul. 27, 2010, 7 pages.*
U.S. Appl. No. 11/826,126, titled "Method, system, and computer program product for managing controlled residential or non-residential environments," inventor Krzyzanowski et al., Jul. 12, 2007, 89 pages.
U.S. Appl. No. 11/826,142, titled "Method, system, and computer program product for managing controlled residential or non-residential environments," inventor Krzyzanowski et al., Jul. 12, 2007, 86 pages.

Supplementary Partial European Search Report issued Jul. 17, 2007 for Appl. No. EP 04716866, 4 pages.
English language abstract of cited document FP1 (Japanese Patent Publication No. 2002-044763, published Feb. 8, 2002, inventors Kayashima et al., 13 pages).
English language abstract of cited document FP2 (Japanese Patent Publication No. 2001-092762, published Apr. 6, 2001, inventor Kaihei Kuwata, 8 pages).
English language abstract of cited document FP3 (Japanese Patent Publication No. JP 06-225360, published Aug. 12, 1994, inventor Masami Katou, 8 pages).
English language abstract of JP11122678A published Apr. 30, 1999, 1 pg.
Notice of Final Rejection mailed Feb. 25, 2010 for Japanese Patent Application No. 2004-517889, 11 pgs.
Supplementary European Search Report mailed Feb. 18, 2010 for Application No. EP 04813734, 3 pgs.
Notice of Reasons for Rejection mailed Feb. 9, 2010 for Japanese Application No. 2006-508998, 11 pgs.
"EtherWind™ 802.11b™ Wireless Print Server", URL http://www.troygroup.com/wireless/documents/datasheets/TROYU%20EtherWind.pdf, TROY Group, Inc., Copyright 2001, 2 pgs.
"EtherWind™ IEEE 802.11b Wireless Print Server", URL http://www.troygroup.com/wireless/products/wireless/etherwind.asp, original Jun. 11, 2002, Jiff Davis Media Inc., 3 pgs.
"Troy Wireless Introduces EtherWind-Plus 802.11b Wireless OEM Board-Level Product; New Product Enables Wireless and Ethernet Connectivity on OEM Devices", *Business Wire*, Santa Ana, CA, Aug. 13, 2002, 2 pgs.
"EtherWind-Plus™ 802.11b OEM Module", URL http://www.troygroup.com/wireless/documents/datasheets/Troy%20EtherWind%20Plus%20data%20sheet.pdf, Troy Group, Inc., Copyright 2002, 2 pgs.
"EtherWind-Plus™ IEEE 802.11b OEM Connectivity Module", URL http://www.troygroup.com/wireless/products/wireless/etherwindplus.asp, Troy Group, Inc., Copyright 2003, 2 pgs.
"Pronto RF Extender, RFX6000: Pronto accessory for operating devices inside a closed cabinet, closet or even in another room", URL http://www.remotecontrol.philips.com/library/documents/SPEC_RFX6000.Pdf, Koninklijke Philips Electronics N.V., Copyright 2002, 2 pgs.
"Products: RFX 6000, RF extender for TSU6000 & TSU3000: Using Pronto(Pro) with Radio Frequency", Koninklijke Philips Electronics N.V., URL http://www.pronto.philips.com/index.cfm?id=577f , printed Nov. 19, 2003, 2 pgs.
"Global Cache GC-100 Network Adapter—Control & Automate Common Devices Over a Network," URL http://www.globalcache.com/products/gc-index.html, Global Cache, Inc., Copyright 2004, 2 pgs.
"GC-100 Key Features and Benefits," URL http://www.globalcache.com/products/gc-features.html, Global Cache, Inc., Copyright 2004, 2 pgs.
"Global Cache GC-100 Network Adapter—Control & Automate Common Devices Over a Network", Product Data Sheet, Global Chache, Inc., Copyright 2004, 2 pgs.
"IPL T SFI244, Two Serial, Four Flex I/O, and Four IR Port IP Link™ Ethernet Control Interface With IR Learner", Extron IPL T SF1244 IP Link™ Products, URL http://www.extron.com/product/productasp?id=ipltsfi244&version=print, Extron Electronics, Copyright 2004, 6 pgs.
"Creston Introduces RMC2e "Mini" Control System," Home Toys New Release, URL http://www.hometoys.com/releases/mar03/creston_02.html, Home Toys Inc., Copyright 2004, 2 pgs.
"EtherWind 802.11b Print Server", URL http://www.troygroup.com/Connectivity/products/WirelessLAN/Etherwind.asp, TROY Group, Inc., Copyright 2004, 1 pg.
"EtherWind-Plus 802.11b OEM Module", URL http://www.troygroup.com/wireless/documents/datasheets/TROY%20EtherWind%20Plus%20data%20sheet.pdf, Troy Group, Inc., Copyright 2004, 2 pgs.

"Serial Servers", URL http://www.troygroup.com/Connectivity/products/SerialDeviceConnectivity/SerialServers . . . , Troy Group, Inc., Copyright 2004, 1 pg.

"EtherWind Plus", URL http://www.troygroup.com/Connectivity/products/WirelessLAN?EtherwindPlus.asp, Troy Group, Inc., Copyright 2004, 1 pg.

"Products: RFX 6000, RF extender for TSU7000, TSU6000 & TSU3000: Using Pronto(Pro) NG with Radio Frequency", Koninklijke Philips Electronics N.V., URL http://www.pronto.philips.com/index.cfm?id=577f, printed Jun. 21, 2004, 1 pg.

"Troy Serial Server", Troy Group, Inc., Copyright 2004, 2 pgs.

*EtherWind™—Plus, OEM Connectivity Module: Developer's Guide*, TROY Group, Inc., Copyright 2001, the whole book, 52 pgs.

Supplementary European Search Report mailed May 18, 2010 for Application No. 06815786.6, 12 pgs.

Bantz, D. et al., "Keyboard Device for Upper and Lower Case Keying without Shifting", Feb. 1, 1979, IBM Technical Disclosure Bulletin, International Business Machines Corp., US, pp. 3845-3846.

*Total Remote Software: Griffin Technology Downloads*, 1 page, printed from Internet-URL-http://www.griffintechnology.com/software/software_totalremote.html, (printed Feb. 23, 2004).

*Total Remote v2.0 user guide*, 29 pages, printed from Internet -URL-http://www.griffintechnology.com/downloads/pdf/manuals/Total_Remote_user_manual.pdf, (printed Feb. 23, 2004).

International Search Report for International Application No. PCT/US03/20189, Issued on Oct. 29, 2003.

Supplementary European Search Report for European Application No. EP 03762083, Issued on May 3, 2006.

Notice of Reasons for Rejection for Japanese Patent Application No. 2006-508998, mailed Jul. 27, 2010, 7 pages.

English-Language Translation of Claims and Description for JP 2002-532803 A, published Oct. 2, 2002; 11 pages.

European Search Report directed to related European Patent Application No. 06 815 786.6, dated Jun. 15, 2011; 2 pages.

English-Language Translation of Notice of Final Rejection directed to related Japanese Patent Application No. 2006-547085, mailed Jun. 17, 2011; 4 pages.

Notice of Reasons for Rejection for Japanese Patent Application No. 2006-508998, mailed Jul. 27, 2010, 7 pages.

Supplementary European Search Report for European Application No. EP 03762083, Issued on May 3, 2006.

Notice of Preliminary Rejection directed to related Korean Patent Application No. 10- 2005-7016586, mailed Oct. 15, 2010, from the Korean Intellectual Property Office; 13 pages.

Notice of Preliminary Rejection directed to related Korean Patent Application No. 10-2005-7016586, mailed Jun. 23, 2011, from the Korean Intellectual Property Office; 4 page.

Notice of Preliminary Rejection directed to related Korean Patent Application No. 10-2004-7021226, mailed Apr. 30, 2010, from the Korean Intellectual Property Office; 5 pages.

Notice of Preliminary Rejection directed to related Korean Patent Application No. 10-2004-7021226, mailed Oct. 29, 2010, from the Korean Intellectual Property Office; 9 pages.

Notice of Final Rejection directed to related Korean Patent Application No. Oct. 2004-7021226, mailed Aug. 31, 2011, from the Korean Intellectual Property Office; 5 pages.

English-Language Translation of Notification of the First Office Action directed to related Chinese Patent Application No. 200480006298.1, mailed Oct. 12, 2007, from the Patent Office fo the People's Republic of China; 4 pages.

English-Language Translation of Notification of the Second Office Action directed to related Chinese Patent Application No. 200480006298.1, mailed May 23, 2008, from the Patent Office of the People's Republic of China; 4 pages.

English-Language Translation of Notification of the Third Office Action directed to related Chinese Patent Application No. 200480006298.1, mailed. Sep. 5, 2008, from the Patent Office of the People's Republic of China; 3 pages.

English-Language Translation of Notification of the Fourth Office Action directed to related Chinese Patent Application No. 200480006298.1, mailed Dec. 12, 2008, from the Patent Office of the People's Republic of China; 4 pages.

English-Translation Translation of Notification of the Sixth Office Action directed to related Chinese Patent Application No. 200480006298.1, mailed Sep. 4, 2009, from the Patent Office of the People's Republic of China; 4 pages.

European Search Report directed to related European Patent Application No. 04 716 866.1-1525, mailed Jan. 7, 2009, from the European Patent Office; 5 pages.

European Search Report directed to related European Patent Application No. 04 716 866.1-1525, mailed Sep. 28, 2010, from the European Patent Office, 5 pages.

International Search Report directed to related International Patent Application No. PCT/US2004/006348, mailed Dec. 10, 2004, from the International Searching Authority; 1 page.

International Preliminary Report on Patentability with the Written Opinion of the International Searching Authority directed to related International Patent Application No. PCT/US2004/006348, mailed Dec. 10, 2004, from the International Bureau of WIPO; 4 pages.

Written Opinion directed to related International Patent Application No. PCT/US2003/020189, mailed Sep. 27, 2007, from the International Preliminary Examination Authority; 4 pages.

International Preliminary Report on Patentability directed to related International Patent Application No. PCT/US2006/038044, mailed Jun. 19, 2008, from the International Bureau of WIPO; 6 pages.

English-Language Translation of Notice of Reasons for Rejection directed to related Japanese Patent Application No. 2008-533655, mailed Aug. 11, 2011, from the Japanese Patent Office; 6 pages.

English-Language Abstract for Japanese Patent Publication No. 2001-084103 A, published Mar. 30, 2001, from the Japanese Patent Office; 1 page.

English-Language Abstract for Japanese Patent Publication No. 2001-128025 A, published May 11, 2011, from the Japanese Patent Office; 1 page.

English-Language Abstract for Japanese Patent Publication No. 2005-004732 A, published Jan. 6, 2005, from the Japanese Patent Office; 1 page.

Supplementary European Search Report for European Application Number No. EP 03762083, Issued on May 3, 2006.

English-Language Translation of Notification of the First Office Action directed to related Chinese Patent Application No. 200480006298.1, mailed Oct. 12, 2007, from the Patent Office fo the People's Republic of China; 4 pages.

English-Language Translation of Notification of the Second Office Action directed to related Chinese Patent Application No. 200480006298.1, mailed May 23, 2008, from the Patent Office of the People's Republic of China; 4 pages.

English-Language Translation of Notification of the Third Office Action directed to related Chinese Patent Application No. 200480006298.1, mailed. Sep. 5, 2008, from the Patent Office of the People's Republic of China; 3 pages.

English-Language Translation of Notification of the Fourth Office Action directed to related Chinese Patent Application No. 200480006298.1, mailed Dec. 12, 2008, from the Patent Office of the People's Republic of China; 4 pages.

English-Language Translation of Notification of the Fifth Office Action directed to related Chinese Patent Application No. 200480006298.1, mailed Sep. 4, 2009, from the Patent Office of the People's Republic of China; 4 pages.

English-Translation Translation of Notification of the Sixth Office Action directed to related Chinese Patent Application No. 200480006298.1, mailed Sep. 4, 2009, from the Patent Office of the People's Republic of China; 4 pages.

English-Language Abstract for Chinese Patent Publication No. 1327654 A, published Dec. 19, 2001, from the State Intellectual Property Office of the People's Republic of China; 1 page.

* cited by examiner

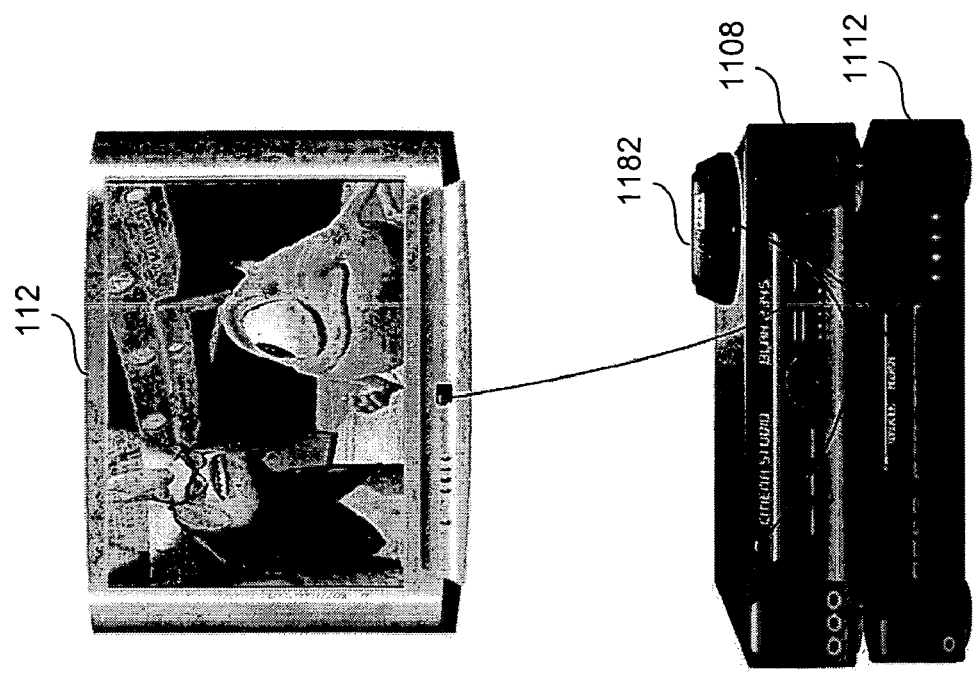
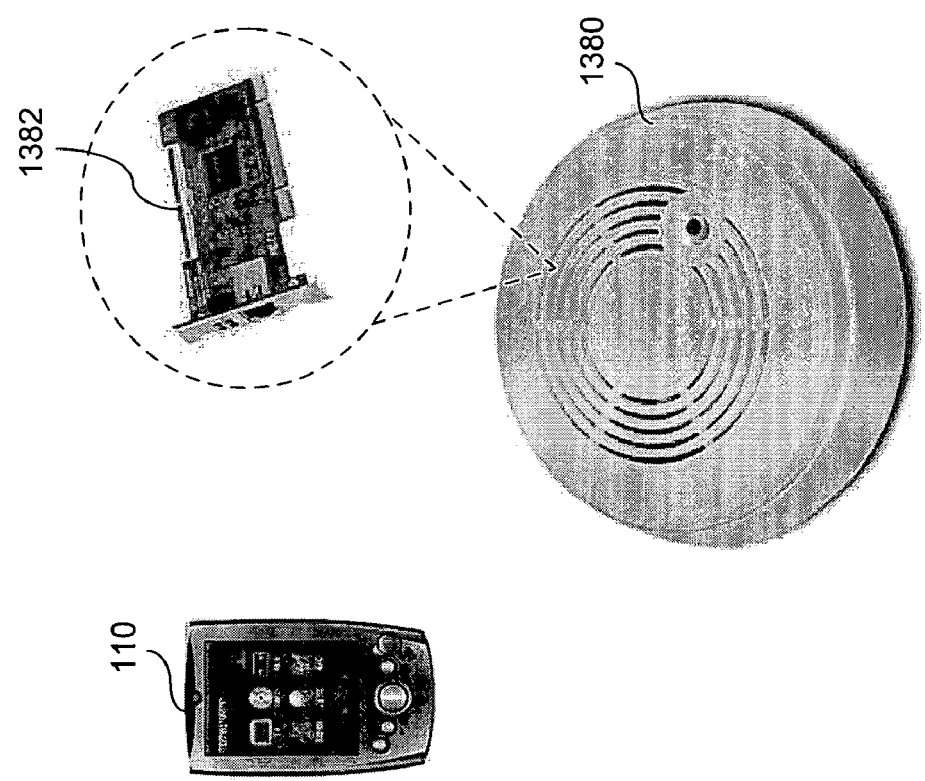
FIG. 13

METHOD, SYSTEM, AND COMPUTER PROGRAM PRODUCT FOR MANAGING CONTROLLED RESIDENTIAL OR NON-RESIDENTIAL ENVIRONMENTS

CROSS-REFERENCE TO RELATED APPLICATIONS

This application is a continuation-in-part of U.S. application Ser. No. 10/897,410, filed Jul. 23, 2004 (now U.S. Pat. No. 7,184,848 that issued Feb. 27, 2007), incorporated herein by reference in its entirety; which is a continuation of U.S. application Ser. No. 10/382,897, filed Mar. 7, 2003 (now U.S. Pat. 6,792,323), incorporated herein by reference in its entirety; which is a continuation-in-part of U.S. application Ser. No. 10/180,500, filed Jun. 27, 2002 now U.S. Pat. No. 7,933,945, incorporated herein by reference in its entirety.

BACKGROUND OF THE INVENTION

1. Field of the Invention

The present invention relates generally to networking, and more specifically, to distributing information within a network.

2. Related Art

The dawn of the information age has revealed new and exciting opportunities for computer processing capabilities. Personal computers have been deployed in a variety of arenas to gain efficiencies, reduce cost, and increase productivity. Miniaturization and portability have made personal computers more accessible and a more valued tool in many business environments. Personal computers have also become a very useful tool in non-business environments, including educational institutions and homes.

Home computer networks are gaining increased popularity. Within a home, multiple personal computers can be connected together to permit a user to share files without having to manually carry a diskette from one room to another. The computer network also permits the user to share printers, fax machines, and other devices. Internet access facilities can also be provided to permit access to external networks and services. Thus, a user can operate a home computer to gain instant access to information from anywhere in the world.

Despite the increasing presence of home computer networks, several significant problems must be overcome. For example, installing a home network can be time extensive and expensive to deploy. Additionally, there is no easy method to integrate home computer networks with other residential devices, such as televisions, stereos, DVD players, and other home electronics. Being able to efficiently distribute digital audio/video (AV) data among personal computers and other AV devices (such as, televisions, DVD players, PVRs, etc.) is complicated by differing and evolving communications standards and/or formats.

Another significant challenge is being able to effectively control the networked residential devices. Although a remote control unit can be trained to send signals to components of an entertainment center (such as, a television, stereo, and VCR), there is no known central device that can communicate and control multiple personal computers and other analog and/or digital devices at a residence.

Although the combination of improved computer processing capabilities and global access to information has resulted in significant advancements in the information processing age, there exists a need for a simple, inexpensive, yet versatile system that can integrate the functions of multiple residential devices connected to a residential network.

SUMMARY OF THE INVENTION

A method, system and computer program product are herein described for managing a plurality of devices and/or applications within an environment, such as a home, business, school, etc, as well as its surrounding areas. A control center comprises one or more servers or processing systems, and enables centralized command and control of the devices and/or applications.

The devices and/or applications can include communications equipment (such as, telephones, intercoms, etc.), entertainment systems (such as, televisions, CD/DVD players, gaming applications, stereos, etc.), monitoring systems (such as, security cameras, baby monitors, etc.), security systems (such as, fire alarms, sprinkler systems, locks on doors or windows, etc.), personal computers (such as, desktops, notebooks, notepads, personal digital assistants, etc.), cooking appliances (such as, ovens, coffee makers, electrical food/beverage warmers, etc.), comfort systems (such as, heating and air conditioning, humidifiers, dehumidifiers, air purifiers, light switches, light dimmers, etc.), or the like.

The control center can distribute information (including video, audio, voice, text, graphics, control messages, etc.) to and among the devices and/or applications. The control center supports video/audio serving, telephony, messaging, file sharing, internetworking, and/or security.

Any platform that is small in physical size, has access to power lines for continuous and uninterrupted electrical power, and is physically located to facilitate transmission and reception of wireless signals is suitable for housing or hosting the hardware comprising the control center. In an embodiment, a smoke detector serves as a platform for the control center. The smoke detector's ceiling-mounted base and direct connection to a home or office's existing 110 voltage AC power line provides an ideal platform for the control center and enables information to be transported throughout the controlled environment either through a wireless connection or through the power line. Similarly, the control center can be housed within a wireless access point, which provides the control center with "always-on" and wireless connectivity.

A portable controller (such as a digital personal assistant, wireless notepad, etc.) can enable a user to interact with the control center. Such interaction includes altering the configuration and performance of the other devices and/or applications. Accordingly, the portable controller provides remote access to other devices and/or applications, and enables the user to control their functions and/or operations from any location within the environment. In an embodiment, the control center is located within the portable controller. In another embodiment, the control center is located at a centralized location that is distinct from the portable controller.

The portable controllers can be equipped with location-awareness and/or user-awareness functionality. As such, the control center has the ability to track and/or monitor the position of the portable controllers and enable personalized configurations based on the user identity.

One or more control macros can be established, either automatically by the control center or by the user, to control the operations and/or functions of the system components. A control macro includes a set of commands that, when executed, enables the control center to manage multiple operations and/or functions of one or more system components. The control macro can be associated with a control macro filename for future recall and execution. The control macro is stored at the control center. In an embodiment, the portable controller is programmable to issue a generic control request to the control center to thereby execute the sequence of commands from the control macro.

The control center can access updated electronic program guide (EPG) information stored in a local or internal database. The EPG can be displayed on the portable controller or other devices and/or applications to a user. The control center can also obtain the EPG information from an external or remote source via, for example, the global Internet.

An EPG interface can be displayed on the portable controller to enable a user to select channels based on the electronic guide information and/or select programs for recording from the electronic guide. In an embodiment, the EPG interface includes a plurality of channel objects, with each channel object representing a "favorite" programming channel as selected by a user. Each of the channel objects are directly or indirectly linked to a switch and/or electronic guide information for a corresponding favorite channel. As such when selected and activated, the activated channel object enables a control message to be transmitted that either retrieves programming information for the corresponding channel or switches a selected device to the corresponding channel.

In an embodiment, the activation of a channel object transmits one of three commands depending on the length of time the channel object is activated. If the channel object is deactivated prior to the expiration of a first time value (e.g., before two seconds), a command is transmitted to switch a device (e.g., television) to the programming channel associated with the activated channel object.

If the channel object is deactivated after the expiration of the first time value (e.g., two seconds) but before a second time value (e.g., four seconds), a command is transmitted to display a quick-view object on the EPG interface. The quick-view object includes programming information for a program listed for transmission on the programming channel associated with the activated channel object.

If the channel object is deactivated after the expiration of the second time value (e.g., four seconds), a command is transmitted to display a jump-to-guide object on the EPG interface. The jump-to-guide object includes electronic guide information for the programming channels associated with the plurality of channel objects.

A timer graphic can also be displayed on the EPG interface upon activation of a channel object. The timer graphic includes an inner circle concentrically aligned with an outer circle. The visual characteristics of the inner and outer circles are modified over a time period corresponding to the aforementioned first and second time values. For example, the inner circle can be radially filled over a period of time equivalent to the first time value (e.g., two seconds). Similarly, the outer circle can be radially filled over a time period equivalent to the second time value.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

Figure 2:
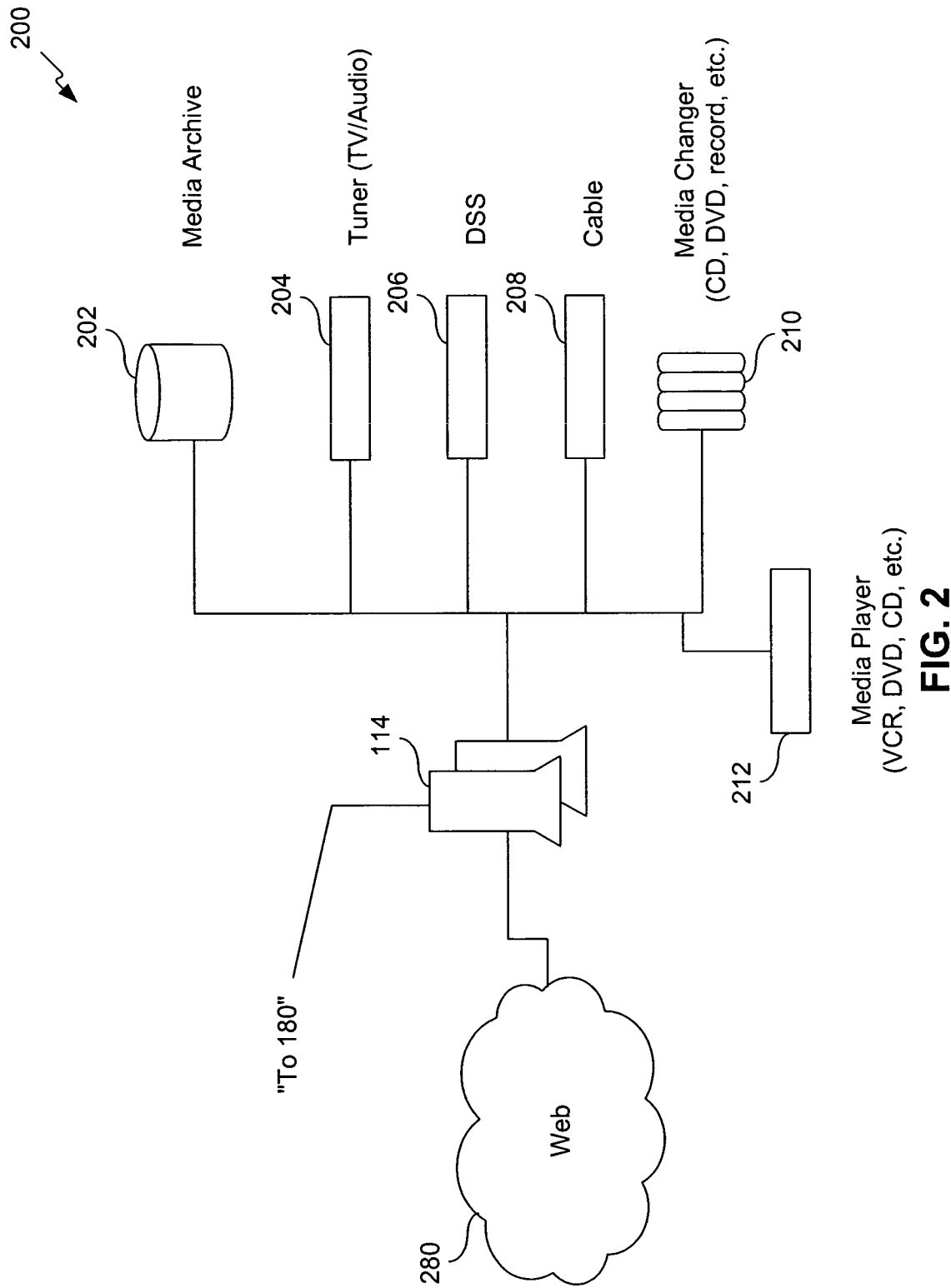
Figure 3:
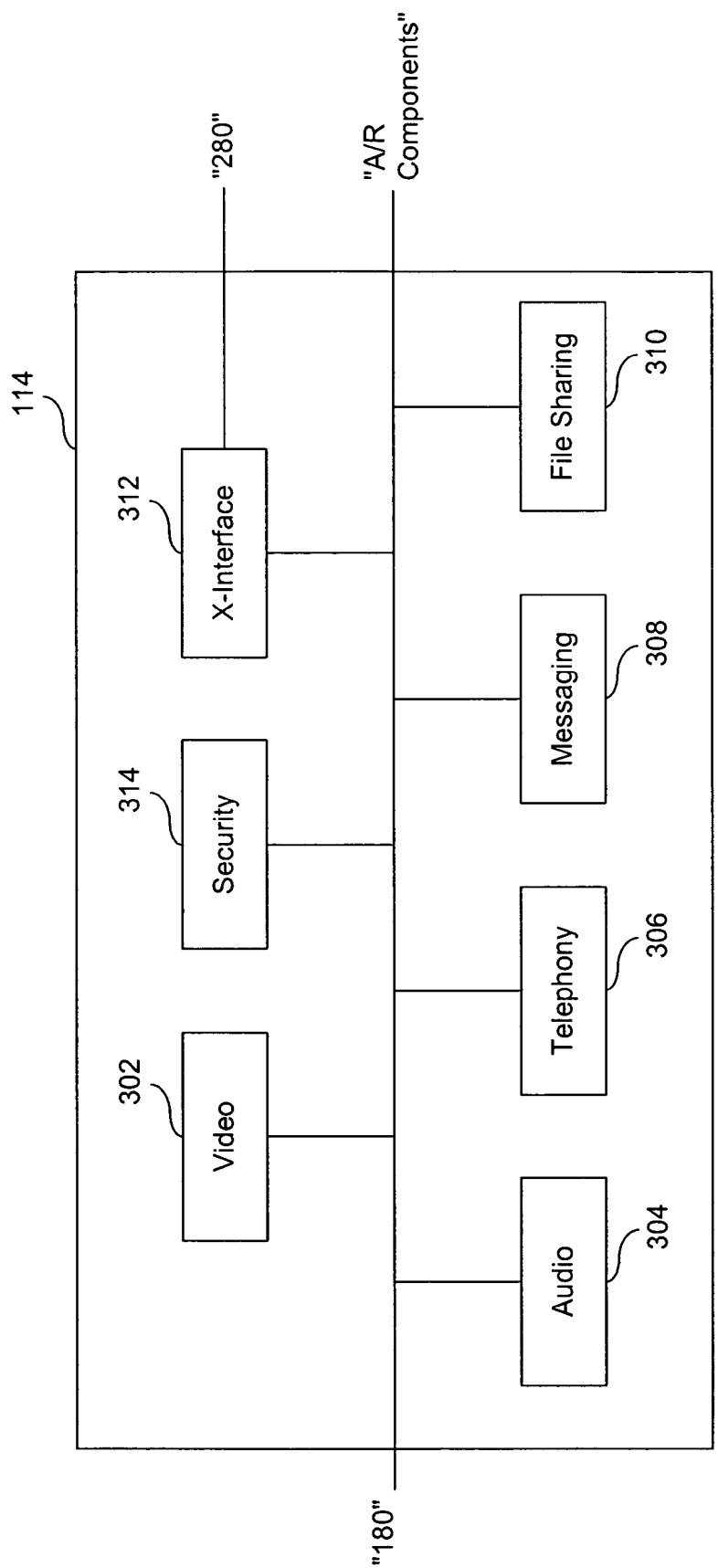
Figure 4B:
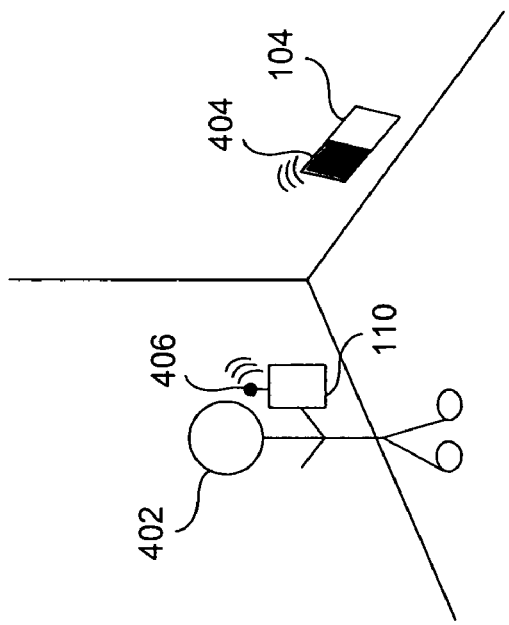
Figure 4A:
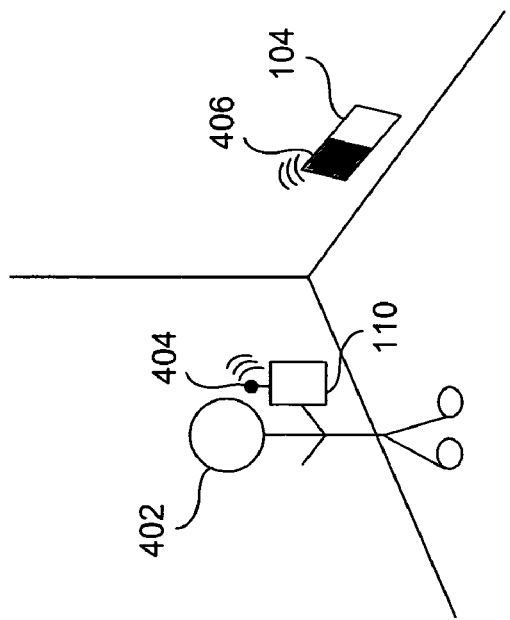
Figure 5:
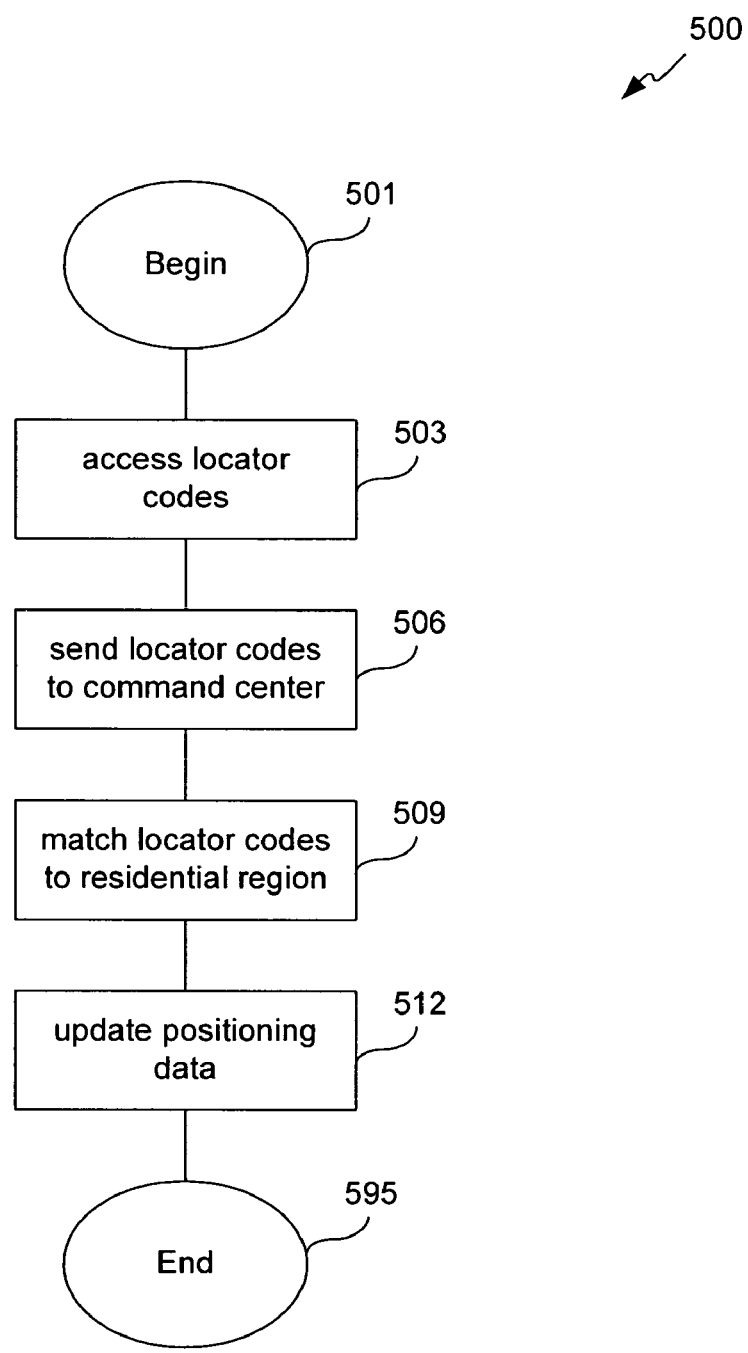
Figure 6:
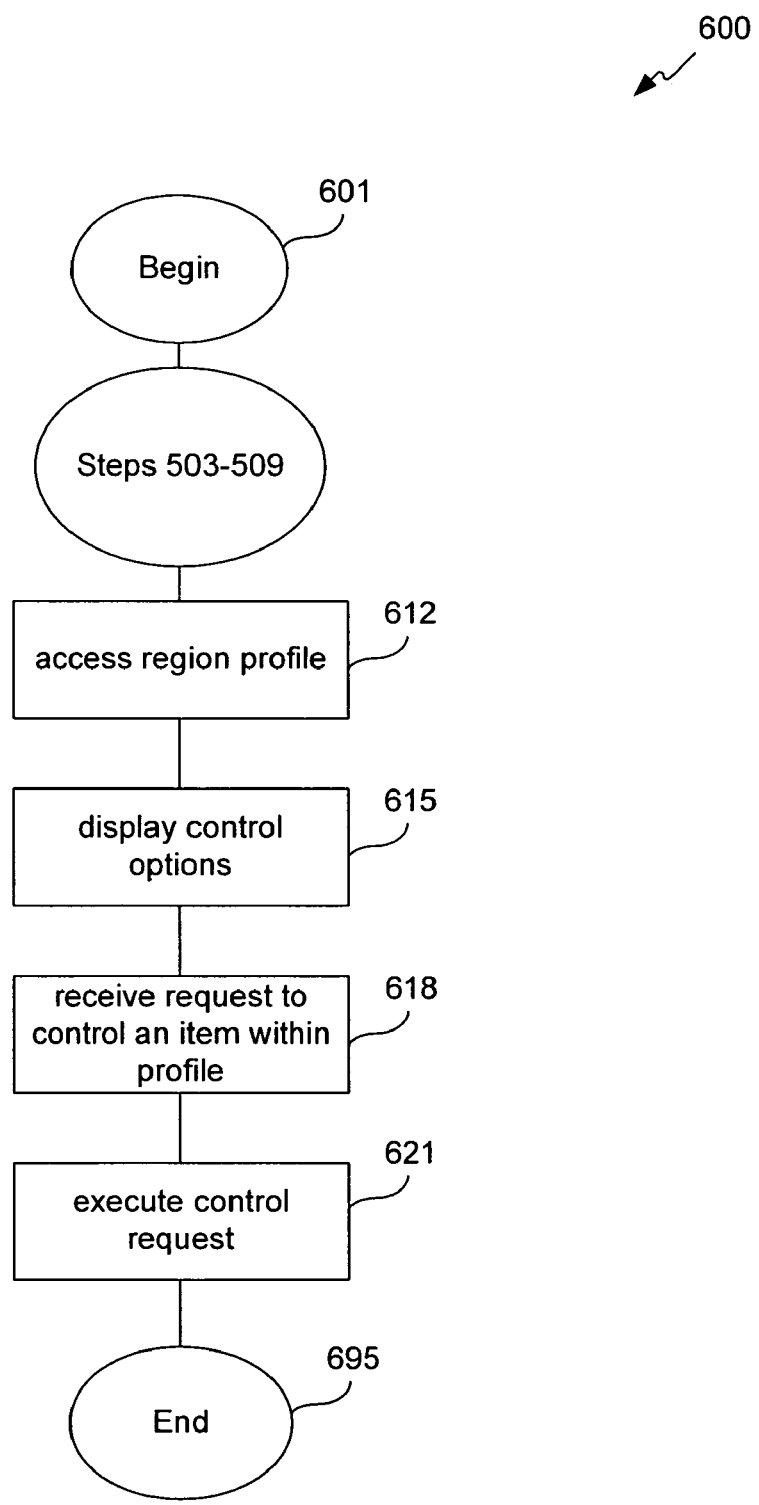
Figure 7:
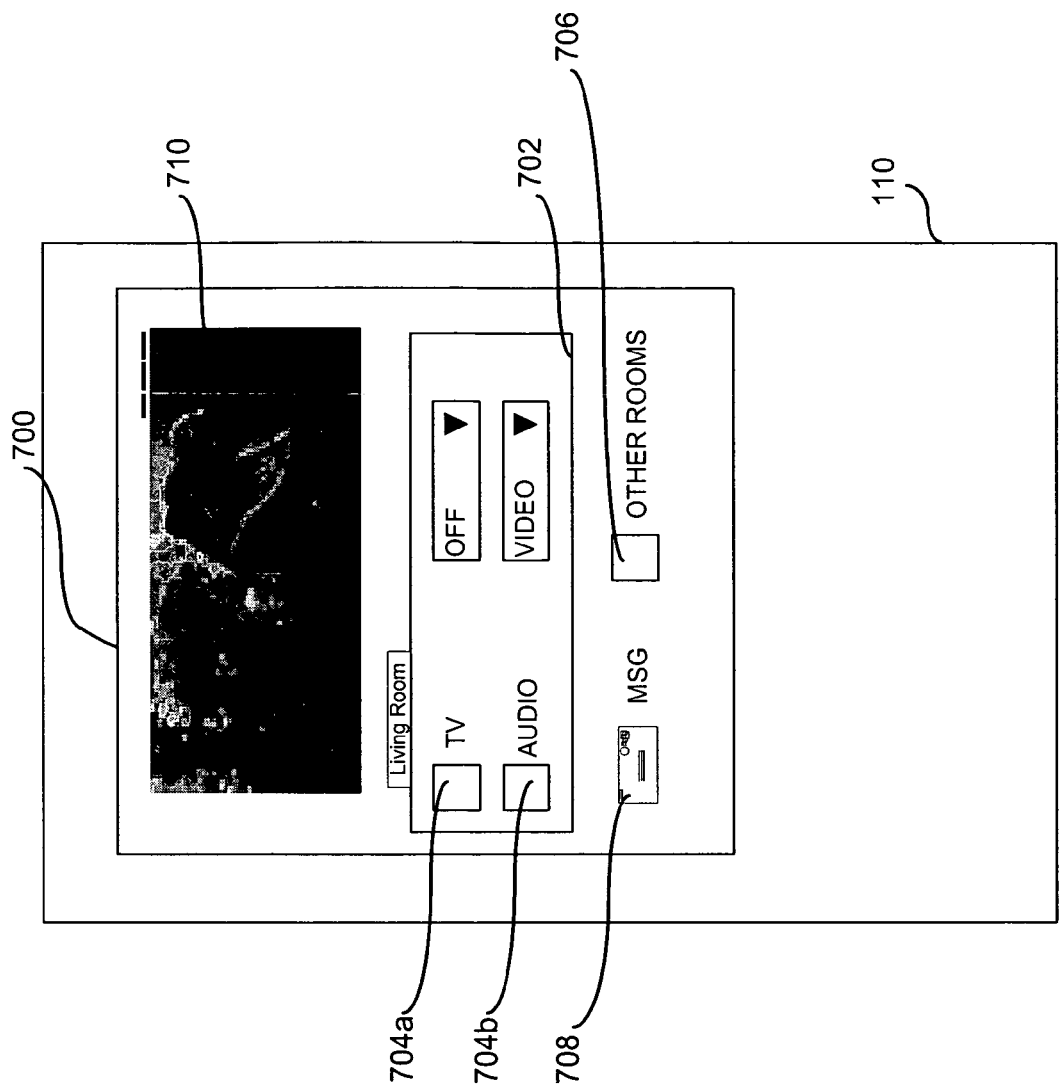
Figure 8:
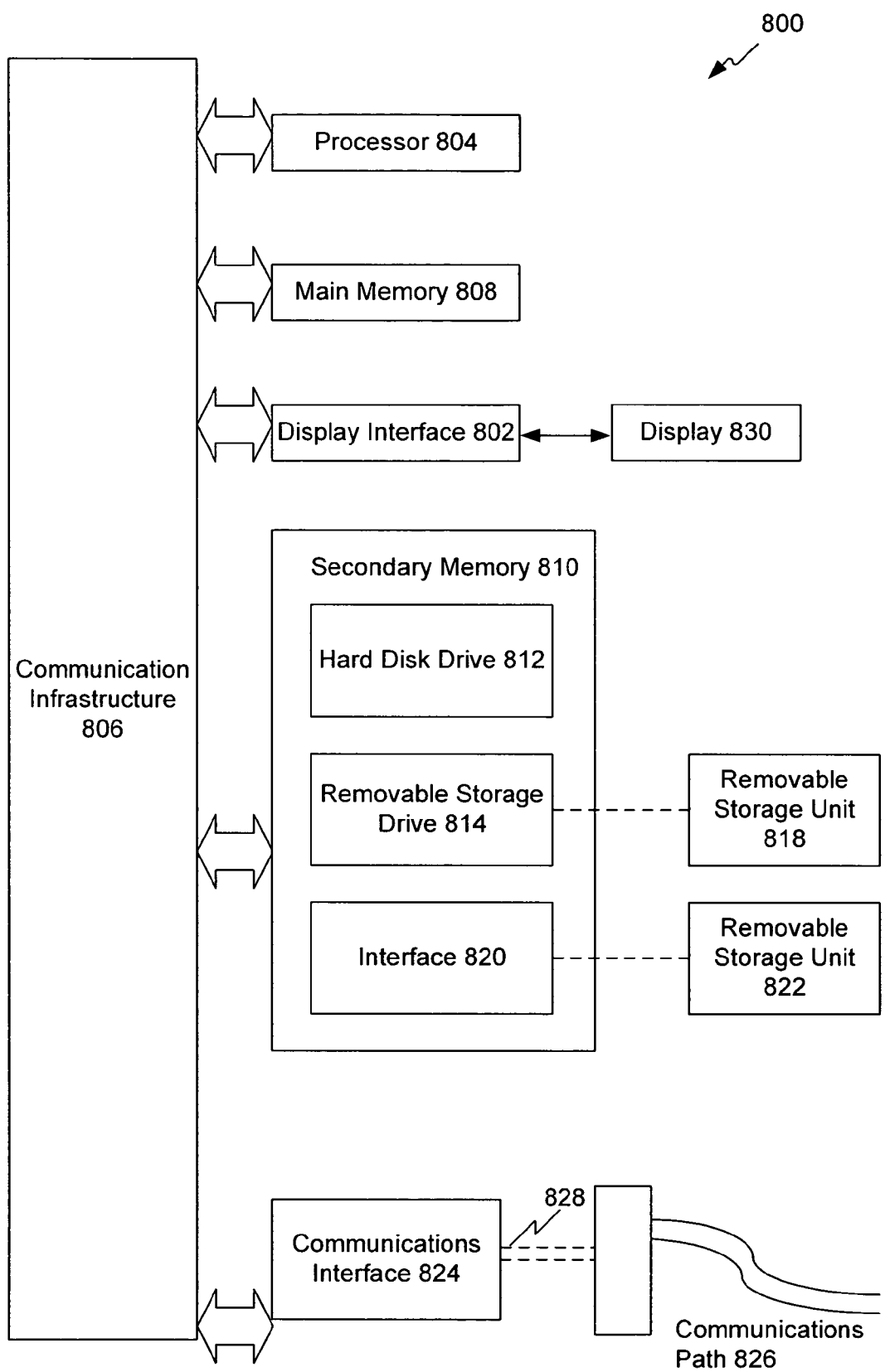
Figure 9:
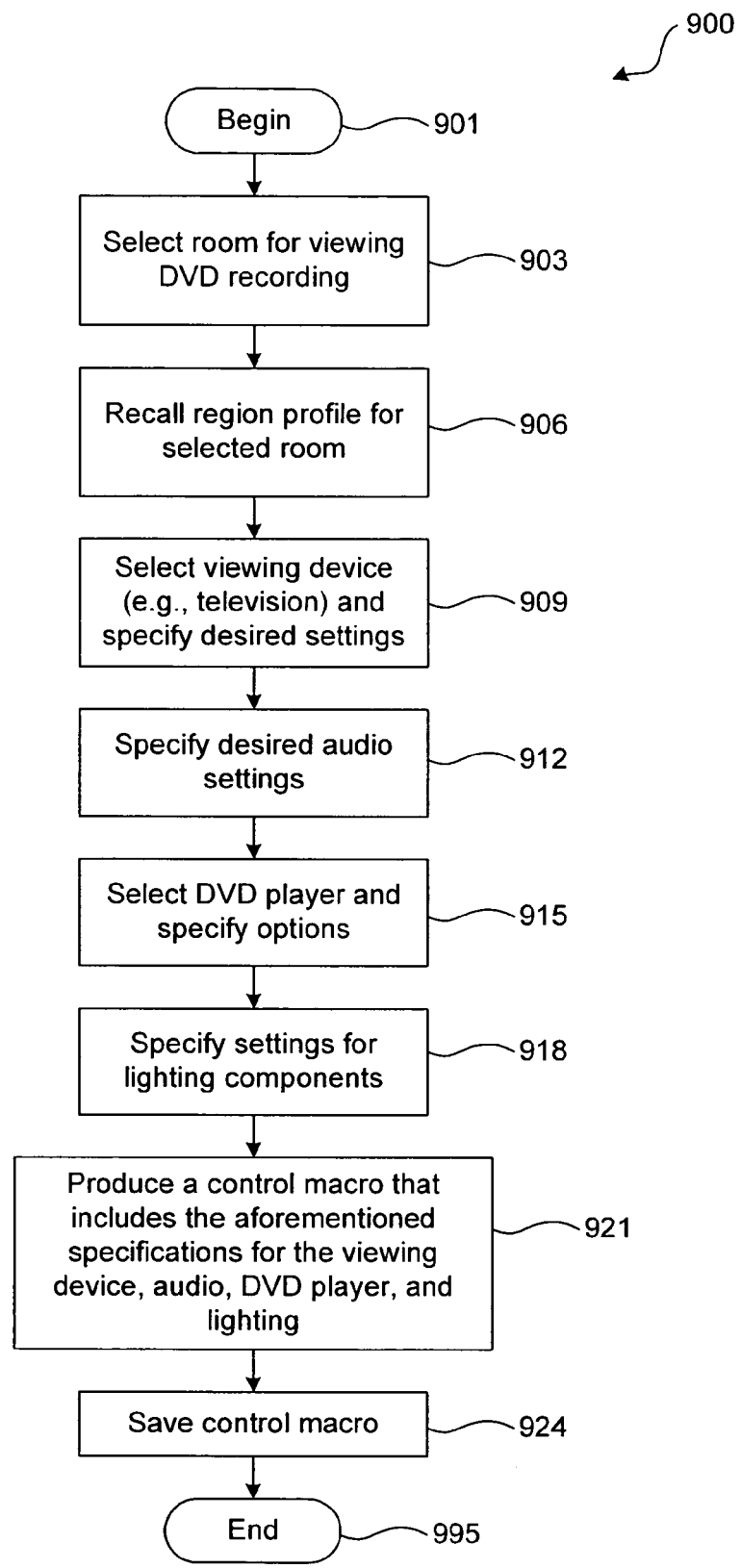
Figure 10:
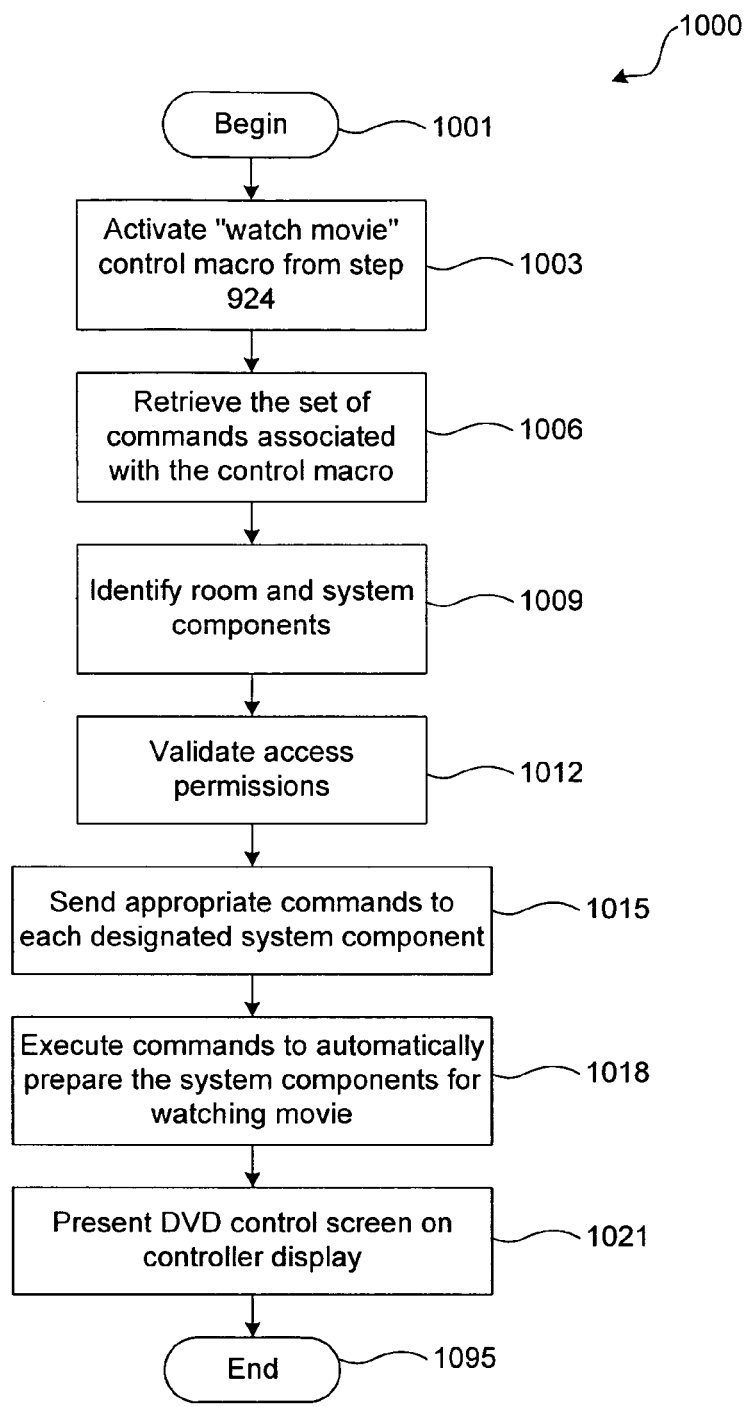
Figure 11:
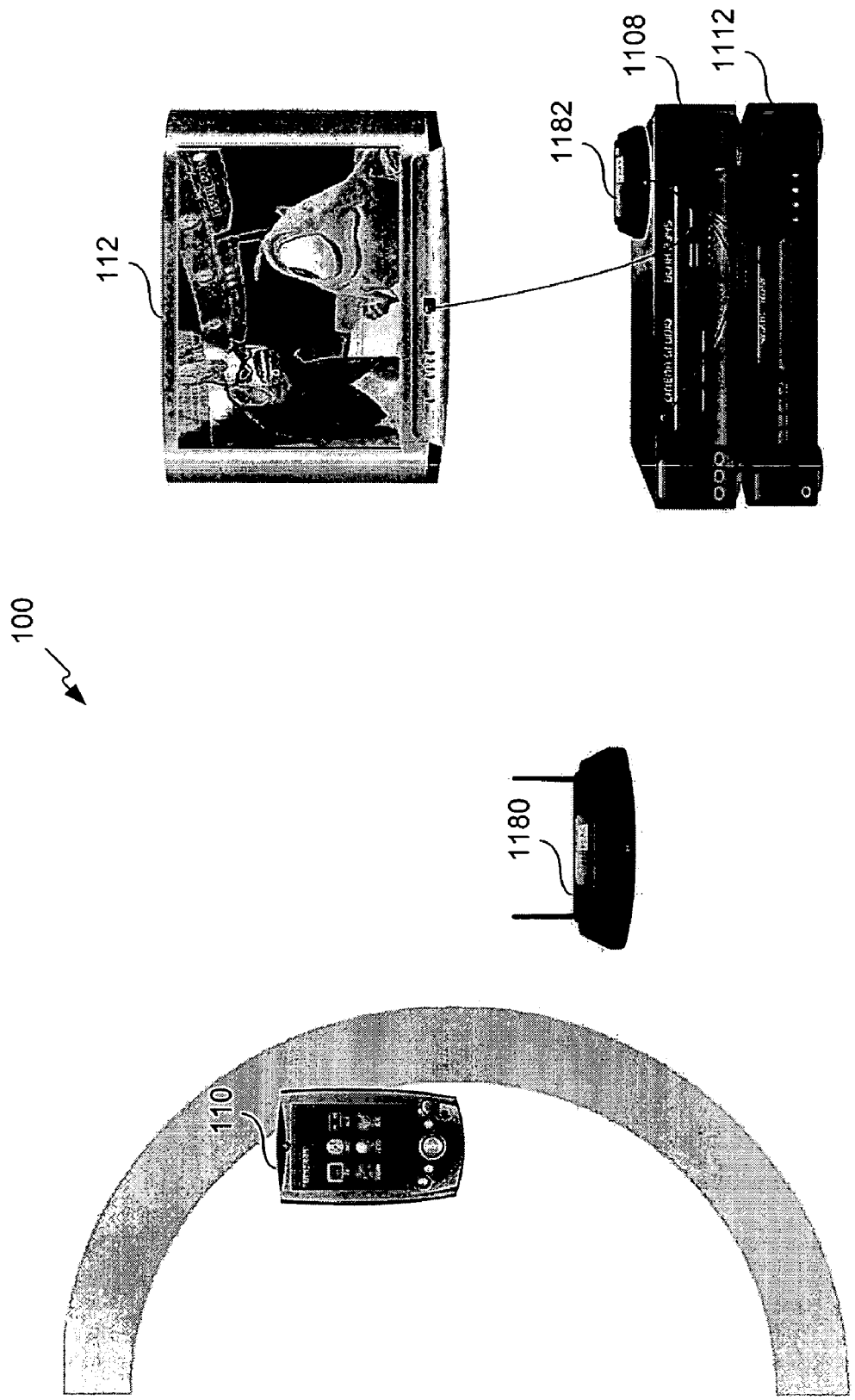
Figure 12:
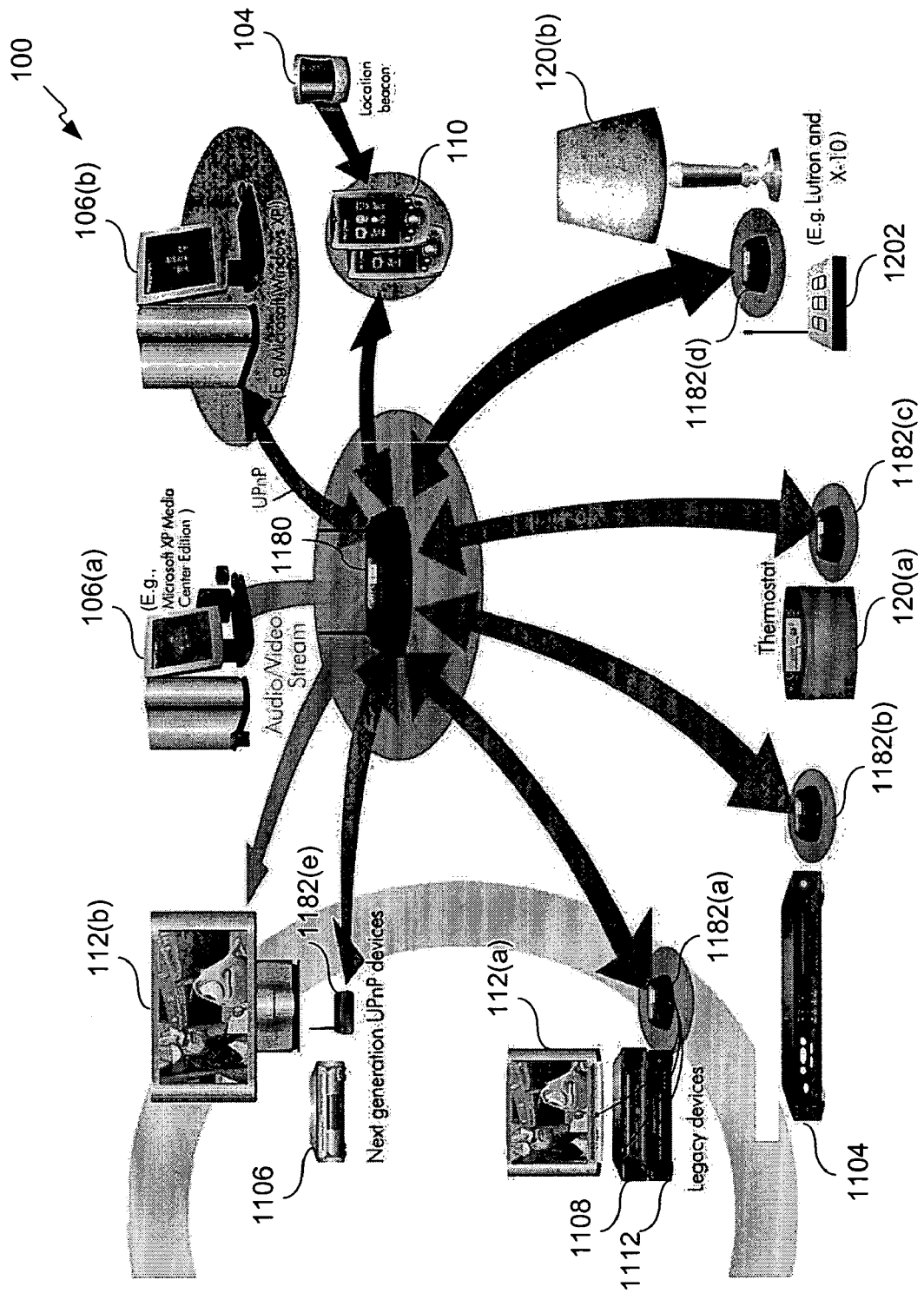
Figure 14:
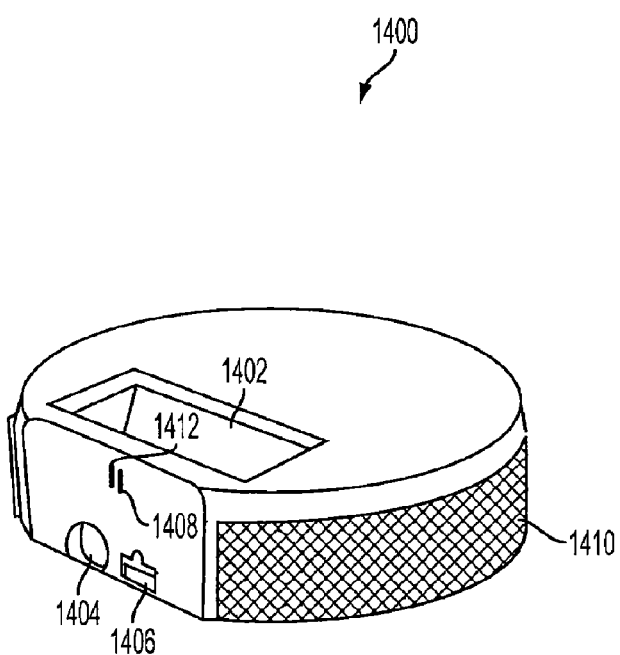
Figure 15:
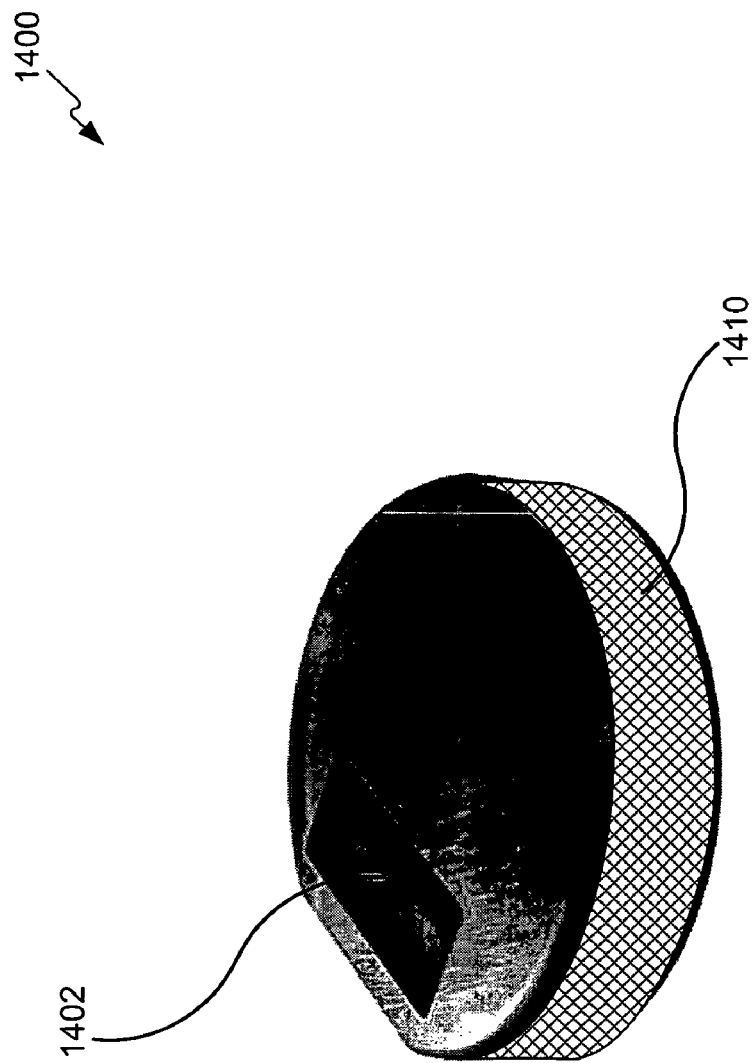
Figure 16:
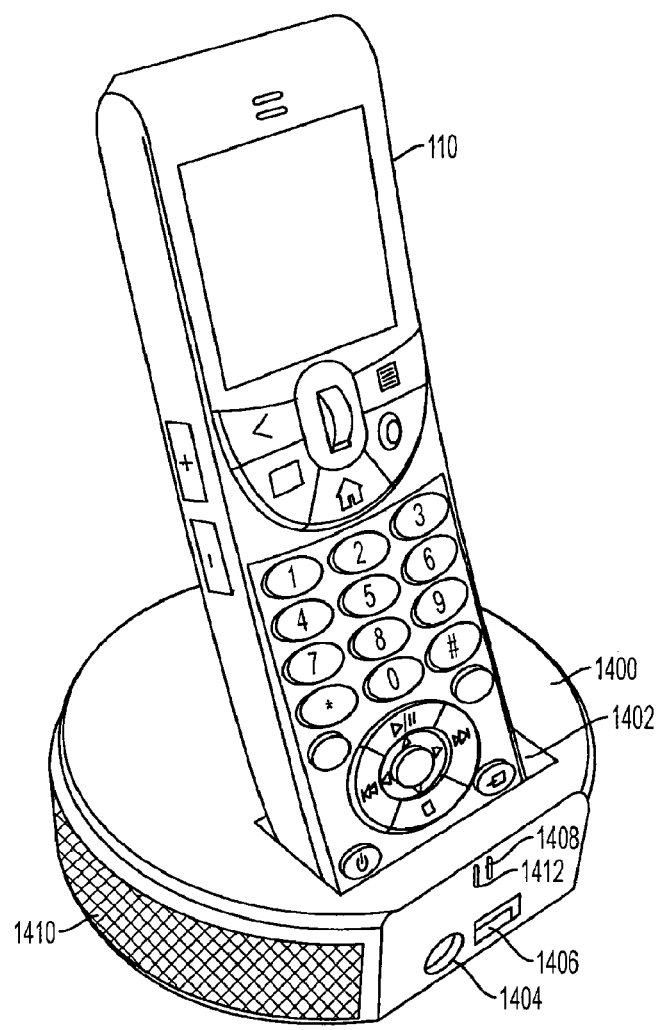
Figure 17A:
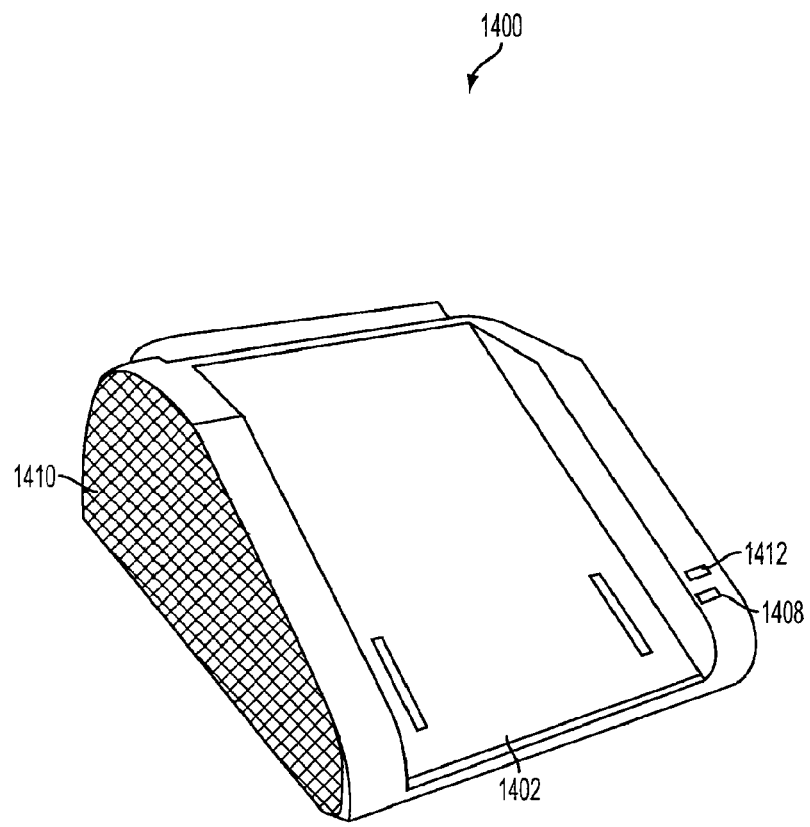
Figure 17B:
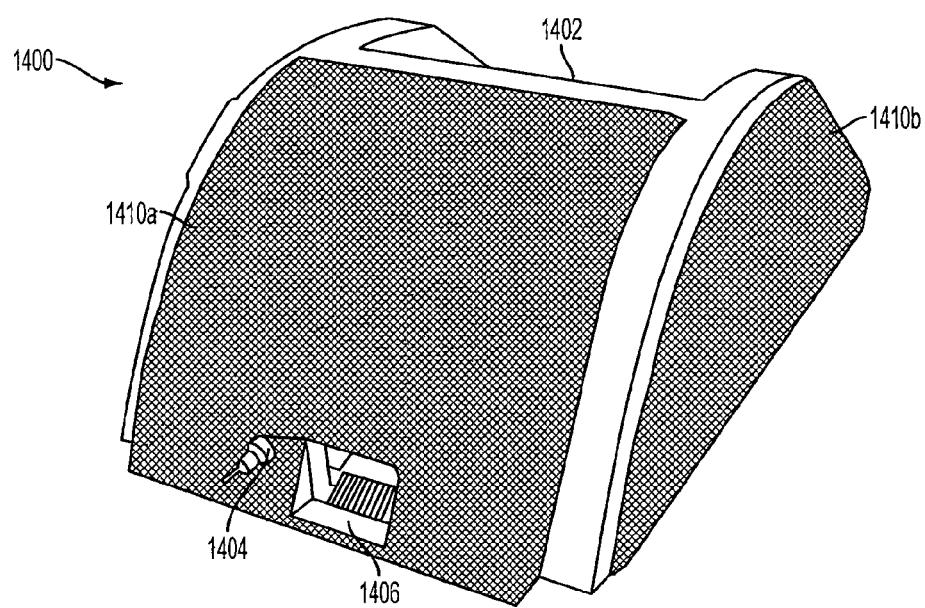
Figure 18:
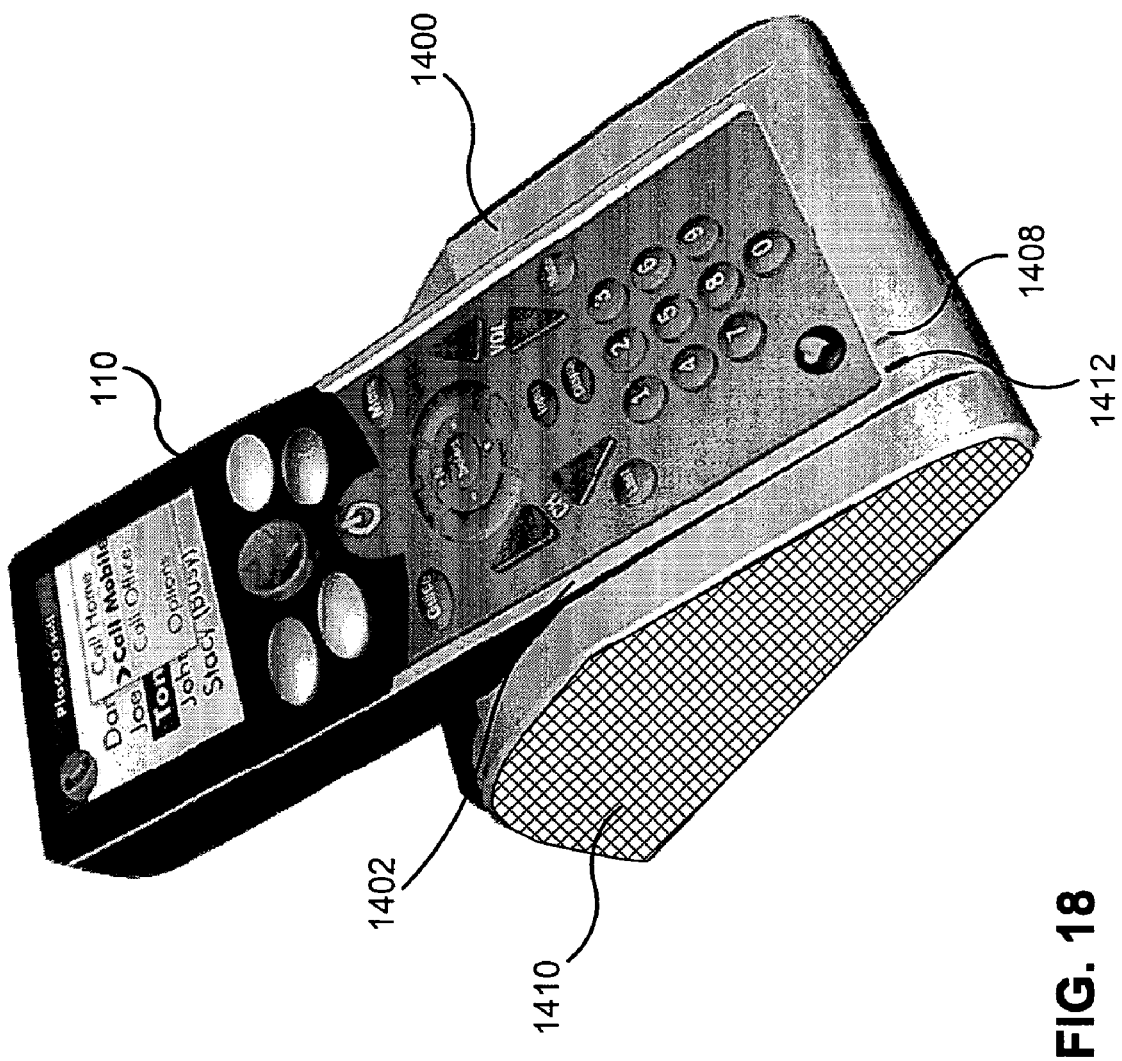
Figure 19:
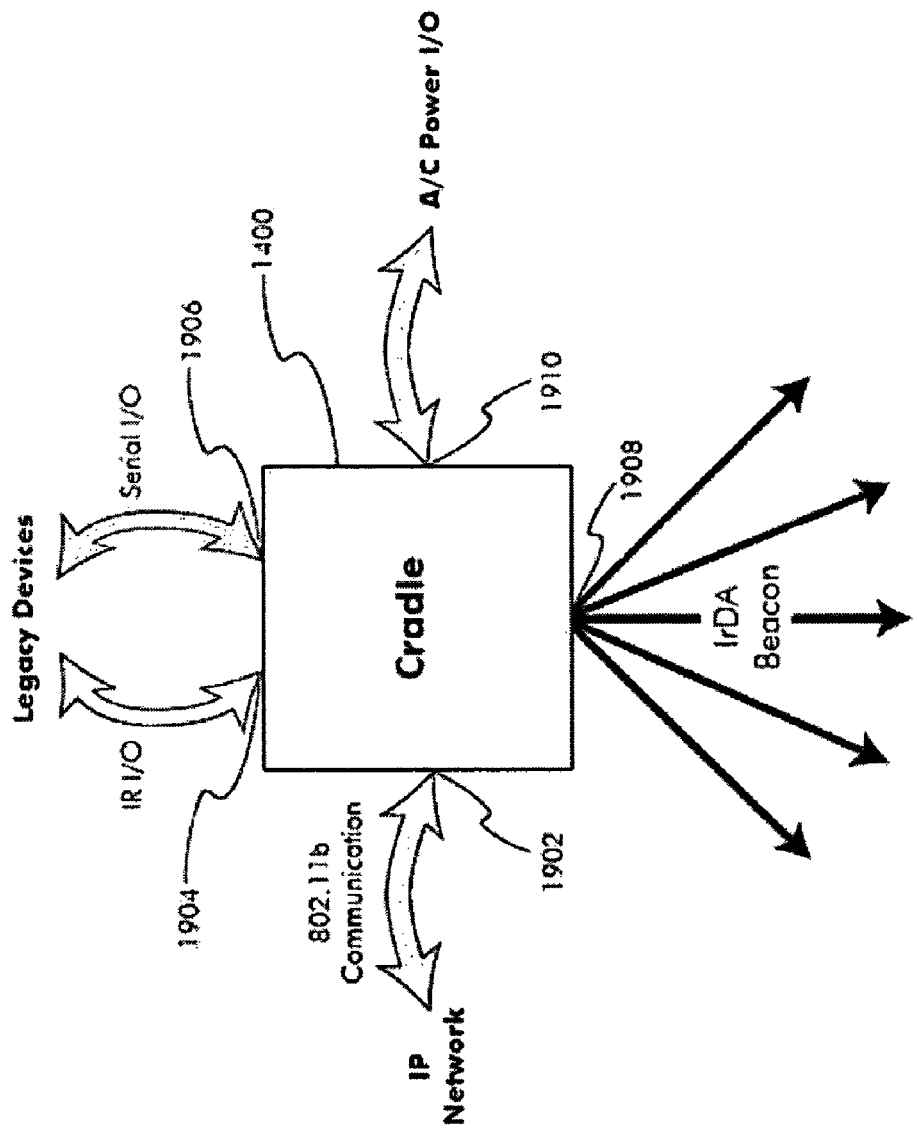
Figure 20:
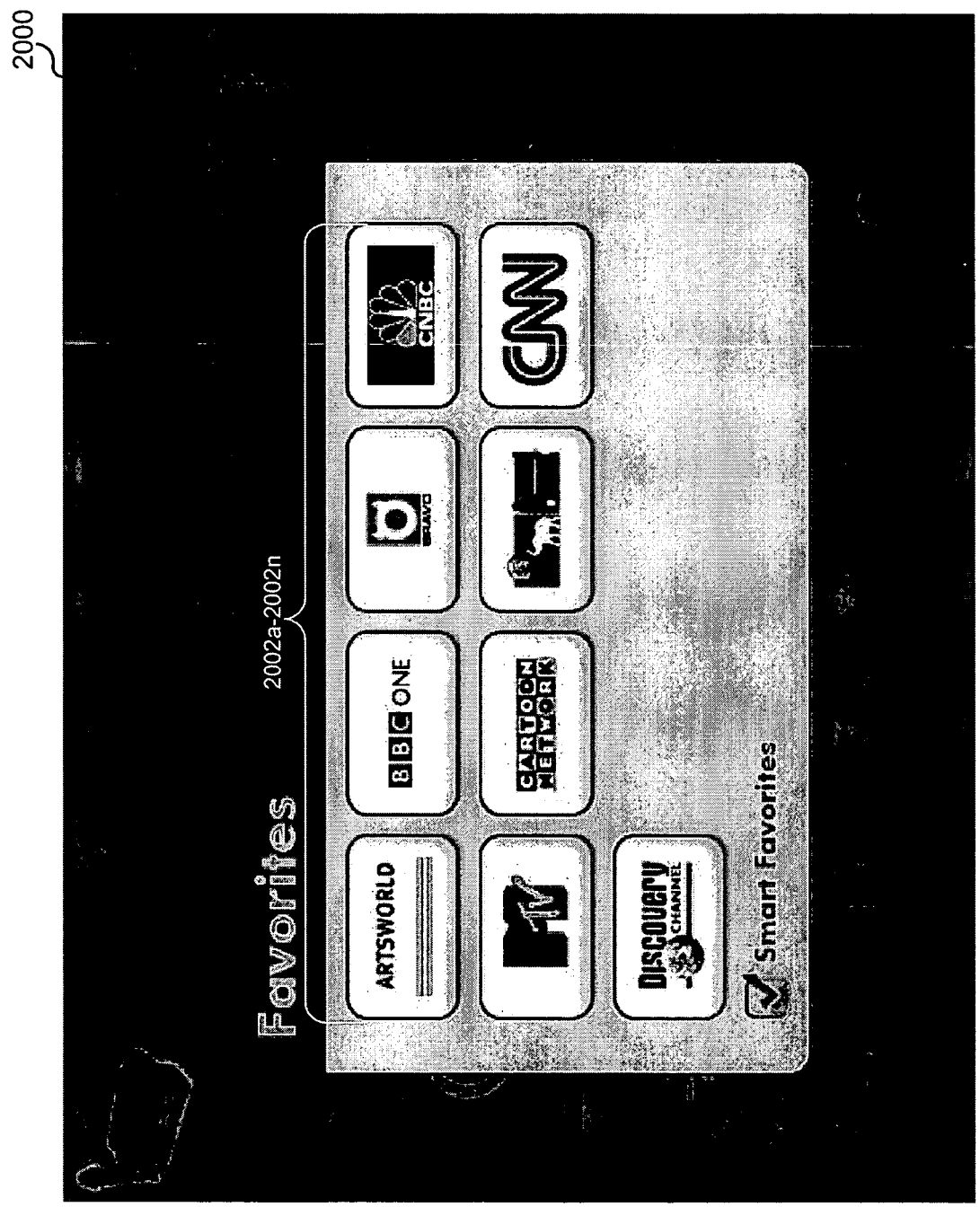
Figure 21:
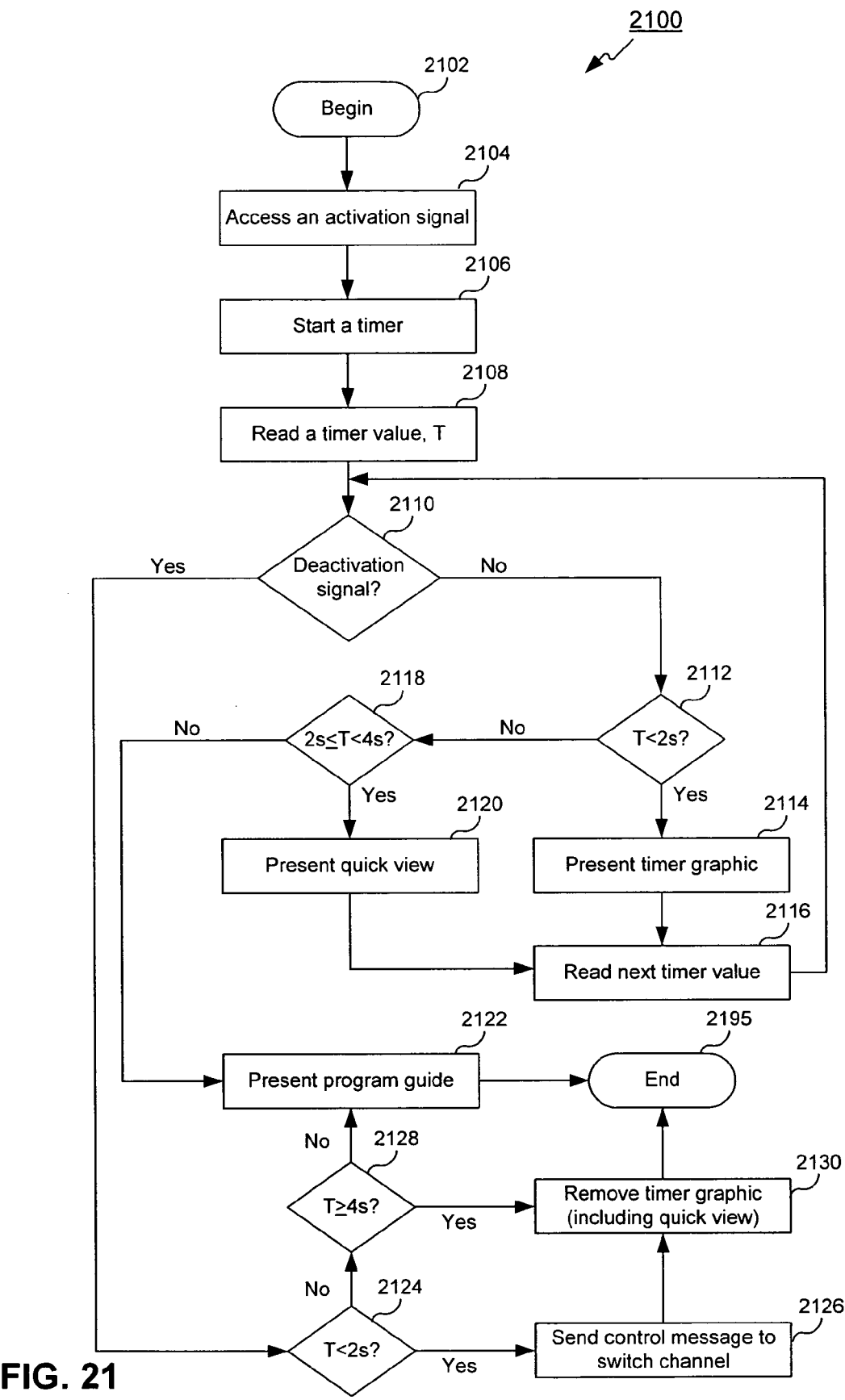
Figure 22:
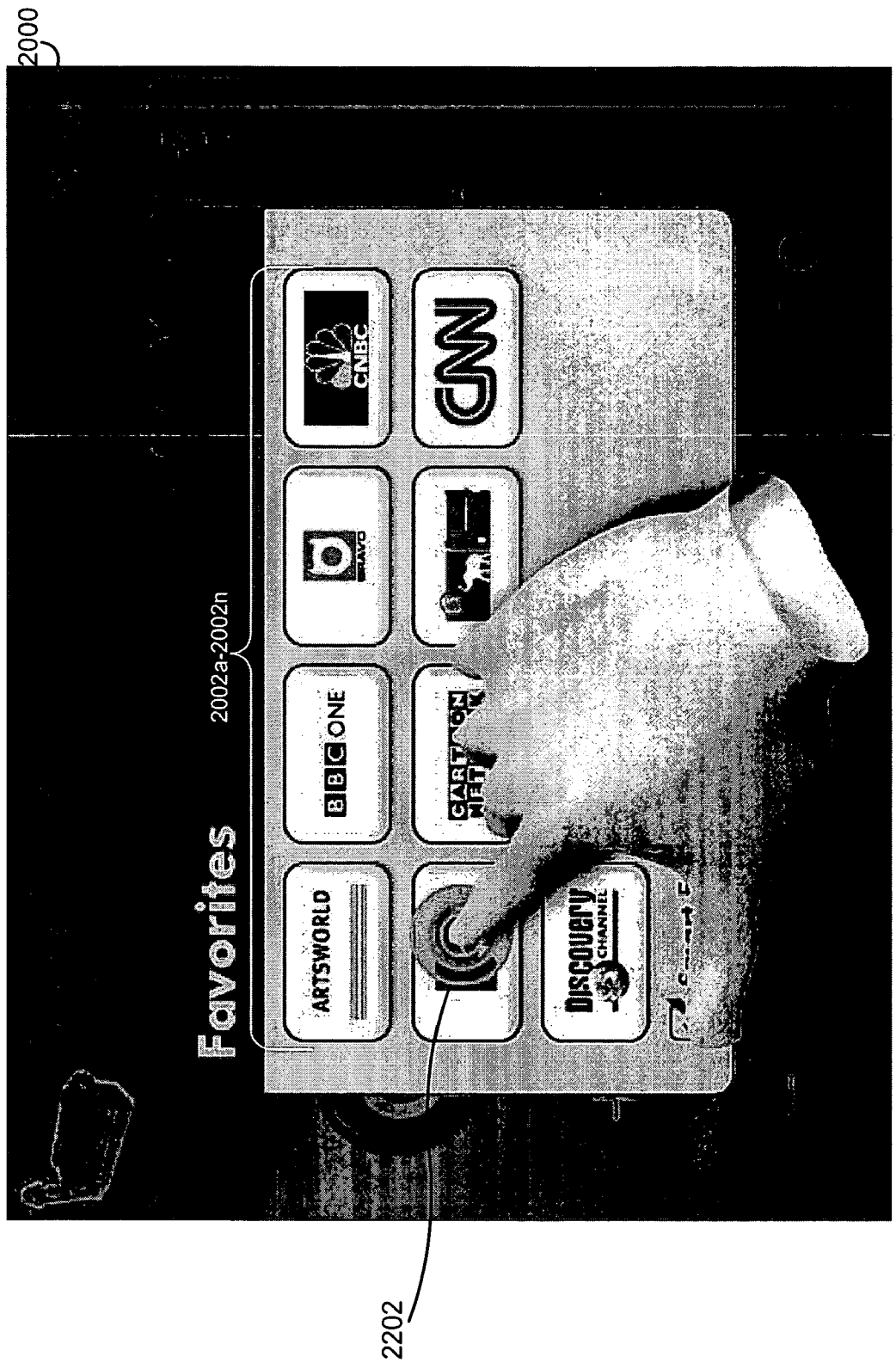
Figure 23:
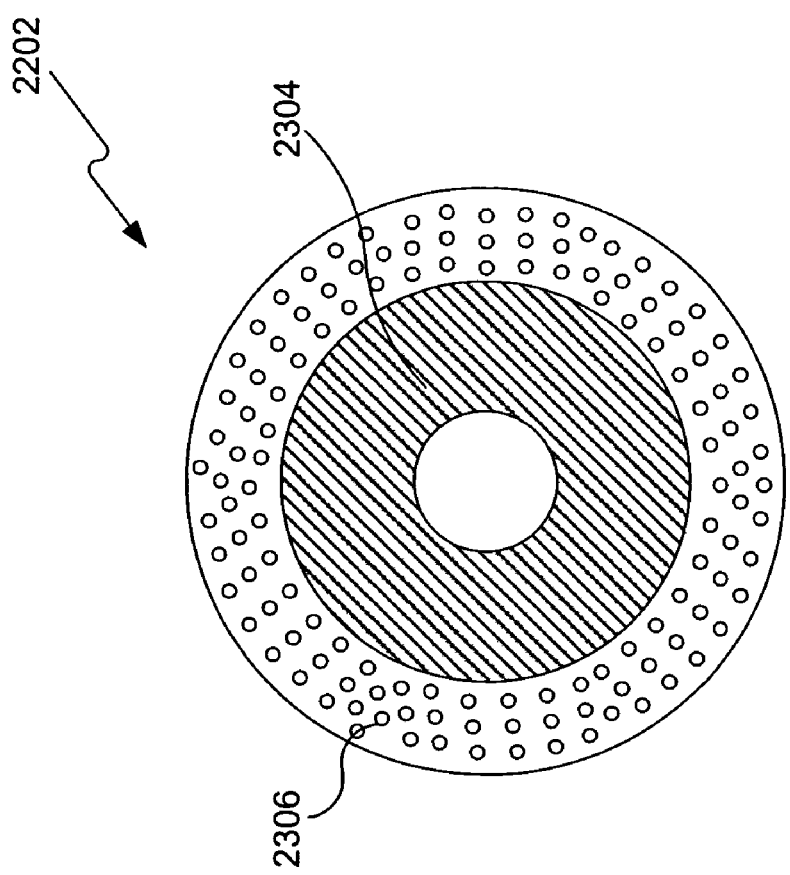
Figure 24:
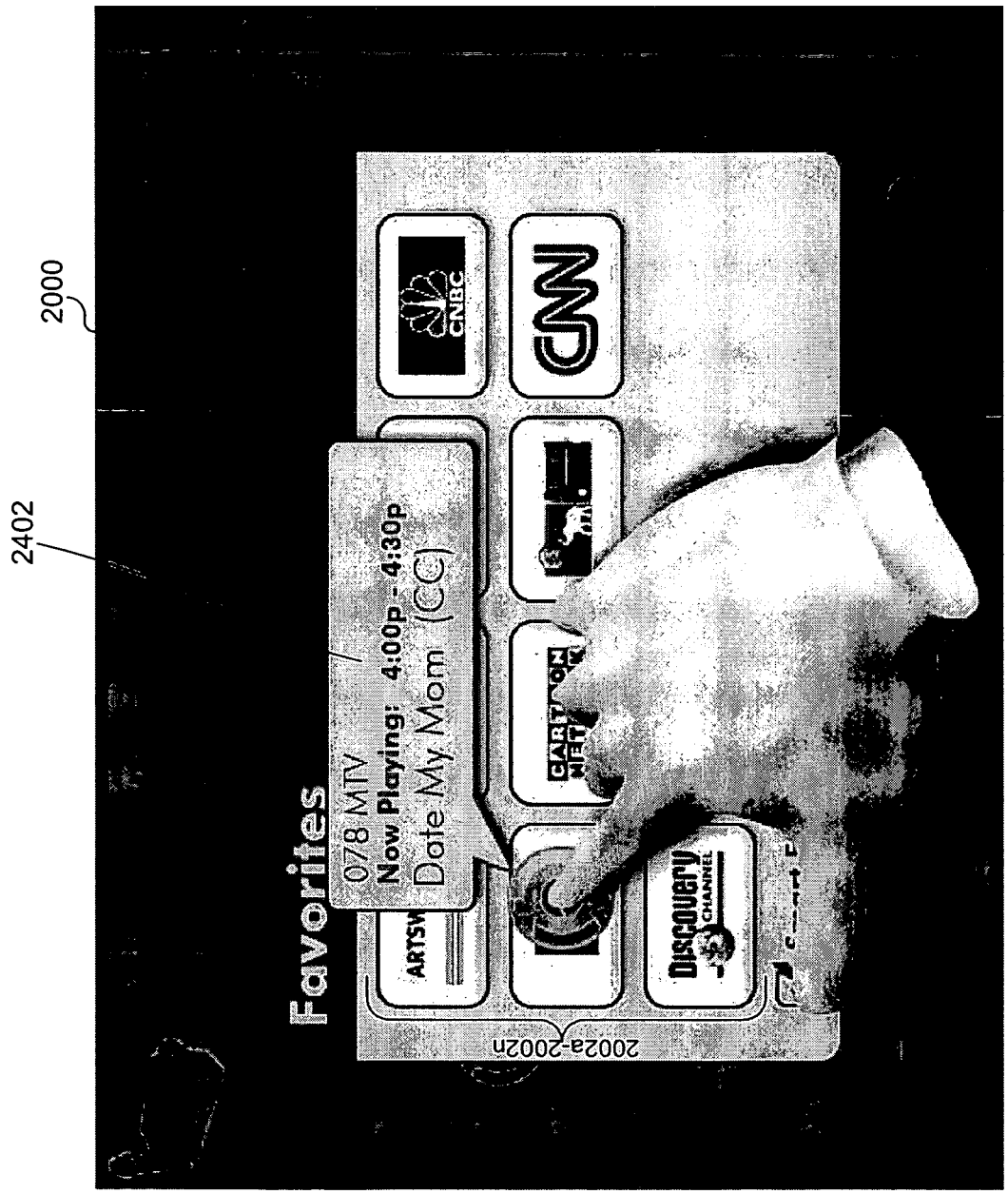
Figure 25:
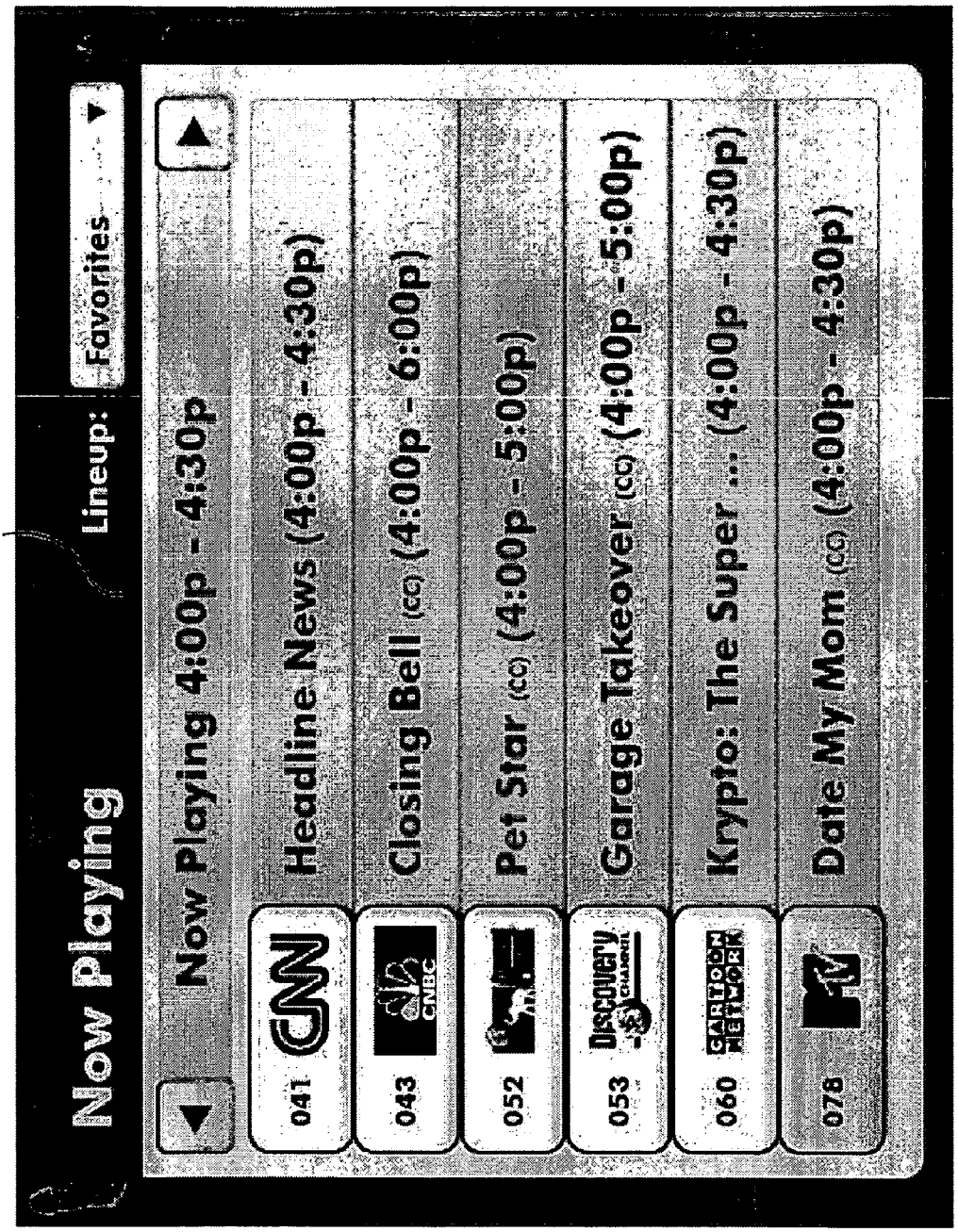
Figure 26:
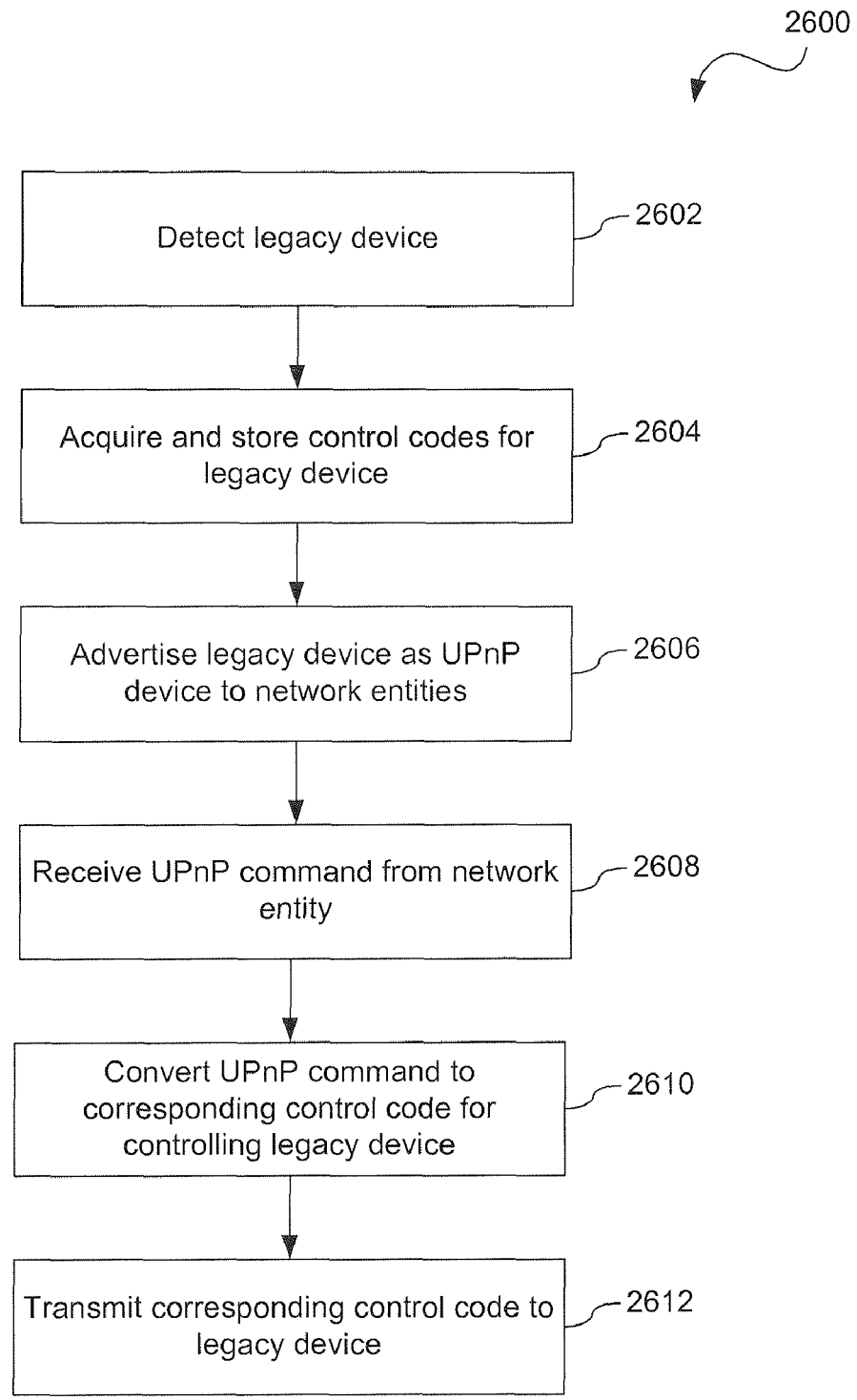

FIG. 1 illustrates a control system.
FIG. 2 illustrates a control server with archival and/or retrieval components.
FIG. 3 illustrates a control server.
FIG. 4A illustrates a positioning mechanism for a control system.
FIG. 4B illustrates another positioning mechanism for a control system.
FIG. 5 illustrates a flow diagram for tracking and/or monitoring system components.
FIG. 6 illustrates a flow diagram for commanding and/or controlling system components in response to user location.
FIG. 7 illustrates a user interface for presenting control options.
FIG. 8 is an example computer system useful for implementing the present invention.
FIG. 9 illustrates a flow diagram for defining a control macro to watch a movie recording.
FIG. 10 illustrates a flow diagram for activating the control macro of FIG. 9.
FIG. 11 illustrates another control system.
FIG. 12 illustrates another control system.
FIG. 13 illustrates another control system.
FIG. 14 illustrates a cradle for a controller client.
FIG. 15 illustrates another cradle for a controller client.
FIG. 16 illustrates another cradle for a controller client.
FIG. 17A illustrates another cradle for a controller client.
FIG. 17B illustrates another cradle for a controller client.
FIG. 18 illustrates another cradle for a controller client, and a controller client.
FIG. 19 illustrates another cradle for a controller client.
FIG. 20 illustrates an EPG interface.
FIG. 21 illustrates a flow diagram for presenting programming information.
FIG. 22 illustrates an EPG interface with a timer graphic.
FIG. 23 illustrates another timer graphic.
FIG. 24 illustrates a quick-view object.
FIG. 25 illustrates a jump-to-guide window.
FIG. 26 depicts a flowchart of a method for legacy device virtualization.

DETAILED DESCRIPTION OF THE INVENTION

| Table of Contents | |
|---|---|
| I. | System Overview |
| II. | Network Control System |
| III. | Control Server and Archive |
| IV. | Managing System Functions |
| V. | Location Awareness |
| VI. | Profiling Controller Client for Personalized Use |
| VII. | Exemplary System Implementation |

I. System Overview

This specification discloses one or more embodiments that incorporate features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art(s) to effect such feature, structure, or characteristic in connection with other embodiments whether or not explicitly described.

The present invention includes methodologies and/or techniques for the centralized command and control of a plurality of devices and/or applications within a controlled environment, such as a home, business, school, etc. Therefore in embodiments of the present invention, the controlled environment is a residential environment. The residential environment pertains to the confines of a home, apartment, mobile home, houseboat, or other types of residences. However in embodiments, the residential environment includes the surrounding area of the residence, as well as any shelters, constructs, improvements, or the like, within a designated perimeter.

In other embodiments, the present invention is implemented in non-residential environments. A non-residential environment includes, but is not limited to, an office complex, suite of small offices, production studio, warehouse, entertainment arena, health care facility, hotel, vacation resort, aircraft, ship, automobile, or the like. In embodiments, the controlled environment for the non-residential embodiments include not only the actual confines of the aforementioned structures but also their surroundings within a designated perimeter.

Within the controlled environment of the present invention, one or more computer servers, or the like, provide a centralized command and control center for distributing information (including video, audio, voice, text, graphics, control messages, etc.) to the other devices and/or applications. Such devices and/or applications include communications equipment (such as, telephones, intercoms, etc.), entertainment systems (such as, televisions, CD/DVD players, gaming applications, stereos, etc.), monitoring systems (such as, security cameras, baby monitors, etc.), safety/security systems (such as, fire alarms, sprinkler systems, locks on doors or windows, etc.), personal computers (such as, desktops, notebooks, notepads, personal digital assistants, etc.), cooking appliances (such as, ovens, coffee makers, electrical food/beverage warmers, etc.), comfort systems (such as, heating and air conditioning, humidifiers, dehumidifiers, air purifiers, light switches, light dimmers, etc.), power outlets, power supplies, or the like.

In an embodiment, a portable device (such as a digital personal assistant, wireless notepad, etc.) enables a user to interact with the centralized command and control center. Such interaction includes altering the configuration and performance of the other devices and/or applications within the controlled environment. Accordingly, the portable device provides remote access to other devices and/or applications, and enables the user to control their functions and/or operations from any location within the controlled environment.

For example, a user can operate the portable device to receive a recorded or live video from any location within the controlled environment. The video can be presented on a display coupled to the portable device or a monitor within the area that the user is presently located. Accordingly, the user would be able to watch a television program while lounging near a swimming pool or in a whirlpool bath. Additionally, the user would be able to view video from a baby monitor or a security camera on the portable display device or another display, such as a wireless notepad, desktop computer, television screen, etc.

In embodiments, a user is able to view or listen to media being presented on other televisions, personal computers, and/or audio systems. As such, a "parent" user can monitor television programs, web sites, and/or audio recordings that are being viewed by their children in other rooms. The present invention includes protocols that enable the parent user to block access to objectionable content.

In embodiments, a user is able to access the centralized command and control center through an external interface, such as the Internet. A user is able to gain access to devices and/or applications that are located within the controlled environment, while the user is travelling or at work. Therefore, the present invention permits a user to log into the controlled environment to download or store files, receive feeds from surveillance equipment, open or secure locks on entry ways, or the like.

II. Network Control System

As discussed above, the present invention can be implemented in residential and/or non-residential controlled environments. By way of example, the following embodiments are described with reference to a residential environment. However, it should be understood that the following embodiments could be modified to include non-residential environments as well.

FIG. 1 illustrates a network control system 100 according to an embodiment of the present invention. The present invention contemplates analog and digital environments. System 100 is a scaleable, relatively inexpensive, and versatile residential network. As shown, system 100 includes a communications network 180 that interconnects a plurality of system components. The system components include a telephone 102, a positioning unit 104, a computer client 106, a camera 108, a controller client 110, a television 112, a control server 114, a monitor 116, an audio client 118, and a residential appliance 120. Other devices and/or applications can also be included as a system component.

Control server 114 manages the distribution of information among the other system components. As described in greater detail below, control server 114 interacts with the other components to directly or indirectly distribute data (including audio and/or video), voice, and/or control messages over communications network 180. In an embodiment, control server 114 commands and controls the operation and/or functions of one or more of the other system components.

Telephone 102 is one or more wired and/or wireless telecommunications devices. Telephone 102 exchanges telecommunications signals over conventional residential telephone paths and communications network 180. In an embodiment, telephone 102 implements a voice over Internet Protocol (VoIP) to exchange voice communications over a computer network (such as the global Internet), and makes the voice signals available to communications network 180. In an embodiment, telephone 102 includes facsimile functions.

Positioning unit 104 designates spatial locations within the residence that serves as the hosting environment for system 100. Positioning unit 104 is coupled to the other system components (e.g., control server 114) via a wired and/or wireless interface. Positioning unit 104 is operable to designate a floor or room within the residence. Positioning unit 104 is also operable to designate a specific location within a floor or room. Moreover, positioning unit 104 can be situated outside of the residence to thereby, designate external areas of the residence. In an embodiment, positioning unit 104 is coupled to another system component. In another embodiment, multiple positioning units 104 are distributed throughout the residence. For example, the positioning units 104 can be located within, or mounted to, a wall, door, ceiling, floor, etc. Positioning unit 104 is further described below.

Computer client 106 includes a wired and/or wireless personal computer, personal digital assistant (PDA), enhanced telephone, personal television, or other data processing device linked to communications network 180. As a personal computer, computer client 106 can be a desktop, notebook, notepad, or the like. A display is coupled to computer client 106 to provide a text or graphical user interface (GUI) and enable a user to interactively communicate with control server 114. Input devices for computer client 106 include a keyboard, mouse, verbal command interface, mouse wheel, joystick, rudder pedals, touch screen, microphone, joystick, stylus, light pen, or any other type of peripheral unit.

Camera 108 is one or more video cameras, camcorders, or the like. The present invention contemplates both wired and wireless devices. Camera 108 can be a part of home security or monitoring system, such as a baby monitor, etc. In an embodiment, camera 108 includes a control unit that enables remote control of various camera functions, such as, pan, tilt, zoom, focus, iris control, etc.

Controller client 110 is a wired and/or wireless data processing device that enables a user to interact and send control messages to control server 114 and the other system components. Controller client 110 can be a portable or non-portable version of the devices listed as computer client 106. For example, computer client 106 can be a personal notebook or notepad computer, PDA, enhanced telephone, or other device linked to communications network 180 and including a display with the ability to interact with the other system components. Hence, controller client 110 enables a user to remotely control the operations of various components of system 100. In an embodiment, the display for controller client 110 is capable of receiving video and/or audio from the other system components. In an embodiment, controller client 110 includes a flash ROM that enables wireless downloads and/or uploads.

Television 112 can be a conventional television. In an embodiment, television 112 is enhanced to support interactive and/or personal services. Personal services include virtual recording, programming, pausing/rewinding live broadcasts, or the like. For example, television 112 can be a personal television enhanced to support the MSN® TV service, hosted by WebTV Networks, Inc. (Mountain View, Calif.), that supports WebTV® available from Microsoft Corporation (Redmond, Wash.). In an embodiment, television 112 includes a set-top box for cable and/or satellite receptions. In an embodiment, television 112 is connected to a PVR, VCR, or DVD player.

Monitor 116 is a wired or wireless display that supports closed-circuit viewing. In an embodiment, monitor 116 is a flat LCD positioned on a wall, standing on a desk, table, or counter top, situated near the side of pool or hot tub, etc. In an embodiment, monitor 116 receives a streaming screen saver that displays static or dynamic images of a photograph, portrait, etc. when monitor 116 is functioning in an inactive state. In an embodiment, monitor 116 receives feeds from a television, stereo, or security/monitoring system (e.g., a baby monitor), etc., when monitor 116 is in an active state.

Audio client 118 is a wired or wireless audio system, such as a stereo, audio server, CD/record/cassette player, MP3 player, etc. Audio client 118 can be a microphone as part of a security/monitoring system, such as a baby monitor. In an embodiment, audio client 118 is one or more speakers or like audio outputs located throughout the residence. In another embodiment, audio client 118 is an intercom system, public announcement system, door answering service, or the like.

Residential appliance 120 is one or more residential appliances, such as, but not limited to, a refrigerator, stove, microwave, toaster, coffee-maker, alarm clock, thermostats, humidifiers, sprinkler system, lighting, light dimmers, etc. In an embodiment, control server 114 and/or controller client 110 controls the operations and/or functions of one or more residential appliances 120, such as on/off, timers, modulation (e.g., oven temperatures, etc.), pause, snooze, etc.

The aforementioned system components are not intended to be exhaustive. Other devices (including appliances), applications, and/or the like can be implemented and are deemed to be within the scope of the present invention.

As discussed, communications network 180 provides a transmission medium for communicating among the system components. In embodiments, control server 114 polices traffic among the other system components. As such, the exchange of information among the system components is routed or otherwise controlled via control server 114. In another embodiment, communications network 180 supports peer-to-peer communications. As such, the system components exchange audio, video, other data, and/or control messages directly with each other and without being centrally managed by control server 114. Therefore, the present invention can be implemented without control server 114. In such de-centralized embodiments, the control and management functions for the communications network 180 are distributed and shared by multiple system components so that the system components can communicate with each other over a wired and/or wireless medium without a central control server 114.

Communications network 180 is a wired and/or wireless local area network (LAN). Thus, communications network 180 includes wired, wireless, or both transmission media, including satellite, terrestrial (e.g., fiber optic, copper, UTP, STP, coaxial, hybrid fiber-coaxial (HFC), or the like), radio, microwave, free-space optics, and/or any other form or method of transmission.

In an embodiment using a wired transmission medium, communications network 180 is an Ethernet LAN capable of supporting, for example, one hundred Mbps to one Gbps. In an embodiment, a CAT-5 cable, or the like, is coupled to control server 114 and is distributed to a location within each room. In an embodiment, the cable is distributed to each system component, such as television 112, monitor 116, etc. The system component includes an audio/video (AV) connector that is responsive to receive the cable.

In an embodiment using a wireless transmission medium, communications network 180 supports the IEEE standard 802.11(a) which specifies a wireless Ethernet protocol for large-sized video. Using this protocol, communications network 180 can handle up to fifty-four Mbps with an effective range of ninety feet.

In another wireless embodiment, communications network 180 supports the IEEE standard 802.11(b) which specifies a wireless Ethernet protocol for small-size video. With this wireless protocol, communications network 180 is effective for ranges approximating 150-300 feet, and capable of supporting a nominal bandwidth of eleven Mbps, with 4-5 Mbps effective bandwidth. In another embodiment, communications network 180 supports the IEEE 802.16 WirelessMAN® standard for wireless metropolitan area networks. In another embodiment, the Bluetooth™ wireless technology (developed by Bluetooth SIG, Inc.) is used to support short-range wireless interfaces with system 100.

In an embodiment, communications network 180 includes a telephone line and/or powerline. In an embodiment, communications network 180 enables conventional electrical outlets and wiring to interconnect the system components and enable them to communicate with each other. In an embodiment, communications network 180 includes communications technologies made available from the Home Phone Networking Alliance (HomePNA) or the like. HomePNA technologies enable the operation of telephone services and home networking, including, but not limited to, video conferencing, video security, VoIP telephony, digital video networking, internet sharing, and multi-user gaming.

As discussed above, communications network 180 includes a central control server 114 to enable the system components to communicate with each other. In embodiments of the present invention, any platform that is relatively small in physical size, has access to power lines for continuous and uninterrupted electrical power, and is physically located to facilitate transmission and reception of wireless signals is suitable for providing housing, hosting, or the like for central control server 114. FIG. 11 illustrates an embodiment of network control system 100 that includes a wireless network access point 1180, such as those available from Linksys Group Inc. (Irvine, Calif.) or Cisco Systems, Inc. (San Jose, Calif.), as a platform for control server 114. Wireless access point 1180 provides control server 114 (FIG. 1) with a central point for connectivity in a wireless network and always-on connectivity necessary for tracking states of the system components. Additionally, wireless access point 1180 can provide a connection point between a wired and wireless network.

In FIG. 11, the system components include controller client 110, television 112, a media player 1112, and a cable box 1108. Other system components having external control interfaces (e.g., cable or IR) can be included, such as telephone 102, positioning unit 104, computer client 106, camera 108, control server 114, monitor 116, audio client 118, residential appliance 120, and the like.

The network illustrated in FIG. 11 also includes an infrared/serial bridge 1182. In an embodiment, infrared/serial bridge 1182 complies with the IEEE 802.11(b) standard for wireless communications. Infrared/serial bridge 1182 exchanges infrared signals with stand-alone system components, such as television 112, cable box 1108, and media player 1112.

FIG. 12 illustrates another embodiment of network control system 100, which includes a plurality of infrared/serial bridges 1182(*a*)-1182(*e*). Other devices in the network control system 100 may not require an infrared/serial bridge. For example computer client 106(*a*) operating Microsoft XP Media Center Edition™ (owned by Microsoft® Corporation and computer client 106(*b*) operating Microsoft Windows XP™ (owned by Microsoft Corporation) may connect and communicate directly with wireless access point 1180. Each infrared/serial bridge 1182(*a*)-1182(*e*) interacts with one or more stand-alone components. As shown, infrared/serial bridge 1182(*a*) interacts with television 112(*a*), cable box 1108, and media player 1112. Infrared/serial bridge 1182(*b*) interacts with a tuner 1104 or any type of proprietary Ethernet device as would be apparent to one skilled in the relevant art(s). Infrared/serial bridge 1182(*c*) interacts with a residential appliance 120(*a*), namely a thermostat for a HVAC system. Infrared/serial bridge 1182(*d*) interacts with another residential appliance 120(*b*), namely a lamp using Lutron™ (owned by Lutron electronics Co., Inc.) or X10™ (owned by X10 Ltd. Corporation) protocols. Infrared/serial bridge 1182 (*e*) interacts with television 112(*b*) and a DSS box 1106.

As such, the present invention can integrate legacy devices (e.g., consumer electronic devices that rely on infrared/serial communication protocols), as well as UPnP™ (owned by UPnP Forum) devices and applications defined by the Universal Plug and Play (UPnP) Forum™ (owned by UPnP Forum), as system components. An example of a controlled environment implementing an IEEE 802.11(b) infrared/serial bridge is described in the application entitled "Legacy Device Bridge for Residential or Non-Residential Networks" (U.S. Patent App. Ser. No. 60/438,296; filed Jan. 7, 2003), which is incorporated herein by reference as though set forth in its entirety.

A legacy device bridge in accordance with an embodiment of the present invention is configured to prevent communication between the legacy device bridge and more than one control server. This could occur, for example, where multiple control servers are sharing, either advertently or inadvertently, a wireless network (for example, in a WLAN, they share the same SSID (Service Set Identifier)). Such an overlap may expose a network-controlled environment to undesired outside control, such as control by a neighbor.

In an embodiment, the legacy device bridge avoids this problem by storing the network address of the first control server that contacts the bridge after it is connected to the network. Then, future incoming packets received from any other address are discarded. In an alternate embodiment, the address of the control server is configured out-of-band. For example, the address of the control server may be provided to the legacy device bridge using IR or serial communication with a corresponding IR or serial interface. After the address has been so configured, incoming packets received from any other address are discarded.

In an embodiment of the present invention, the legacy device bridge is adapted to act as a room controller. In accordance with such an embodiment, the legacy device bridge is adapted as follows: (1) the legacy device bridge is adapted to automatically configure itself in most home networking environments, although some cases may require direct user intervention in order to configure the bridge; (2) to facilitate ease of use, the legacy device bridge is adapted for IrDA out-of-band configuration, e.g., the legacy device bridge can be programmed to accept network configuration parameters from an IR port using industry-standard data transmission protocols; and (3) the legacy device bridge is adapted to learn new legacy device codes, such as IR or serial control codes. For example, although a sizable body of IR codes exist in commercial databases, the broad range of available consumer electronic devices make claims of absolute compatibility difficult. Thus, in order to guarantee interoperability with legacy consumer electronic devices, a legacy device bridge in accordance with an embodiment of the present invention is adapted to be placed in a state where it can receive and store new IR or serial control codes. In an embodiment, the IR or serial control codes may be transmitted by another device, such as an IR remote control device. The legacy device bridge may store learned codes internally or upload them to a server on the network for storage.

FIG. 26 depicts a flowchart 2600 of a method for legacy device virtualization, advertisement and control in accordance with an embodiment of the present invention. At step 2602, a virtualization appliance detects a legacy device, such as a consumer electronic device, that it will control. By detecting legacy devices, the virtualization appliance builds a list of legacy devices under its control. In an embodiment, the virtualization appliance is made aware of a legacy devices through manual programming of the virtualization appliance by a user. In an alternate embodiment, the virtualization appliance detects a legacy device through an automatic process, such as two-way IR queries between the virtualization appliance and a legacy device. At step 2604, the virtualization appliance acquires and stores control codes for the legacy device. In an embodiment, these control codes are obtained through manual programming of the virtualization appliance by a user. In an alternate embodiment, the virtualization appliance obtains the control codes through an automatic process, such as two-way IR queries between the virtualization appliance and a legacy device. At step 2606, the virtualization appliance advertises the legacy device to the network as a UPnP device possessing attributes and controls similar to the legacy device it is masquerading for. In an embodiment, this step includes publishing a list of standard UPnP commands for controlling the legacy device, wherein the published UpnP commands correspond to one or more of the low-level legacy device codes acquired in step 2604. As a result of this step, entities on the network perceive the virtualization appliance as a piece of IP-addressable and controllable consumer electronics. At step 2608, a network entity transmits a standard UPnP command, such as "Power On" or "Power Off", to control the legacy device, and this UPnP command is received by the virtualization appliance. At step 2610, the virtualization appliance converts the UPnP command to a corresponding control code for the legacy device, and at step 2612, the virtualization appliance transmits the corresponding control code to the legacy device. By converting UpnP commands to legacy device control codes in this manner, the virtualization appliance acts as a transparent proxy between network entities and the legacy device.

FIG. 13 illustrates another embodiment of network control system 100, which includes a smoke detector 1380. Smoke detector 1380 includes a network interface card 1382 which enables smoke detector 1380 to serve as yet another platform for control server 114, providing the control server with HomePNA and/or wireless (e.g., IEEE 802.11) network connectivity. By taking advantage of the smoke detector's location and access to power lines, the control server can send data and/or control messages throughout the controlled environment either through a wireless connection or through the power line. Since most smoke detectors are presently hardwired into the home or office power line, the smoke detector platform also provides always-on connectivity for control server 114. Another advantage of using a smoke detector as a platform for control server 114 is that smoke detectors can be ceiling mounted to facilitate a greater communications range.

FIG. 14 illustrates another device that can be used as a platform for control server 114. The device shown is a cradle 1400 for a remote control unit, such as controller client 110, or another system component. Alternative views of cradle 1400 are illustrated in FIG. 15 and FIG. 16. Cradle 1400 contains a receptacle 1402 for holding the remote control unit or other device. Receptacle 1402 provides an integrated charging base for the remote control or other device. Power supply port 1404 supplies power to the remote control when it is docked in receptacle 1402. Power from power supply port 1404 is converted to DC power. Power supply port 1404 also provides connectivity with a HomePNA/powerline network.

Cradle 1400 also includes an Ethernet interface 1406 for enabling network connectivity. Additionally, cradle 1400 has a wireless interface for enabling wireless network connectivity, such as WiFi (i.e., IEEE standard 802.11(a) or (b)). Cradle 1400 also has an IR interface 1410 to communicate via IR signals. Cradle 1400 may have other transmission and data ports (e.g., serial (RS-232) or USB) and network interfaces (e.g., HomePNA/powerline). Such connectivity enables cradle 1400 to serve as a bridge for converting packet-based data signals (e.g., WiFi) to IR or serial signals. Cradle 1400 includes LED indicators indicating power 1408 and network-connectivity status 1412 of the cradle.

Another embodiment of cradle 1400 is illustrated in FIGS. 17A, 17B, and 18. FIG. 19 depicts a cradle in accordance with an embodiment of the present invention. As shown in FIG. 19, cradle 1400 includes a wireless interface 1902 (such as an 802.11b transceiver) for providing wireless connectivity to an IP network. Cradle 1400 includes an IrDA™ (owned by Infrared Data Association Corporation) beacon 1908 as an interface for communicating with IR-enabled legacy devices. Cradle 1400 contains one or more infrared interfaces 1904 for communicating with IR-enabled legacy devices. Cradle 1400 contains one or more serial interfaces 1906 for communicating with serial-enabled legacy devices. Cradle 1400 includes a power supply interface 1910 for communicating via a HomePNA/powerline network.

IR interface 1410 (see FIGS. 14-18) can include IRDA beacon 1908. In an embodiment, IR interface 1410 comprises an IR transmitter adapted for wireless one-way communication with IR-capable legacy devices. In an alternate embodiment, IR interface 1410 comprises an IR transmitter/receiver pair, or IR transceiver, adapted for wireless two-way communication with IR-capable legacy devices. In accordance with these embodiments, wireless IR communication with a legacy device is achieved by cradle 1400 in a location that is along a clear line-of-sight path to and within a certain predefined transmission range of the legacy device.

In an alternate embodiment, IR interface 1904 comprises an interface adapted for wired communication with a legacy device by means of, for example, an IR dongle. In accordance with this alternate embodiment, the cradle 1400 need not be situated in any particular location for effective communication with the legacy device.

Smoke detector 1380, wireless network access point 1180, and cradle 1400, described herein, are representative devices that can be used as platforms for control server 114. As described above, any other device, including, but not limited to, a stand alone computer, remote control device, power device (including power strip, power conditioner, power outlet, power supply, etc.), set-top box, cable box, router, bridge, or the like, could be included and would not change the scope of the invention. Any presently available or future developed device can be used that has "always-on" functionality (i.e., access to continuous and uninterrupted electrical power) and is positioned to facilitate wireless communications with the other system components. Such devices can include, or be modified to receive, a network interface card (e.g., network interface card 1382) to enable platform functionality.

It should also be understood that wireless network access point 1180 can be hosted on any type of "always-on" platform having wireless or wired network connectivity (such as, a smoke detector, ceiling fan, etc.). As such, the platform would provide wireless access point (WAP) functionality in addition to and without interfering with its traditional functionality. By taking advantage of the existing wiring for a smoke detector, for example, an access point (e.g., wireless network access point 1180) can be mounted in tandem with the smoke detector. The two can be packaged into the same plastic housing. A wireless access point generally requires an Ethernet connection to bridge it to a wired Ethernet network (which, in turn, may be connected to a cable or DSL modem). If the Ethernet wiring is not present at the site of the smoke detector, the wireless access point may be used in a repeater mode, extending the range of another wireless access point that has an Ethernet connection (see, for example, signal repeater 1202, described herein with reference to FIG. 12).

Smoke detector 1380 is a representative device that can be used as a platform for wireless network access point 1180. WAP functionality can be integrated into any other device connected to a power source, including, but not limited to, a ceiling fan, light fixture, wall switch, carbon dioxide detector, wall outlet, or the like. In an embodiment employing powerline networking, a powerline bridge and wireless access point can be integrated together, avoiding the need to operate solely in repeater mode.

III. Control Server and Archive

Control server 114 is one or more servers, with each server being one or more computers providing various shared resources with each other and to other system components. The shared resources include files for programs, web pages, databases and libraries; output devices, such as, printers, plotters, display monitors and facsimile machines; communications devices, such as modems and Internet access facilities; and other peripherals such as scanners, etc. The communications devices can support wired or wireless communications, including satellite, terrestrial (fiber optic, copper, coaxial, and the like), radio, microwave, free-space optics, and/or any other form or method of transmission.

In an embodiment, control server 114 is configured to support the standard Internet Protocol (IP) developed to govern communications over public and private Internet backbones. The protocol is defined in Internet Standard (STD) 5, Request for Comments (RFC) 791 (Internet Architecture Board). Control server 114 also supports transport protocols, such as, Transmission Control Protocol (TCP), User Datagram Protocol (UDP), Real Time Transport Protocol (RTP), or Resource Reservation Protocol (RSVP). The transport protocols support various types of data transmission standards, such as File Transfer Protocol (FTP), Hypertext Transfer Protocol (HTTP), Simple Network Management Protocol (SNMP), Network Time Protocol (NTP), or the like.

In an embodiment, control server 114 is configured to support various operating systems, such as, the Netware™ operating system available from Novell, Inc. (Provo, Utah); the MS-DOS® and Windows® operating systems available from Microsoft Corporation; the Linux® operating system available from Linux Online Inc. (Laurel, Md.); the Solaris™ operating system available from Sun Microsystems, Inc. (Palo Alto, Calif.); or the like as would be apparent to one skilled in the relevant art(s).

Control server 114 is operable to query, receive, and/or write to various archival and/or retrieval components. The archival and/or retrieval components can be internal and/or external to control server 114. For example, control server 114 is configured to receive compressed streams, filter the streams for metadata (such as, date, time, source, etc.), and store the streams and metadata for future retrieval.

FIG. 2 shows control server 114 connected to various archival and/or retrieval (A/R) components according to an embodiment of the present invention. The A/R components include a media archive 202, a tuner 204, a DSS box 206, a cable box 208, a media changer 210, and a media player 212. The aforementioned archival and/or retrieval components are not intended to be an exhaustive listing. Other archival and/or retrieval components can be implemented and are deemed to be within the scope of the present invention.

The archival and/or retrieval components can be centrally located (as shown in FIG. 2), widely distributed throughout the residence, or accessible from an external source (such as, a web server communicating over the global Internet) via a network connection 280. Network connection 280 includes a wired and/or wireless LAN or wide area network (WAN), such as an organization's intranet, a local internet, the global-based Internet (including the World Wide Web (WWW)), an extranet, a virtual private network, licensed wireless telecommunications spectrum for digital cell (including CDMA, TDMA, GSM, EDGE, GPRS, CDMA2000, WCDMA FDD and/or TDD or TD-SCDMA technologies), or the like. Network connection 280 includes wired, wireless, or both transmission media, including satellite, terrestrial (e.g., fiber optic, copper, UTP, STP, coaxial, hybrid fiber-coaxial (HFC), or the like), radio, free-space optics, microwave, and/or any other form or method of transmission.

Media archive 202 provides one or more storage mediums for various data (including video and audio) and metadata. In embodiments, media archive 202 includes a removable storage unit (e.g., floppy disk, CD-ROM, etc.), as described in greater detail below. To support larger volumes of content, one or more integrated databases or a data warehouse system is used to store the content and support control server 114, as described herein.

In embodiments, media archive 202 includes a relational or object oriented (OO)/component based database management system, or the like, that controls the storing, retrieving, and updating of data and metadata in the database records. The database management system also controls data integration, enforces integrity rules and constraints (including data integrity and referential integrity), and enforces security constraints.

In embodiments, media archive 202 is a scalable system that stores data on multiple disk arrays. Data warehousing can be implemented with the SQL Server 2000 application available from Microsoft Corporation, the Oracle 9i™ database available from Oracle Corporation (Redwood City, Calif.), or the like. In embodiments, media archive 202 supports Open DataBase Connectivity (ODBC) or Java DataBase Connectivity (JDBC) protocols.

In embodiments, media archive 202 is an index file database system or a plan file database system, such as the Berkeley DB database resources available from Sleepycat Software, Inc. (Lincoln, Mass.).

Tuner 204 receives audio and/or video signals from television and/or radio broadcasts. Tuner 204 is one or more individual radio and/or television tuners. In an embodiment, tuner 204 is configured to receive NTSC/PAL television signals.

DSS box 206 receives audio and/or video broadcast signals from a satellite receiver. Cable box 204 receives audio and/or video broadcasts and pay-for-view unicasts over a copper, UTP, STP, coaxial, optic or HFC interface.

In addition to receiving broadcast signals, control server 114 is also configurable to support recording capabilities. As discussed, broadcast can be recorded to media archive 202. However, control server 114 includes one or more record/playback applications or devices, namely media player 212 and media changer 210. Media player 212 can be a VCR player, DVD player, PVR, video server, virtual recorder, audio server, stereo, CD player, record player, audio tape or cassette player, digital audio tape recorder, and/or any other device or application that stores, records, generates, or plays back via magnetic, optical, electronic, or any other storage media. The recordings can be indexed by album, song, artist, genres, or the like.

Media changer 210 records and plays media and/or multimedia similar to media player 212. However, media changer 210 is capable of loading multiple recordings (e.g., CD, DVD, etc.) to be played without having to be reloaded. For example, media changer 210 can be a jukebox or like device that enables a user to load all available CDs, for example, at once.

IV. Managing System Functions

Control server 114 provides centralized command and control of various functions within a controlled environment, such as system 100. The functions managed by control server 114 includes video serving, audio serving, telephony, messaging, file sharing, Internet access, and security. According to embodiments of the present invention, a user operates controller client 110 to establish or re-configure these functions and/or receive media from control server 114 or other system components (either directly from the other system components or indirectly from the system components via control server 114).

FIG. 3 illustrates an embodiment of control server 114. Control server 114 includes various controller modules for managing various system functions. As shown, control server 114 includes a video controller 302, an audio controller 304, a telephony controller 306, a messaging controller 308, a file sharing controller 310, an external network interface (x-interface) controller 312, and a security controller 314. The controller modules are configured to exchange signals with other system components via communications network. The controller modules are also configured to exchange communications with other A/R components. As described with reference with FIG. 2, the A/R components include media archive 202, tuner 204, DSS box 206, cable box 208, media changer 210, media player 212, and/or the like.

Video controller 302 manages the exchange of video signals within system 100. Video controller 302 receives and/or distributes video signals for displays coupled to, for example, computer client 106, television 112, monitor 116, controller client 110, etc. Video controller 302 also interacts with the A/R components, such as, media archive 202, tuner 204, DSS box 206, cable box 208, media changer 210, media player 212, network connection 280, etc. In embodiments, video controller 302 reads and/or writes to an internal storage medium that is designated for video, and that is in addition to, or in lieu of, the A/R components of the present invention.

Accordingly, video controller 302 receives video signals from the AIR components (and/or its internal storage medium) and distributes them to other system components (e.g., television 112, controller client 110, etc.). Video controller 302 can also receive a video stream from a source (e.g., network connection 280, television 112, media archive 202, etc.) and store the stream in one of the A/R components (e.g., media archive 202, media player 212, etc.), and/or its internal storage medium, for future viewing. For example, video controller 302 can query a web site (e.g., "www.mtv.com") to download a music video to be played and/or stored to a system component. To enable distribution over communications network 180, video controller 302 provides MPEG encoding on the fly according to embodiments of the present invention. In other words, video controller 302 is able to receive, encode, and distribute a media stream in real time or near term. In embodiments, network connection 280 enables video controller 302, or like components, to implement broadband internet access for audio/video distribution.

Another controller module is audio controller 304. Audio controller 304 manages the exchange of audio signals within system 100. Accordingly, audio controller 304 receives and/or distributes audio signals for one or more audio components, such as, for example, audio client 118 or speakers coupled to, for example, computer client 106, television 112, monitor 116, controller client 110, etc. Audio controller 304 also interacts with the A/R components (e.g., tuner 204, DSS box 206, cable box 208, media changer 210, media player 212, network connection 280, etc.) to receive audio signals from the A/R components and distribute them to other system components (e.g., audio client 118, controller client 110, etc.). Additionally, audio controller 304 can receive an audio stream from a source (e.g., network connection 280, television 112, media archive 202, etc.) and store the stream in one of the A/R components (e.g., media archive 202, media player 212, etc.) for future recall. In embodiments, audio controller 304 reads and/or writes to an internal storage medium that is designated for audio, and hence distributes audio to and from its internal storage medium. For example, audio controller 304 can query a web site (e.g., "MP3.com") to download a digital recording to be played and/or stored to a system component. In an embodiment, audio controller 304 encodes the audio stream to MPEG-3 format to produce near-CD quality in real time or near time. In another embodiment, audio controller 304 encodes the audio stream to produce CD quality audio in real time or near term.

Telephony controller 306 is another controller module within control server 114. Telephony controller 306 manages the distribution of telecommunications from conventional telephone paths and/or computer networks (e.g., communications network 180, network connection 280, etc.). In an embodiment, telephone 102 is coupled to a conventional wired or wireless telephone path (not shown), such as POTS or PSTN. Telephone 102 can also be coupled to a cellular or satellite communications path (not shown). A dedicated interface (not shown) is provided to enable the cellular/satellite telephone 102 to interact with system 100. Calls received or transmitted over the conventional path are also monitored and/or controlled by control server 114. As such, control server 114 is responsive to distributing signals from the calls to other system components. For example, controller client 110 is one potential recipient component. Hence, a user is able to directly operate controller client 110 to place and/or receive calls indirectly via telephone 102.

In another embodiment, telephone 102 is coupled to a computer network. Alternatively, a wired or wireless telephone (not shown) that is coupled to computer client 106 is capable of interacting with a computer network. The computer network is a LAN or WAN (such as the Internet) that is accessed via communications network 108 or network connection 208, or the system components (i.e., telephone 102, computer client 106) can have a dedicated link to a computer network, such that the link is independent of communications network 180. In an embodiment, the telecommunications signals are formatted for VoIP or the like. Irrespective of the source of the computer network, the telecommunications signals from the computer network are monitored and/or controlled by control server 114. As discussed with reference to conventional telecommunications calls, control server 114 is responsive to distributing signals from the calls to other system components, such as, for example, controller client 110.

In addition to answering, placing, and/or distributing telecommunications calls, control server 114 is operable to perform other telephony functions. In an embodiment, control server 114 supports speed dialing. Telephone numbers are stored in a memory (such as one of the A/R components described with reference to FIG. 2) coupled to residential control server 114. In another embodiment, control server 114 is programmable to implement service blocking. A user is able to create a profile to block telephone calls from a designated number or family or numbers (e.g., 900 calls, etc.). In yet another embodiment, control server 114 logs inbound/outbound calls and/or enable redialing of past and/or missed calls.

Control server 114 also includes messaging controller 308. Messaging controller 308 enables centralized storage of telephone calls received via telephony controller 306 and the like. Voice messages are written to a memory (such as one of the A/R components described with reference to FIG. 2) coupled to control server 114. Messaging controller 308 also permits messages (including audio, video, and/or text) to be created, stored, and/or retrieved within system 100. In other words, a user can operate one of the system components (e.g., controller client 110, telephone 102, audio client 118, etc.) to create a message for the same or another user. The message can be a "to-do" list, baby-sitting instructions, grocery list, etc. Messaging controller 308 also enables control server 114 to interact with computer client 106 or other system components to search and/or retrieve data from computer emails, instant messaging services, and/or notes, tasks, reminders, and/or events from personal calendars.

Control server 114 also includes file sharing controller 310. File sharing controller 310 enables control server 114 to function as a central file server for all personal computers in communications with system 100. File sharing controller 310 permits files to be stored and accessed by system components located within the residence that is hosting system 100. However, in an embodiment, devices located outside of system 100 are able to store and/or retrieve files via file sharing controller 310. For example, if a static IP address is sustained by the ISP for system 100, a remote user could log into control server 114 to retrieve and/or store files via file sharing controller 310.

X-interface controller 312 is another controller module of control server 114. X-interface controller 312 manages access to the system components from external devices and/or applications, and/or access to external devices, applications, and/or web sites from the system components. As such, x-interface controller 312 provides a gateway to external networks, such as the global Internet, other private WANs, or the like. In an embodiment, x-interface controller 312 supports web proxies and is configurable to block designated web sites in toto or per user. In another embodiment, x-interface controller is operable to track and/or record access/visits to web sites from other system components.

X-interface controller 312 supports wired and/or wireless access to external networks, including cable and/or satellite ISPs. In an embodiment, x-interface controller 312 permits control server 114 to operate as a web server, provided the ISP is able to provide a static IP address.

Security controller 314 enables control server 114 to interact with and/or manage various security systems, including the communications security protocols for system 100. In an embodiment, security controller 314 controls and/or monitors feedback from system components that form a part of a security system. For example, video (e.g., camera 108, etc.) and audio (audio client 118, camera 108, etc.) can be captured and served to controller client 110 or monitor 116. Motion sensors can also be placed within the residence or in external locations surrounding the residence. Feedback from the motion sensors can also be transmitted to security controller 314. In an embodiment, such feedback activates cameras 108 and/or audio clients 118 within the vicinity. In another embodiment, such feedback activates an alarm or signals the user of controller client 110. To signal the user, controller client 110 can vibrate, ring, flash a message, or the like. Control systems coupled to camera 108 permit security controller 314 to move and/or focus camera 108. In an embodiment, security controller 314 is operable to lock or unlock doors, windows, or entryways in response to user input.

In an embodiment, security controller 314 interfaces with fire and safety control system. As such, sensors feed into control server 114 and permit system 100 or a user to monitor emergency situations. Alarms, sprinkler systems, and the like can be operated via control server 114 and/or controller client 110.

In addition to home access and fire and safety systems, security controller 314 also interacts with personal asset security systems, such as safes, file cabinets, rooms, drawers, and the like. Security profiles can be created and maintained to permit selected individuals to access secured areas. Passwords, biometrics, and/or the like can be stored and authenticated to permit access.

Security controller 314 also permits profiles to be established and maintained to monitor and/or restrict access to web sites, telephone numbers, television channels, CDs, videocassettes, or the like. In an embodiment, user profiles are established to permit remote access to the system components from externally located devices and/or applications. For example, an external user can be authorized via security controller 314 to log into control server 114 over the Internet from a remote location and receive live feeds from camera 108, archived feeds from camera 108, broadcasts from television 112, messages stored via messaging controller 308, files stored via file sharing controller 310, or the like. For instance, parents could access control server 114 to monitor their home and/or their children or babysitter while away on vacation or at work.

Control server 114 is not limited to the functions depicted in FIG. 3. Control server 114 can include other modules for controlling the operations and functions of the various system components, including by mimicking a user's remote-control commands through on-screen menus. In an embodiment, control server 114 can set or synchronize a clock for one or more system components, including the A/R components. Control server 114 includes a real-time clock that can be set by a user through a direct user interface with control server 114 or through another system component, such as controller client 110. Alternatively, the real-time clock can be set via the Internet (i.e., network connection 280). Control server 114 uses its own real-time clock to set the clock of other system components by navigating the menu system of the respective system component. Since control server 114 tracks and monitors the state of the system components, control server 114 is programmable to navigate the menus of the system component to set the clock without interfering with the component's operations, such as when a movie is playing or recording.

Instructions for navigating a system component are stored in a database or similar library coupled to control server 114. In other words, the input numbers for navigating the menus of, for example, a VCR or DVD player to set or program its internal clock can be memorized. The memorized numbers are associated with a set of IR codes, which are stored at control server 114. At the appropriate time, the IR codes are retrieved from the IR code database or library, and transmitted to the appropriate media player 212. Upon receipt, the IR codes are executed to navigate the menus to set the clock. Hence, in addition to setting the time, IR codes can also be selected to program media player 212 to record select programs, and the like.

In an embodiment, control server 114 keeps an updated electronic program guide in a database. The electronic program guide (EPG) can be displayed on controller client 110 or like system components for presentation to a user. Control server 114 can obtain the electronic guide from an Internet service, such as GUIDE Plus+® available from Gemstar-TV Guide International, Inc. (Pasadena, Calif.). A user can operate controller client 110 to select channels based on the electronic guide data and/or select programs for recording from the electronic guide.

FIG. 20 illustrates an EPG interface 2000 that can be displayed on controller client 110 or another system component. EPG interface 2000 includes a plurality of channel objects 2002a-2002n, with each one representing a "favorite" programming channel as selected by a user. EPG interface 2000 can be a touch-screen user interface, whereby a finger, stylus, or other device is used to select one of the channel objects 2002a-2002n. Alternatively, voice recognition, a mouse, cursor arrows, or other pointing devices and/or user interfaces can be used.

In an embodiment, control server 114 includes an EPG controller (operating as an integral or independent component of video controller 302) that manages the display of EPG interface 2000 and the channel objects 2002a-2002n. Each of the channel objects 2002a-2002n are directly or indirectly linked to a switch and/or EPG information for a corresponding favorite channel (e.g., Artsworld™ (owned by British Sky Broadcasting Group plc), BBC One™ (owned by British Broadcasting Corporation), Bravo™ (owned by NBC Universal Media, LLC), CNBC™ (owned by CNBC, Inc.), MTV™ (owned by Viacom International, Inc.), Cartoon Network™ (owned by Cartoon Network, Inc.), Animal Planet™ (owned by Discovery Communications, Inc.), CNN™ (owned by Cable News Network, Inc.), Discovery™ (owned by Discovery Communications, Inc.), etc.). As such when selected and activated, the activated channel object 2002a-2002n enables a control message to be transmitted that either retrieves programming information for the corresponding channel or switches a selected device (e.g., television 112, tuner 204, DSS box 206, cable box 208, etc.) to the corresponding channel.

Referring to FIG. 21, flowchart 2100 shows an example of a control flow for presenting programming information on an EPG interface, such as EPG interface 2000. The control flow of flowchart 2100 begins at step 2102 and passes immediately to step 2104. At step 2104, an activation signal is received from a user interface, such as touch screen or other input devices. As shown in FIG. 22, a user presses and holds one of the channel objects 2002a-2002n to activate the channel object associate with the MTV programming channel.

Upon activation of a channel object 2002a-2002n, a timer is initiated at step 2106. For example, a clock signal can be generated to increment a timer register that is initially set at zero. At step 2108, the timer value is read from, for example, the register.

Should the user release or otherwise deactivate the activated channel object 2002a-2002n, a deactivation signal is generated. At step 2110, the control flow checks for the deactivation signal. If found, the control flow passes immediately to step 2124 as described below. Otherwise, the control flow passes to step 2112.

At step 2112, the timer value from step 2108 is analyzed. If the timer value is less than two seconds, control passes to step 2114. At step 2114, a timer graphic is displayed over the activated channel object 2002a-2002n. FIG. 22 illustrates an example of a timer graphic 2202 that is produced from the activation of a channel object 2002a-2002n. Timer graphic 2202 is a dynamic object having two concentric circles that are filled over time.

FIG. 23 illustrates another example of timer graphic 2202 with the two concentric circles. The concentric circles include a quick-view circle 2304 and a jump-to-guide circle 2306. Quick-view circle 2304 is linked to a quick-view timer, and jump-to-guide circle 2306 is linked to a jump-to-guide timer. In an embodiment, timer graphic 2202, and hence the concentric circles, start off translucent blue and are filled radially and clockwise with another color to indicate the passage of time. The quick-view timer and jump-to-guide timer are each associated with a different, predetermined time threshold, and each concentric circle is filled at a distinct rate within the corresponding time span, which expires at the predetermined time thresholds. For instance, the time threshold for the quick-view timer can be set at two second, and the time threshold for the jump-to-guide timer can be set at four seconds. Accordingly, quick-view circle 2304 would radially fill with another color within two seconds. Afterwards, jump-to-guide circle 2306 would radially fill with another color within the next two seconds.

This can be explained with reference back to FIG. 21. After the timer graphic 2202 is displayed at step 2114 and the associated timer has been activated, the next timer value is read from the timer at step 2116. Assuming that no deactivation signal has been detected at step 2110, the timer value is compared to the predetermined time thresholds at step 2118. If the timer value has reached the predetermined threshold for the quick-view timer, a quick-view object is displayed at step 2120. For example, if the timer value is at least two seconds, but less than four seconds, a quick-view overlay is presented over the timer graphic 2202.

FIG. 24 illustrates a quick-view object 2402 that is produced upon expiration of the quick-view time threshold. Quick-view object 2402 can be a small pop-up balloon that displays the program currently being played on the activated channel.

Referring back to step 2118, if the timer value has reached the predetermined threshold for the jump-to-guide timer, a jump-to-guide object is displayed at step 2122. For example, if the timer values is two or more seconds, but less than four seconds, a jump-to-guide window or frame is displayed that hides the timer graphic 2202.

FIG. 25 illustrates a jump-to-guide window 2500 that displays programming information for the user's "favorite channels" station lineup. The row containing the activated favorite channel is highlighted. At this point, the user can release the finger, stylus, and/or other input device from the screen and can freely navigate the program guide.

Referring back to step 2110, if a deactivation signal is detected, the timer value will trigger various events. For example if, at step 2124, the user releases the finger/stylus from the screen before two seconds have elapsed (i.e., the quick-view threshold), then at step 2126, a control message (e.g., IR commands) is sent to the appropriate system component (e.g., television 112, tuner 204, etc.) to switch to the selected favorite channel. Additionally at step 2130, the timer graphic 2202 (including the concentric circles 2304 and 2306) is cancelled.

On the other hand, if at step 2128, the user releases the finger/stylus from the screen at more than two seconds but before four seconds have elapsed (i.e., the jump-to-guide threshold), then at step 2130, the jump-to-guide timer is cancelled, the timer graphic 2202 is hidden, the quick-view object 2402 is hidden, and no control message is sent to the appropriate system component.

If the deactivation signal is detected after the expiration of the jump-to-guide threshold (e.g., four or more seconds), the jump-to-guide object is displayed as discussed above at step 2122. Hence upon display of the programming information (e.g., jump-to-guide window 2500) at step 2122 or cancellation of the timer graphics at step 2130, the control flow ends as indicated at step 2195.

It should be understood that the timer thresholds (as described, for example, at steps 2112, 2118, 2124, and 2128, and FIG. 23) have been provided by way of example, and not limitation. Different threshold values can be established as desired by the system architect or user.

In addition to setting the configuration of system components, control server 114 governs the addition and/or deletion of system components to network control system 100. In an embodiment, a region profile is established to track and monitor all devices and/or applications (i.e., system components) within a specified region of the controlled environment. A text-based or graphical user interface enables a user to specify the dimensions of a region. For instance, a region can be one or more rooms or designated areas within a room. As discussed above, the present invention can also be used to control the operations and functions of system components located within the surrounding area of, for example, a home. Therefore, a region can include such external areas.

Once a region is established, the user can specify the system components to be governed by control server 114. Icons and names can be assigned to the system components, and the user can set or denote the properties. In an embodiment, system components are automatically detected and added to network 100. A system component announces its presence by broadcasting a discovery control message on a continuous or periodically scheduled basis. Control server 114 receives the broadcast and adds the system component to the profile for that particular region by extracting a name and properties for the system component from the discovery message. The system component can be automatically added to the region profile, or the system component can be temporarily added until the user accepts or rejects the addition of system components added via automatic discovery. In an embodiment, an automatically added or removed system component is presented on a display device (such as, controller client 110). The user can expressly accept the profile change, or ignore it thereby allowing the profile change to be automatically approved. With respect to updating profiles, control server 114 can also explicitly request through a broadcast mechanism that all system components in a region identify themselves.

If a system component is removed from network 100 or ceases to broadcast its discovery message, control server 114 maintains the history for the system component. Therefore, if the system component is re-connected to network 100, control server 114 retains the state information so that the system component would reappear in its previous manifestation (e.g., same icon, name, region, etc.). If a system component is relocated to another room, control server 114 updates the state information to automatically add the system component to the region profile for the new room. In an embodiment, the user is notified of the change in state, and can accept or reject the modification.

As discussed above, the present invention supports embodiments that do not include control server 114. As such, the system components can exchange information, including control messages, with each other without a centralized command center. However, in an embodiment, controller client 110 includes some or all of the functionality of control server 114. The functionality can include video controller 302, audio controller 304, telephony controller 306, messaging controller 308, file sharing controller 310, x-interface controller 312, and/or security controller 314. Controller client 110 can also interact and control one or more of the various A/R components, discussed above. Therefore, a user can operate a portable controller client 110 to control the operations and functions of the system components from any location.

V. Location Awareness

In embodiments of the present invention, network control system 100 tracks and/or monitors the positions of various system components (herein referred to as the "target components") in real time or near term. As a user migrates within the controlled environment that hosts system 100, the present invention can implement several protocols to enable system 100 to determine a location of a target component and hence, the location of the user in communications with the target component. In an embodiment, a control center (e.g., control server 114, a local processor coupled to the target component, etc.) determines the current location of the target component (e.g., controller client 110, etc.), and sends instructions to reconfigure the target component to control other system components within a specified vicinity. For example, if controller client 110 is determined to be located within a dining area, control server 114 enables controller client 110 to be capable of controlling system components positioned in the dining area. Such components can include light dimmers, audio systems, heating units for food servers, or the like.

Positioning devices are utilized in several embodiments for tracking and/or monitoring target components. As described above with reference to FIG. 1, one or more positioning units 104 are distributed throughout the controlled environment that hosts system 100. The positioning units 104 can be coupled to a target component (e.g., controller client 110, audio client 118, telephone 102, etc.), or located as a stand-alone device within the controlled environment.

In an embodiment, positioning unit 104 is part of a RF communications system. As such, a RF transponder interacts with a RF interrogator to communicate positioning information. The transponder is coupled to a system component and makes available identification information that uniquely identifies the system component. The transponder can make available other types of information, including an assigned location of the system component if the component is a stationary or infrequently moved device. Therefore, as described in further detail below, the transponder can be coupled to either the target component or a positioning component (e.g., positioning unit 104).

The transponder can be active or passive. An active transponder transmits a continuous or periodic signal containing the identification information. A passive transponder remains inactive and/or silent until it is activated by, for example, an interrogator, or manually activated by a user. Therefore, the system component (that includes the transponder) can operate in a silent mode or active mode. In active mode, the position of the system component (i.e., the target component) is being tracked and/or monitored in real time or near term. In silent mode, the current position of the system component (i.e., the target component) is not known to system 100 with absolute certainty until the transponder is activated.

The interrogator is coupled to another system component and receives positioning information (e.g., identification information or the like) when it comes within the communications range of a transponder. The interrogator will automatically receive the positioning information from an active transponder, or will activate a passive transponder to receive the positioning information.

The interaction between a transponder and an interrogator can be explained with reference to FIG. 4A and FIG. 4B. FIG. 4A illustrates an embodiment for positioning system components within system 100. As shown, a transponder 404 is coupled to controller client 110, and an interrogator 406 is coupled to or embodied within positioning unit 104. As such, as a user 402 carrying controller client 110 enters the vicinity of positioning unit 104 (i.e., interrogator 406), positioning unit 104 receives identification codes from controller client 110. The identification codes include an identifier for the transmitting controller client 110, or the like. In an embodiment, positioning unit 104 sends the identification codes to residential control server 114 (described with reference to FIG. 1) for further processing. Positioning unit 104 can also send other identification codes or information with the identifier for the polled controller client 110. In an embodiment, positioning unit 104 sends a vicinity identifier, or the like, for the region (e.g., floor, room, etc.) of the residential environment where positioning unit 104 is located. In another embodiment, control server 114 determines the vicinity identifier from an identifier for the positioning unit 104. Controller client 110 has been described by way of example. Other system components can also be coupled with transponder 404 and, thereby, configured to have their locations determined by embodiments of the present invention.

FIG. 4B illustrates another embodiment for positioning a system component within system 100. As shown, transponder 404 is coupled to or embodied within positioning unit 104. Interrogator 406 is coupled to controller client 110. Therefore as user 402 carrying controller client 110 enters the vicinity of positioning unit 104 (i.e., transponder 404), controller client 110 receives identification codes from positioning unit 104. The identification codes include an identifier for the transmitting positioning device 104, a vicinity identifier for the region (e.g., floor, room, etc.) of the controlled environment, or the like. In an embodiment, controller client 110 processes the identification code to determine its location and/or sends the identification code to control server 114 for archival purposes. In another embodiment, controller client 110 sends the identification code to control server 114 (described with reference to FIG. 1) to determine its location and for further processing. Again, controller client 110 has been described by way of example. Other system components can also be coupled with an interrogator 406 and, thereby, configured to have their locations determined by embodiments of the present invention.

In an embodiment, transponder 404 is an electronic tag, beacon, controller, or the like. The electronic tag is characterized as having any shape or size, and is located on, or integrated within, the system component. The electronic tag includes a microprocessor connected to communications circuitry that supports RF communications with other devices. The microprocessor is coupled to a memory for storing information (i.e., identification information) and transceiver for exchanging information with the other devices.

In an embodiment, transponder 404 has a dedicated microprocessor for transmitting positioning information. In another embodiment, transponder 404 utilizes or shares the microprocessor for the hosting system component (e.g., controller client 110) to exchange positioning information. For example, the hosting system component would include an infrared port that is coupled to a microprocessor and memory located in the system component. The memory includes the identification information and related data. The microprocessor interacts with the memory and infrared port to support exchanges with interrogator 406. As such, the interaction among the microprocessor, memory and infrared port serves as transponder 404.

Wireless communications between transponder 404 and interrogator 406 are supported by various technologies. In an embodiment, the Bluetooth™ wireless technology (developed by Bluetooth SIG, Inc.) is used to implement a short-range wireless interface between transponder 404 and interrogator 406.

In lieu of, or in addition to RF communications, positioning unit 104, in an embodiment, is part of a data collection system using bar codes. In other words, a bar code is disposed to a system component and stores identification information that uniquely identifies the system component. As described with reference to a transponder, the bar code can store other types of information, including the assigned location of the system component if the component is a stationary device. A bar code scanner collects the identification information so that the information can be processed to determine the location of the system component.

Bar code data collection can also be described with reference to FIG. 4A and FIG. 4B. In other words, interrogator 406 is a bar code scanner and transponder 404 is a bar code according to embodiments of the present invention. Referring back to FIG. 4A, a bar code 404 is disposed to controller client 110 and a bar code scanner 406 is disposed to or embodied within positioning unit 104. As user 402 carrying controller client 110 enters the vicinity of positioning unit 104 (i.e., bar code scanner 406), positioning unit 104 receives the identification codes containing an identifier for the controller client 110. As described above with reference to an interrogator, the identification codes, with or without a vicinity identifier, are sent to control server 114 (described with reference to FIG. 1) for further processing. Although controller client 110 has been described by way of example, other system components can also be coupled with a bar code 404 and, thereby, configured to have their locations determined by embodiments of the present invention.

Referring back to FIG. 4B, another embodiment for positioning system components with bar coding is illustrated. As shown, bar code 404 is disposed to or embodied within positioning unit 104, and a bar code scanner 406 is disposed to controller client 110. As user 402 carrying controller client 110 enters the vicinity of positioning unit 104 (i.e., bar code 404), controller client 110 receives the identification codes containing an identifier for the transmitting positioning unit 104. As described above with reference to a transponder, the identification codes, in an embodiment, includes an identifier for the transmitting positioning device 104, a vicinity identifier for the region of the residential environment, or the like. The identification codes, with or without a vicinity identifier, are processed by controller client 110 to determine its location, and/or sent to control server 114 (described with reference to FIG. 1) for further processing. Although controller client 110 has been described by way of example, other system components can also be coupled with a bar code scanner 406 and, thereby, configured to have their locations determined by embodiments of the present invention.

The utilization of RF and bar coding technologies represent alternative methodologies for tracking and/or monitoring the location of system components. As would be apparent to one skilled in the relevant art(s), other positioning technologies can also be implemented with the present invention. For example in larger scaled environments, the use of GPS receivers, cellular signals, triangulation, or the like are available alternatives.

In another embodiment, positioning can be realized without the use of positioning unit 104. Controller client 110, or the like, is responsive to receive and process commands from the user operating controller client 110. The commands are manually and/or verbally entered into controller client 110. Controller client 110 processes the commands, or sends the commands to control server 114, to determine the location. For example, the user can specify the location "living room," and the controller client 110 would be profiled to control devices in the living room.

In another embodiment, however, voice and/or manual commands can be entered into positioning unit 104 or the like. The user would also enter an identifier for the target component (e.g., controller client 110), and position unit 104 would send control signals to control server 114, or the like, to update the location records of target component.

As described above, the present invention supports various protocols for gathering location information. The present invention provides several methods and/or techniques for processing the location information to track and/or monitor the position or movement of various components of system 100. Referring to FIG. 5, flowchart 500 represents the general operational flow of an embodiment of the present invention. More specifically, flowchart 500 shows an example of a control flow for tracking and/or monitoring system components within a controlled environment.

Referring to FIG. 5, the control flow of flowchart 500 begins at step 501 and passes immediately to step 503. At step 503, an appropriate component of system 100 accesses locator codes that correspond to a system component (i.e., target component) that is being tracked and/or monitored. Referring back to FIG. 1 and FIG. 2, the present invention can determine the current position of any of the aforementioned system components, including, but not limited to, telephone 102, positioning unit 104, computer client 106, camera 108, controller client 110, television 112, control server 114, monitor 116, audio client 118, residential appliance 120, media archive 202, tuner 204, DSS box 206, cable box 208, media changer 210, media player 212, and/or other devices and/or applications.

As described above, the present invention includes various embodiments for accessing locator codes (or a vicinity identifier as described above). For instance, in an embodiment, a user interacts with a text or graphical interface to manually enter the current location for a target component. In another embodiment, a voice command interface enables the user to enter voice commands for a target component. As such, the user verbally communicates the current location.

In an embodiment, a target component interacts with positioning unit 104 to access locator codes. Referring back to FIG. 4B, the target component (e.g., controller client 110, etc.) is coupled to interrogator 406. Interrogator 406 polls positioning unit 104 for a vicinity identifier. The vicinity identifier includes locator codes for the current location for both system components.

Referring back to FIG. 4A, interrogator 406 is integrated with positioning unit 104. Hence, a target component (e.g., controller client 110, etc.) is polled by interrogator 406. As a result, interrogator 406 receives an identifier for the polled target component. Locator codes are produced by associating the identifier with the vicinity identifier for interrogator 406.

Referring back to FIG. 5 at step 506, the locator codes are sent to a command center for further positioning processing. In an embodiment, the command center is control server 114. In another embodiment, the command center is at the target component (e.g., controller client 110, computer client 106, etc.).

At step 509, the locator codes are matched to a region. The region can be a specific floor, hallway, corridor, balcony, room, or the like. The region can be a specific area within a floor, hallway, corridor, balcony, room, or the like. The region can also be a specific area within an external perimeter of the residence hosting system 100, or an adjoining or free-standing shelter on the residential grounds.

At step 512, the current region is communicated to the target component and/or stored in the records of control server 114 for future recall. After the system component has been positioned and its positioning data has been updated, the control flow ends as indicated at step 595.

In an embodiment, the positioning information enables system 100 to command and/or control specific system components based on the current location of a user interacting with system 100. This can be described with reference to FIG. 6. Flowchart 600, as illustrated in FIG. 6, represents the general operational flow of an embodiment of the present invention. More specifically, flowchart 600 shows an example of a control flow for commanding and/or controlling system components based on a user's current location.

Referring to FIG. 6, the control flow of flowchart 600 begins at step 601 and passes immediately to steps 503-509. As described with reference to FIG. 5 at steps 503-509, locator codes enable system 100 to determine the current location or region of a user interacting with a target component (e.g., controller client 110).

At step 612, a region profile is accessed for the region. The region profile includes a listing of devices and/or applications (i.e., system components) that receive commands and/or controls from control server 114 and/or controller client 110.

At step 615, the region profile is processed to present control options for the user to review. The control options include the listing of devices and/or applications corresponding to the region profile. As described with reference to FIG. 5, the positioning can be determined remotely at control server 114 or locally at the target component (e.g., controller client 110). If determined remotely, control server 114, for example, produces and sends a user interface to display the control options on the target component (e.g., controller client 110 or another system component the user is operating). If determined locally, the target component (e.g., controller client 110, etc.) retrieves the region profile to produce the user interface. The region profile can be sent to the target component on demand, or the target component can be updated periodically with available region profiles.

At step 618, the user operates the target component (e.g., controller client 110, etc.) to send a request to control a system component (e.g., television 112, appliance 120, etc.) that is identified in the region profile. The user can send a request to control a function and/or an operation of a system component. The user can send a request to alter the configuration or security profile for the component. Other control requests can be sent as would be apparent to one skilled in the relevant art(s).

At step 621, the control request is executed by the designated component. The control request can be transmitted directly to the designated component, or indirectly to the designated component via control server 114. After the control request has been executed, the control flow ends as indicated by step 695.

For example, if a user is operating controller client 110 and is determined by system 100 to be positioned in the "living room," controller client 110 would receive a user interface for controlling system components in the living room. One system component can include, for example, security monitor 116 that receives video input from camera 108 located at the front door to the residence. The user can interact with controller client 110 to pan, tilt, or focus camera 108 to display an image on monitor 116 of a visitor standing at the front door. Another system component can be television 112, and controller client 110 can receive a user interface for controlling the volume levels or channel selections for television 112. The user can also interact with controller client 110 to alter the settings of HVAC equipment (i.e., residential appliance 120)

The present invention supports various text, graphical or verbal command interfaces for presenting the control options to a user. FIG. 7 illustrates an embodiment of a user interface 700 for presenting location-specific control options. User interface 700 is produced on controller client 110. However, as described herein, a user can operate any of the other system components to send control requests, provided the system component is configured to produce user interface 700 or the like.

User interface 700 includes a control options region 702. Control options region 702 identifies system components from a region profile for a designated region. In this example, the region is a living room. System components identified in the region profile for living room include television 112 and audio client 118. Component controls 704a-704b enable a user to send control requests to a corresponding system component. Component control 704a corresponds to television 112. Component control 704b corresponds to audio client 118. Additional component controls 704a-704b can be included to send control requests to other system components profiled for a particular region.

The region, specified by control options region 702, can be determined by the positioning embodiments described above, or the region can be user-specified regardless of the current location of the user of controller client 110. The region is user-specified by activating a region toggle 706.

Messaging toggle 708 enables the user to interact with messaging controller 308 described with reference to FIG. 3. Therefore, the user is able to check email, voice mails, intra-residential messages, or the like.

Media viewer 710 enables the user to view media from another system component. For example, the user can interact with component control 704a to view a television program that is currently being broadcast on television 112. The user can also interact with component control 704b to receive audio from audio client 118.

Although media viewer 710 is shown as a video or multimedia player, media viewer 710 also allows audio signals to be received without video. Media viewer 710 can also be a web browser, or software application for word processing, video games, or the like. Therefore, the user can interact with control options region 702 and region toggle 706 to receive text, audio, video, or media and/or multimedia from other system components from any location within the residential environment hosting system 100.

VI. Profiling Controller Client for Personalized Use

The present invention enables a user to operate controller client 110 to command and/or control other system components. In an embodiment, controller client 110 only permits the user to control system components within the vicinity of controller client 110. In another embodiment, controller client 110 provides the option of controlling system components in another region.

In embodiments, control of the various system components is based on preset profiles established for the user. The profiles can be generic for all users and/or specifically configured for a specific user. If configured for a specific user, the present invention utilizes various protocols to identify or authenticate a specific user and execute the profile established for the user. In an embodiment, a username and/or password is entered into a system component (e.g., controller client 110, etc.). The password can be expressed by a verbal command, text, object, pixel, or the like. In another embodiment, biometrics are collected by a system component. As such, retinal, iris, facial, palm, fingerprint, and/or voice recognition technologies, or the like are implemented to identify and/or authenticate a user. In another embodiment, a user card is read by a system component (e.g., controller client 110, etc.). Other user identification and/or authentication techniques can be used to identify and/or authenticate a user. The present invention permits the user to alter the profile, as appropriate. The identification and/or authentication techniques, described above, prevent other users from altering or deleting the user profile after it has been established.

In embodiments, the present invention enables a user to establish a profile to store a "favorite" setting for the system components. For example, a favorite setting can be established for television programming, audio/video recordings, room temperature, hot tub controls, clock alarms, light/dimmer settings, web sites, news broadcasts, financial channels, or the like.

In embodiments, the user can establish a profile to create a "playlist." For example, a series of video or audio recordings can be prepared and/or stored for playback on, for example, television 112 or audio client 118. A sequence of graphic images or photographs can be prepared and/or stored for playback on, for example, monitor 116 or computer client 106. A playlist of other forms or media and/or multimedia can also be created according to embodiments of the present invention, as would be apparent to one skilled in the relevant art(s).

In embodiments, a profile can be created to establish a security protocol for the system components. For example, a profile can be created to block certain content from being accessed by designated users. Non-adult users, for instance, can be prevented from accessing designated television channels, web sites, areas (such as, lockable rooms, drawers, safes, etc.), or the like.

In embodiments, the present invention enables a single user to establish multiple profiles. Each of the multiple profiles can be tailored for context-sensitive activity. For instance, a user can create a profile for evening entertainment, which includes, without limitation, presets for lighting, audio/video presentations, security access warnings, hot tub controls, or the like. Another profile can be established for home office activities, which includes, without limitation, presets for a baby monitor, a playlist of classical recordings, coffee maker timer controls, or the like. A profile can be established for morning rituals, which includes, without limitation, presets for alarm/snooze controls, coffee maker timer controls, lighting, news broadcasts, or the like.

A user can also establish multiple profiles for use with other individuals. For example, a user can have a profile with security controls set to block certain televisions programming, web sites, audio recordings, or the like when in the company of minors. However, when in the company of adults, the user can recall another profile with more liberal security settings.

As such, the present invention enables various system components (e.g., controller client 110, etc.) to be user aware in addition to being location aware. Thus for example, controller client 110 can be customized per user based on the aforementioned user profiles. In embodiments, the user awareness functionality permits system 100 to implement "follow-me" system controls. For instance, "follow-me" video is implemented to transfer a selected video production to various displays throughout the controlled environment. The user would operate, for example, controller client 110 to select a video production (e.g., television show, DVD recording, or the like). The video production can be presented on controller client 110 (e.g., media viewer 710 described with reference to FIG. 7). As the user migrates from room to room within the controlled environment, system 100 tracks controller client 110 and retrieves a region profile for each region. Therefore, as the user enters a new region or room, a monitor 116 or television 112 located in the room will automatically start to display the video production selected by controller client 110.

Similarly, "follow-me" audio can be implemented by the present invention. As such, the user can operate, for example, controller client 110 to select an audio production (e.g., CD recording, radio broadcast, etc.). As the user migrates from room to room, the positioning techniques of the present invention enable system 100 to transfer the audio production to the audio clients 118, monitors 116, or the like that are located in the vicinity of controller client 110.

"Follow-me" lighting is another exemplary implementation of the present invention. As a user, carrying controller client 110, enters or leave a room, system 100 sends commands to dim or turn on/off the lights based on the profile settings.

In an embodiment, one or more control macros can be established to control the operations and/or functions of the system components. A control macro includes a set of commands that, when executed, enables control server 114 to control multiple operations and/or functions of one or more system components. The control macro (i.e., set of commands) can be associated with a control macro filename for future recall and execution.

A user can define a control macro by operating controller client 110, computer client 106, or a user interface in communications with control server 114. In an embodiment, a graphical user interface can be implemented to enable a user to define a new control macro. FIG. 9 provides an example for defining a control macro according to an embodiment of the present invention. Flowchart 900 shows an example of a control flow for defining a control macro to watch a movie recorded on DVD.

Referring to FIG. 9, the control flow of flowchart 900 begins at step 901 when the user triggers a record-macro command to distinguish the macro recording mode from normal system operations. At step 903, the user operates one of the aforementioned devices (i.e., controller client 110, computer client 106, or a user interface to control server 114) to select a room containing the system component (e.g., television 112, monitor 116, etc.) that the user intends to use to view the movie.

At step 906, the region profile for the selected room is recalled. As discussed above, a region profile identifies all system components located in a designated region. In an embodiment, the region profiles are stored at control server 114, which retrieves and makes the appropriate region profile available to the user.

At step 909, the user reviews the region profile and selects a viewing system component (e.g., television 112). The user also specifies the video input for a DVD source. The user can specify any desired settings, including but not limited to, contrast, brightness, and the like.

At step 912, the user specifies the desired audio settings. In an embodiment, the user sets the volume level for the viewing system component (e.g., television 112). In another embodiment, the user selects external speakers (e.g., audio client 118) to be used in addition to, or in lieu of, the internal speakers for the viewing system component (e.g., television 112).

At step 915, the user selects the desired DVD movie from media changer 210. Alternatively, if a DVD player (i.e., media player 212) is located in the same room with the selected viewing system component (e.g., television 112), the user can instruct media player 212 to begin playing the movie currently loaded, or simply open the media bay and wait for the user to manually insert the desired DVD.

At step 918, the user specifies the settings for lighting appliances 120 denoted in the region profile. The user can dim the lighting to a desired comfort level. In an embodiment, lighting appliance 120 includes the RadioRA home dimming system available from Lutron Electronics Company, Inc. (Coopersburg, Pa.). As such, the present invention enables the creation of control commands for operating the RadioRA dimming system. Referring back to FIG. 12, lighting appliance 120 is an exemplary lighting system that is controlled by a signal repeater 1202 for a dimming system, such as Lutron's RadioRA or X-10 dimming systems.

At step 921, the control commands for executing the specifications for television 112, audio client 118 (if selected), media player 212 (or media changer 210), and lighting appliance 120 are collectively associated with a common control macro.

At step 924, the user saves the control macro and gives it a filename, such as "watch movie." In an embodiment using controller client 110 to create macro "watch movie," the user can associate the macro to a specific macro button or icon. Therefore, when the user activates the "watch movie" macro button, all of the associated commands for implementing the user's pre-specified selections are recalled and executed, so that television 112 is ready to play the desired movie. After the control macro is created and saved, it is ready for activation and the control flow ends as indicated at step 995.

In an embodiment, the commands associated with a specific control macro are stored at control server 114, or in a database or library affiliated with control server 114 or media archive 202. Therefore, in an embodiment using controller client 110 to execute a control macro, controller client 110 enables a user to associate a control macro with a control macro button or icon. When executed, the control macro button transmits a generic command to control server 114. Control server 114, in turn, retrieves the set of commands associated the generic command, and transmits the set of commands to the appropriate system components for execution. In other words, the present invention enables a mobile device, such as controller client 110, to transmit a single high-level request to a centralized command center, such as control server 114. Control server 114 interprets the single request according to its environment (e.g., user, location) and finds the corresponding sequence of commands that needs to be transmitted over communications network 180, which includes wireless (or powerline) communications.

Alternatively, according to an embodiment of the present invention, a control macro can be created automatically by the control server 114 based on the particular devices existing in a selected room or region, either as known by the control server through stored room profiles or as detected in real time by the control server as the room profile is created. For example, if the control server detects that a room such as the living room has a DVD player and a TV, the control server will automatically build a basic "watch movie" macro comparable to the macro described above, which can be further customized by the user.

FIG. 10 illustrates an example for activating a control macro according to an embodiment of the present invention. Flowchart 1000 shows a control flow for activating the control macro of flowchart 900, which pertains to watching a movie recorded on DVD.

Referring to FIG. 10, the control flow of flowchart 1000 begins at step 1001 and passes immediately to steps 1003. At step 1003, the user activates the "watch movie" control macro defined in step 901-995.

At step 1006, the set of commands associated with the "watch movie" control macro is recalled from their storage location. The set of commands includes the user-predefined specifications for controlling the functions and/or operations of the specified system components. In this example, the set of commands associated with the "watch movie" control macro includes commands for altering lighting appliance 120, activating media changer 210 (or media player 212), and activating television 112. If the user desires to listen to the movie on a home stereo speaker system, the set of commands would also include commands for activating the appropriate audio system component (e.g., audio client 118).

In an embodiment using controller client 110 to activate the control macro, controller client 110 transmits a generic command that was associated with the "watch movie" control macro. The generic command is sent to control server 114, which recalls the set of commands associated with the generic command for the "watch movie" control macro.

At step 1009, the room and system components (i.e., television 112, media changer 210 or media player 212, lighting appliance 120, audio client 118) are identified from the set of commands. In the example described with reference to FIG. 9, the room is specified in the control macro. However, in another embodiment, the control macro, itself, does not need to be room specific. As discussed above, the present invention includes methodologies and/or techniques for tracking the location of a user or controller device 110. Therefore, the user can request to activate a control macro (such as, the "watch movie" control macro) to watch a movie in any room the user is currently located. As such, control server 114 would designate the user's current location as being the room for implementing the control macro. Likewise, control server 114 can retrieve the room profile for the user's current location and identify the viewing components, media player, and lighting components that are located in the designated room.

At step 1012, device access permission is validated for each system component identified at step 1009. As discussed above, restrictions on operating various system components can be established and policed by security controller 314. Accordingly, the present invention provides methodologies and/or techniques for identifying or authenticating the user that is requesting the "watch movie" control macro, as well as for determining if the user is authorized to operate the system components (including the actual DVD) designated in the control macro. If the user is determined to lack authorization for accessing the designated system components, a message can be sent to inform the user that access has been blocked.

At step 1015, the present invention determines which commands are associated with each system component identified at step 1009. For example, the control commands for specifying the viewer settings are queued for television 112. Similarly, the control commands for specifying the lighting settings are queued for lighting appliance 120.

In an embodiment, control server 114 apportions the component-specific commands for each system component. The component-specific commands are encoded and sent to the designated system component via the appropriate protocol. Control server 114 also updates its records for tracking the state of each system component.

At step 1018, each system component receives and executes the component-specific commands. As such, the lighting (i.e., appliance 120) in the specified room is automatically dimmed, the specified television 112 is turned-on and configured as predefined, and the specified DVD player (media changer 210 or media player 212) is similarly activated. Depending on the speaker options specified in the control macro, audio 118 is also activated and waits to receive audio feed from the DVD player.

At step 1021, a control screen is sent to the user interface that the user operated to activate the control macro. If controller client 110 is used, the control screen is presented on the display to designate that the control macro has been properly executed and the DVD movie is ready to commence playing (or the DVD player is ready to receive the desired movie, if this option is selected). Afterwards, the control flow ends as indicated at step 1095.

VII. Exemplary System Implementation

FIGS. 1-7 are conceptual illustrations allowing an explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Additionally, the present invention can be implemented in one or more computer systems or other processing systems, capable of carrying out the functionality described herein. Referring to FIG. 8, an example computer system 800 useful in implementing the present invention is shown. Various embodiments are described in terms of this exemplary computer system 800. After reading this description, it will become apparent to a person skilled in the relevant art(s) how to implement the invention using other computer systems and/or computer architectures.

The computer system 800 includes one or more processors, such as processor 804. Processor 804 can be a special purpose or a general purpose digital signal processor. The processor 804 is connected to a communication infrastructure 806 (e.g., a communications bus, cross-over bar, or network).

Computer system 800 can include a display interface 802 that forwards graphics, text, and other data from the communication infrastructure 806 (or from a frame buffer not shown) for display on the display unit 830.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. which is read by and written to removable storage drive 814. As will be appreciated, the removable storage unit 818 includes a computer usable storage medium having stored therein computer software (e.g., programs or other instructions) and/or data.

In alternative embodiments, secondary memory 810 includes other similar means for allowing computer programs or other instructions to be loaded into computer system 800. Such means include, for example, a removable storage unit 822 and an interface 820. Examples of such means include a program cartridge and cartridge interface (such as that found in video game devices), a removable memory chip (such as, an EPROM or PROM) and associated socket, and other removable storage units 822 and interfaces 820 which allow software and data to be transferred from the removable storage unit 822 to computer system 800.

Computer system 800 can also include a communications interface 824. Communications interface 824 allows software and/or data to be transferred between computer system 800 and external devices. Examples of communications interface 824 include a modem, a network interface (such as an Ethernet card), a communications port, a PCMCIA slot and card, etc. Software and data transferred via communications interface 824 are in the form of signals 828 which can be electronic, electromagnetic, optical or other signals capable of being received by communications interface 824. These signals 828 are provided to communications interface 824 via a communications path (i.e., channel) 826. Communications path 826 carries signals 828 and can be implemented using wire or cable, fiber optics, a phone line, a cellular phone link, an RF link, free-space optics, and other communications channels.

In this document, the terms "computer program medium" and "computer usable medium" are used to generally refer to media such as removable storage unit 818, removable storage unit 822, a hard disk installed in hard disk drive 812, and signals 828. These computer program products are means for providing software to computer system 800. The invention, in an embodiment, is directed to such computer program products.

Computer programs (also called computer control logic or computer readable program code) are stored in main memory 808 and/or secondary memory 810. Computer programs can also be received via communications interface 824. Such computer programs, when executed, enable the computer system 800 to implement the present invention as discussed herein. In particular, the computer programs, when executed, enable the processor 804 to implement the processes of the present invention, such as the method(s) implemented using residential control server 114, controller client 110, computer client 106, and/or other system components of system 100 described above, such as methods 500 and/or 600, for example. Accordingly, such computer programs represent controllers of the computer system 800.

In an embodiment where the invention is implemented using software, the software can be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Moreover as previously discussed, it should be understood that the method, system, and computer program product of the present invention should not be limited to a residential environment. The present invention can be implemented in other types of environments having a central processing system for distributing media and sending command and/or control signals to a plurality of devices and/or applications dispersed throughout a designated region. In addition to a residence, the designated region includes, but is not limited to, office complexes, suite of small offices, production studios, warehouses, entertainment arenas, health care facilities, hotels, vacation resorts, aircrafts, ships, automobiles, or the like. Thus, the present invention should not be limited by any of the above-described exemplary embodiments, but should be defined only in accordance with the following claims and their equivalents.

What is claimed is:

1. A cradle for a remote control device, comprising:
    a receptacle configured to hold the remote control device;
    a first communications interface configured to communicate with said remote control device via a network that communicates information in accordance with a packet-based wireless communication protocols;
    a control server comprising a processing system configured to convert a remote control command formatted in accordance with the packet-based wireless communication protocol received from the remote control device into a format suitable for communication with a plurality of network components located throughout a controlled environment that are not adapted for communication in accordance with the packet-based wireless communication protocol;
    a power supply port having an electrical connection to the receptacle, wherein the power supply port is configured to supply power to the remote control device when the remote control device is being held within the receptacle; and
    a second communications interface comprising an infrared beacon or serial interface and configured to communicate with the control server and a legacy device of the network components, the second communications interface using an infrared or a serial communications protocol, and the second communications interface being configured:
        (a) to accept network configuration parameters from an infrared port using data transmission protocols if in an infrared out-of-band configuration; and
        (b) to learn new legacy device infrared or serial control codes for the legacy device.

2. The cradle of claim 1, wherein the first communications interface includes:
    first means for exchanging communications between the remote control device and the control server; and
    second means for sending a control request to one or more of the network components.

3. The cradle of claim 1, further comprising:
    a third communications interface configured to transmit signals converted and formatted by the control server to and from one or more of the plurality of network components,
    wherein the third communications interface includes a wireless interface that communicatively couples the cradle with at least one of the network components.

4. The cradle of claim 1, further comprising:
    a third communications interface configured to transmit signals converted and formatted by the control server to and from one or more of the plurality of network components,
    wherein the third communications interface includes an infrared interface that communicatively couples the cradle with at least one of the network components.

5. The cradle of claim 1, further comprising:
    a third communications interface configured to transmit signals converted and formatted by the control server to and from one or more of the plurality of network components,
    wherein the third communications interface includes a serial interface for communicatively coupling the cradle with the legacy device.

6. The cradle of claim 1, wherein the power supply port includes a powerline interface that communicatively couples the cradle to a powerline network.

7. The cradle of claim 1, further comprising:
    an LED indicator for indicating a status of power connectivity or network connectivity.

8. The cradle of claim 1, wherein the packet-based wireless communication protocol is IEEE 802.11(a) or (b).

9. The cradle of claim 1, further comprising:
a third communications interface configured to transmit signals converted and formatted by the control server to and from one or more of the plurality of network components,
wherein the third communications interface is adapted to transmit with an infrared communication protocol.

10. A system for distributing information within a controlled environment, comprising:
a plurality of network components located throughout the controlled environment;
a remote control device configured to send a control request to one or more of the network components; and
a cradle, wherein the cradle includes a receptacle configured to hold the remote control device,
a first communications interface configured to communicate with said remote control device via a network that communicates information in accordance with a packet-based wireless communication protocol,
a control server comprising a processing system configured to convert a remote control command formatted in accordance with the packet-based wireless communication protocol received from the remote control device into a format suitable for communication one or more of the network components that is not adapted for communication in accordance with the packet-based wireless communication protocol; and
a second communications interface being an infrared beacon or serial interface and configured to communicate with the control server and a legacy device of the network components, the second communications interface using an infrared or a serial communications protocol, the second communications interface being configured:
(a) to accept network configuration parameters from an infrared port using data transmission protocols if in an infrared out-of-band configuration; and
(b) to learn new legacy device infrared or serial control codes for the legacy device.

11. The system of claim 10, further comprising:
positioning means for tracking and/or monitoring a location or a movement of at least one of the network components.

12. The system of claim 11, wherein the remote control device is configured to interact with the positioning means, and wherein the remote control device is further configured to send a control request to one or more of the network components located within a vicinity of the remote control device.

13. The system of claim 10, further comprising a third communications interface comprising a power supply port having an electrical connection to the receptacle, wherein the power supply port is configured to supply power to the remote control device when the remote control device is being held within the receptacle.

14. The system of claim 10, further comprising:
a third communications interface configured to transmit signals converted and formatted by the control server to and from one or more of the plurality of network components,
wherein the third communications interface includes an infrared interface that communicatively couples the cradle with at least one of the network components.

15. The system of claim 10, cradle includes an LED indicator for indicating a status of power connectivity or network connectivity.

16. The cradle of claim 10, wherein the packet-based wireless communications protocol is IEEE 802.11(a) or (b).

17. The cradle of claim 10, further comprising:
a third communications interface configured to transmit signals converted and formatted by the control server to and from one or more of the plurality of network components,
wherein the third communications interface is adapted to transmit with an infrared communication protocol.

18. A method of distributing information within a controlled environment comprising:
operating a remote control device to send a request to a control center via a network that communicates information in accordance with a packet-based wireless communication protocol, wherein said control center is located in a cradle that includes a receptacle for holding the remote control device, a control server comprised of a processing system for processing the requests, and a first communications interface for communicating with a plurality of network components located throughout the controlled environment;
receiving the request by the control center;
converting the request into a signal having a format suitable for communication with the plurality of network components;
transmitting the converted signal to the plurality of network components;
controlling an operation or a function of one or more devices or applications in response to the request; and
communicating with the control server and a legacy device of the network components using a second communications interface comprising an infrared beacon or serial interface, the second communications interface using an infrared or a serial communications protocol, the second one of the communications interface:
(a) accepting network configuration parameters from an infrared port using data transmission protocols if in an infrared out-of-band configuration; and
(b) learning new legacy device infrared or serial control codes for the legacy device.

19. The method of claim 18, further comprising:
supplying power to the remote control device when the remote control device is being held within the receptacle.

20. The method of claim 18, wherein the controlling comprises:
communicating a control signal over a wireless communications interface to control the operation or the function of the one or more devices or applications.

21. The method of claim 18, wherein the controlling comprises:
communicating a control signal over an infrared communications interface to control the operation or the function of the one or more devices or applications.

22. The method of claim 18, wherein the controlling comprises:
communicating a control signal over a serial communications interface to control the operation or the function of the legacy device.

23. The method of claim 18, wherein the controlling comprises:
communicating a control signal over a powerline communications interface to control the operation or the function of the one or more devices or applications.

24. The method of claim 18, wherein the operating a remote control device includes communicating in accordance with protocol is IEEE 802.11(a) or (b).

25. The method of claim 18, wherein the converting includes converting the request into an infrared signal.

26. A system for distributing information within a controlled environment, comprising:
a plurality of network components located throughout the controlled environment;
a remote control device configured to send a control request to one or more of the network components; and
a cradle, wherein the cradle includes:
a receptacle configured to hold the remote control device,
a first communications interface configured to communicate with said remote control device via a network that communicates information in accordance with a packet-based communications protocol, the first communications interface configured to communicate with the plurality of network components located throughout the controlled environment,
a control server comprised of a processing system configured to convert a command formatted in accordance with the packet-based wireless communication protocol received from the remote control device into a format suitable for wireless communication with one or more of the network components,
a power supply port having an electrical connection to the receptacle, wherein the power supply port is configured to supply power to the remote control device when the remote control device is being held within the receptacle; and
a second communications interface being an infrared beacon or serial interface and configured to communicate with the control server and a legacy device of the network components, the second communications interface using an infrared or a serial communications protocol, the second communications interface being configured:
(a) to accept network configuration parameters from an infrared port using data transmission protocols if in an infrared out-of-band configuration; and
(b) to learn new legacy device infrared or serial control codes for the legacy device.

27. The system of claim 26, further comprising:
positioning means for tracking and/or monitoring a location or a movement of at least one of the network components.

28. The system of claim 27, wherein the remote control device is configured to interact with the positioning means, and wherein the remote control device is further configured to send a control request to one or more of the network components located within a vicinity of the remote control device.

29. The system of claim 26, wherein the cradle further comprises a third communications interface that includes an infrared interface configured to communicatively couple the cradle with at least one of the network components.

30. The system of claim 26, wherein the cradle includes an LED indicator for indicating a status of power connectivity or network connectivity.

31. The system of claim 26, wherein the packet-based wireless communications protocol is IEEE 802.11(a) or (b).

32. The system of claim 26, further comprising:
a third communications interface configured to transmit signals converted and formatted by the control server to and from one or more of the plurality of network components,
wherein the third communications interface is adapted to transmit with an infrared communication protocol.

33. The system of claim 26, wherein the first communications interface includes a serial interface that communicatively couples the cradle with at least one of the network components.

34. A method of distributing information within a controlled environment, comprising:
operating a remote control device to send a request to a control center via a network that communicates information in accordance with a packet-based wireless communication protocol, wherein said control center is located in a cradle that includes a receptacle for holding the remote control device, a control server comprised of a processing system that processes the request, a first communications interface for communicating with a plurality of network components located throughout the controlled environment, and a power supply port having an electrical connection to the receptacle, wherein the power supply port is configured to supply power to the remote control device when the remote control device is being held within the receptacle;
receiving the request by the control center;
converting the request into a signal having a format suitable for communication with the plurality of network components;
transmitting the converted signal to one or more of the network components;
controlling an operation or a function of one or more network components or applications in response to the request; and
communicating with the control server and a legacy device of the network components using a second communications interface that is an infrared beacon or serial, interface, the second communications interface using an infrared or a serial communications protocol, the second communications interface:
(a) accepting network configuration parameters from an infrared port using data transmission protocols if in an infrared out-of-band configuration; and
(b) learning new legacy device infrared or serial control codes for the legacy device.

35. The method of claim 34, wherein the controlling comprises:
communicating a control signal over a wireless communications interface to control the operation or the function of the one or more devices or applications.

36. The method of claim 34, wherein the controlling comprises:
communicating a control signal over an infrared communications interface to control the operation or the function of the one or more devices or applications.

37. The method of claim 34, wherein the controlling comprises:
communicating a control signal over a serial communications interface to control the operation or the function of the legacy device.

38. The method of claim 34, wherein the controlling comprises:
communicating a control signal over a powerline communications interface to control the operation or the function of the one or more devices or applications.

39. The method of claim 34, wherein the packet-based wireless communications protocol is IEEE 802.11(a) or (b).

40. The method of claim 34, further comprising:
a third communications interface configured to transmit signals converted and formatted by the control server to and from one or more of the plurality of network components,
wherein the third communications interface is adapted to transmit with an infrared communication protocol.

* * * * *